US012776073B2

(12) United States Patent
Akhtar et al.

(10) Patent No.: US 12,776,073 B2
(45) Date of Patent: Oct. 27, 2026

(54) V-DMC OCTAHEDRAL NORMAL CODING

(71) Applicant: QUALCOMM Incorporated, San Diego, CA (US)

(72) Inventors: Anique Akhtar, San Diego, CA (US); Geert Van der Auwera, San Diego, CA (US); Reetu Hooda, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 19/092,756

(22) Filed: Mar. 27, 2025

(65) Prior Publication Data

US 2025/0322546 A1 Oct. 16, 2025

Related U.S. Application Data

(60) Provisional application No. 63/635,219, filed on Apr. 17, 2024, provisional application No. 63/633,589, filed on Apr. 12, 2024.

(51) Int. Cl.
*G06T 9/00* (2006.01)
*G06T 15/04* (2011.01)
*H04N 19/50* (2014.01)

(52) U.S. Cl.
CPC ............ *G06T 9/001* (2013.01); *H04N 19/50* (2014.11)

(58) Field of Classification Search
CPC ......... G06T 9/001; G06T 9/004; H04N 19/50; H04N 19/597
See application file for complete search history.

(56) References Cited

U.S. PATENT DOCUMENTS

| | | | | |
|---|---|---|---|---|
| 2025/0119581 | A1 | 4/2025 | Hooda et al. | |
| 2025/0124655 | A1* | 4/2025 | Cao | G06T 17/20 |
| 2025/0238960 | A1* | 7/2025 | Nguyen Canh | G06T 9/001 |
| 2025/0322546 | A1* | 10/2025 | Akhtar | H04N 19/50 |

OTHER PUBLICATIONS

Akhtar A., et al., "m67554 [V-DMC][EE4.4] Octahedral Normal Encoding", 146. Mpeg Meeting, Apr. 22, 2024-Apr. 26, 2024, Rennes, (Motion Picture Expert Group or ISO/IEC JTC1/SC29/WG11), No. m67554, Apr. 18, 2024, XP030318569, pp. 1-17, the whole document.

(Continued)

*Primary Examiner* — Howard D Brown, Jr.
(74) *Attorney, Agent, or Firm* — QUALCOMM Incorporated

(57) ABSTRACT

A method of encoding or decoding a base mesh includes determining a two-dimensional (2D) octahedral representation of a prediction vector for predicting a 2D octahedral representation of a three-dimensional (3D) normal vector of a current vertex or current face of the base mesh, the normal vector extending outward from the current vertex or current face and perpendicular to the current vertex or current face; and encoding or decoding the 3D normal vector of the current vertex or current face based on the 2D octahedral representation of the prediction vector.

20 Claims, 35 Drawing Sheets

(56) References Cited

OTHER PUBLICATIONS

Cigolle Z.H., et al., "A Survey of Efficient Representations for Independent Unit Vectors", Journal of Computer Graphics Techniques, vol. 3, No. 2, 2014, pp. 1-30.
Cohen-Or D., et al., "Multi-way Geometry Encoding", Elsevier Science, Dec. 1, 2002, pp. 1-9.
Co-pending U.S. Appl. No. 18/982,775, inventor Akhtar; Anique, filed Dec. 16, 2024.
Co-pending U.S. Appl. No. 19/018,955, inventor Akhtar; Anique, filed Jan. 13, 2025.
International Search Report and Written Opinion—PCT/US2025/022088—ISA/EPO—Jun. 13, 2025 (12 pp).
Isenburg M., et al., "Compressing Polygon Mesh Geometry with Parallelogram Prediction", IEEE Visualization, 2002, pp. 1-6.
Isenburg M., et al., "Compressing Texture Coordinates with Selective Linear Predictions", Proceedings Computer Graphics International, 2003, pp. 1-6.
Lopes H., et al., "Edgebreaker: A Simple Compression for Surfaces with Handles", Proceedings of the seventh ACM symposium on Solid modeling and applications, Jun. 17, 2002, pp. 289-296.
Marvie J-E., et al., "Coding of Dynamic 3D Meshes", Immersive Video Technologies, Chapter 1, Jan. 1, 2023, pp. 387-423, XP093254807, pp. 1-37, paragraph [1.3.3].
Meyer Q., et al., "On Floating-Point Normal Vectors", Chapter 1: Monte Carlo Path Tracing, vol. 29, No. 4, Jun. 1, 2010, pp. 1405-1409, XP055435553, Oxford, 6 Pages, abstract, figure 2 paragraph [0005].
"Spherical Geometry", Geometry and Transformations, Accessed on Jan. 22, 2025, 13 Pages.
Rossignac J., et al., "3D Compression Made Simple: Edgebreaker on a Corner-Table", College of Computing and GVU Center, Jan. 2001, 7 Pages.
Rossignac J., "Triangle Meshes", 2006, pp. 1-7.(Applicant points out, in accordance with MPEP 609.04(a), that the year of publication, 2006, is sufficiently earlier than the effective U.S. filing date, so that the particular month of publication is not an issue.).

* cited by examiner

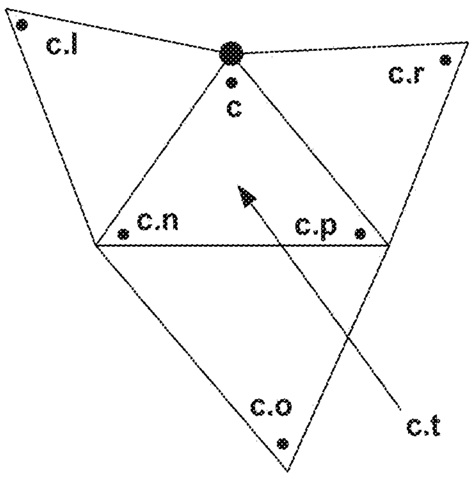
FIG. 10C
| | V | O |
|---|---|---|
| Triangle 0 corner 0 | 1 | 7 |
| Triangle 0 corner 1 | 2 | 8 |
| Triangle 0 corner 2 | 3 | 5 |
| Triangle 1 corner 3 | 2 | 9 |
| Triangle 1 corner 4 | 1 | 6 |
| Triangle 1 corner 5 | 4 | 2 |
FIG. 10D
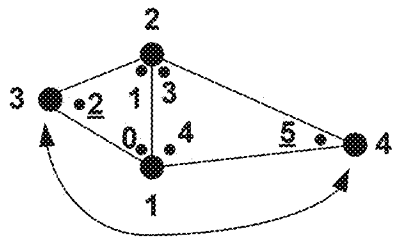
FIG. 10E
| | | | |
|---|---|---|---|
| Vertex 1 | x | y | z |
| Vertex 2 | x | y | z |
| Vertex 3 | x | y | z |
| Vertex 4 | x | y | z |
FIG. 10F

```
// This function calculates the 2D octahedral residuals. The input is the 3D original
normal and 3D prediction.
void calculate2DResiduals(const glm::vec3 original, const glm::vec3 pred);

// This function converts a 3D unit vector to a 2D octahedral representation.
void convert3Dto2Doctahedral(glm::vec3 input, glm::vec2& output);

// This function is used to convert a float between -1 and 1 to an unsigned integer with
qn quantization.
float floatTOint(float input, float min, float max, int qn);

// This function calculates the 3D reconstructed normal. The input is the 2D residual and
3D prediction.
void octaResidualsToReconstructed(const glm::vec2 residual2D, const glm::vec3 pred,
glm::vec3& rec);

// This function converts a 2D octahedral representation to a 3D unit vector.
void convert2DoctahedralTo3D(glm::vec2 input, glm::vec3& output);

// This function is used to convert an unsigned integer with qn quantization to a float
between -1 and 1.
float intTOfloat(float input, float min, float max, int qn);
```

All functions employed in octaheral 2D normal encoding

FIG. 22

```
// This function calculates the 2D octahedral residuals. The input is the 3D original
normal and 3D prediction.
void calculate2DResiduals(const glm::vec3 original, const glm::vec3 pred);

    glm::vec2 orig2D(0,0);
    glm::vec2 pred2D(0,0);
    convert3Dto2Doctahedral(original, orig2D);
    convert3Dto2Doctahedral(pred, pred2D);

    glm::vec2 residual2D = orig2D-pred2D;
    octoNormals.push_back(residual2D);

    // Testing reverse octahedral
    glm::vec3 reconstructed(0,0,0);
    octaResidualsToReconstructed(residual2D, pred, reconstructed);

    glm::vec3 secondResiduals = original - reconstructed;
    oNormals.push_back(secondResiduals);      // Saving 2nd Residuals

    return;
```

calcuate2DResidual function

FIG. 23

```
// This function converts a 3D unit vector to a 2D octahedral
representation.
void convert3Dto2Doctahedral(glm::vec3 input, glm::vec2& output);
    // Center
    const int32_t center = ( 1u << static_cast<uint32_t>( qn-1 )
);
    for (int c = 0; c < 3; c++) {
        input[c] = input[c] - center;
    }
    // Normalize
    input /= std::abs(input.x) + std::abs(input.y) +
std::abs(input.z);    // signed float

    if (std::isnan( input[0] ) ) input = {0,0,0};

    if (input.z >= 0) {
        output.x = floatTOint(input.x, -1.0, 1.0, qpOcta);   //
scales to unsigned integer with qpOcta bitdepth.
        output.y = floatTOint(input.y, -1.0, 1.0, qpOcta);
    } else {
        output.x = floatTOint( (1 - std::abs(input.y)) *
std::copysign(1.f, input.x) , -1.0, 1.0, qpOcta);
        output.y = floatTOint( (1 - std::abs(input.x)) *
std::copysign(1.f, input.y) , -1.0, 1.0, qpOcta);
    }

    return;
}
```

convert3Dto2Doctahedral function

FIG. 24

```
// This function is used to convert a float between -1 and 1 to an unsigned integer with
qn quantization.
float EBReversiEncoder::floatTOint(float input, float min, float max, int qn) {
   const float range                         = max - min;
   const int32_t   maxNormalQuantizedValue   = ( 1u << static_cast<uint32_t>( qn ) ) -
1;
   float output = static_cast<float>(std::floor( ( ( input - min ) / range ) *
maxNormalQuantizedValue + 0.5f ) );

   return output;
}
```

floatTOint function

FIG. 25

```
// This function calculates the 3D reconstructed normal. The input is the 2D residual and
3D prediction.
void octaResidualsToReconstructed(const glm::vec2 residual2D, const glm::vec3 pred,
glm::vec3& rec);

    glm::vec2 pred2D(0,0);
    convert3Dto2Doctahedral(pred, pred2D);

    glm::vec2 rec2D = pred2D + residual2D;
    convert2DoctahedralTo3D(rec2D, rec);

    return;
}
```

octaResidualsToReconstructed function

FIG. 26

```
// This function converts a 2D octahedral representation to a 3D unit vector.
void convert2DoctahedralTo3D(glm::vec2 input, glm::vec3& output);

   output.x = intTOfloat(input.x, -1.0, 1.0, qpOcta);    // converts to float b/w -1 and +1
   output.y = intTOfloat(input.y, -1.0, 1.0, qpOcta);
   output.z = 1 - (std::abs(output.x) + std::abs(output.y));

   if (output.z < 0) {
      const float x_t = output.x;
      output.x = (1 - std::abs(output.y)) * std::copysign(1.f, x_t);
      output.y = (1 - std::abs(x_t)) * std::copysign(1.f, output.y);
   }

   output = glm::normalize( output );

   // Scale to unsigned integers.
   const glm::vec3 minNrm                    = {-1.0, -1.0, -1.0};
   const glm::vec3 maxNrm                    = {1.0, 1.0, 1.0};
   const glm::vec3 diag                      = maxNrm - minNrm;
   const float     range                     = std::max( std::max( diag.x, diag.y ), diag.z );
   const int32_t   maxNormalQuantizedValue   = ( 1u << static_cast<uint32_t>( qn ) ) -
1;
   for (int c = 0; c < 3; c++) {
      output[c] = static_cast<float>(std::floor( ( ( output[c] - minNrm[c] ) / range ) *
                                       maxNormalQuantizedValue + 0.5f ) );
   }

   return;
}
```

convert2DoctaheralTo3D function

FIG. 27

```
// This function is used to convert an unsigned integer with qn quantization to a float
between -1 and 1.
float intTOfloat(float input, float min, float max, int qn);
    const float range                          = max - min;
    const auto scaleNormal                     = std::pow(2.0, qn) - 1.0;
    float output = static_cast<float>(((input * range) / scaleNormal ) + min);

    return output;
}
```

intTOfloat function

FIG. 28

V-DMC OCTAHEDRAL NORMAL CODING

This application claims the benefit of U.S. Provisional Application No. 63/633,589, filed Apr. 12, 2024, and U.S. Provisional Application No. 63/635,219, filed Apr. 17, 2024, the entire content of each of which is incorporated by reference herein.

TECHNICAL FIELD

This disclosure relates to video-based coding of dynamic meshes.

BACKGROUND

Meshes may be used to represent physical content of a 3-dimensional space. Meshes have utility in a wide variety of situations. For example, meshes may be used in the context of representing the physical content of an environment for purposes of positioning virtual objects in an extended reality, e.g., augmented reality (AR), virtual reality (VR), or mixed reality (MR), application. Mesh compression is a process for encoding and decoding meshes. Encoding meshes may reduce the amount of data required for storage and transmission of the meshes.

SUMMARY

In general, this disclosure describes techniques for encoding and decoding a normal vector for a current vertex or current face of a base mesh for video-based dynamic mesh coding (V-DMC). The current face may be a triangle that is formed by a plurality of vertices. For instance, the techniques describe ways to encode or decode a normal vector for the current vertex or current face of the base mesh in a two-dimensional (2D) octahedral representation. A normal vector for a current vertex or current face may be in 3D (e.g., x, y, and z-coordinate) that extends from the current vertex or current face and is perpendicular to the current vertex or current face. The normal vector for the current face may be a normal vector extending from a point within the current face, such as mid-point, or another point. The normal vector is one example of an attribute of the current vertex or current face, and is encoded and decoded as part of encoding and decoding the base mesh.

In the 2D octahedral representation of the 3D normal vector, there may be fewer values as compared to the 3D normal vector (e.g., two coordinates instead of three coordinates). By encoding and decoding the normal vector in the 2D octahedral representation, there may be fewer values to signal thereby saving signaling bandwidth. Accordingly, the example techniques may improve the technology of V-DMC by performing normal vector encoding and decoding using 2D octahedral representations.

In one example, the disclosure describes a method of encoding or decoding a base mesh, the method comprising: determining a two-dimensional (2D) octahedral representation of a prediction vector for predicting a 2D octahedral representation of a three-dimensional (3D) normal vector of a current vertex or current face of the base mesh, the normal vector extending outward from the current vertex or current face and perpendicular to the current vertex or current face; and encoding or decoding the 3D normal vector of the current vertex or current face based on the 2D octahedral representation of the prediction vector.

In one example, the disclosure describes a device for encoding or decoding a base mesh, the device comprising:

one or more memories configured to store data for the base mesh; and processing circuitry coupled to the one or more memories, wherein the processing circuitry is configured to: determine a two-dimensional (2D) octahedral representation of a prediction vector for predicting a 2D octahedral representation of a three-dimensional (3D) normal vector of a current vertex or current face of the base mesh, the normal vector extending outward from the current vertex or current face and perpendicular to the current vertex or current face; and encode or decode the 3D normal vector of the current vertex or current face based on the 2D octahedral representation of the prediction vector.

In one example, the disclosure describes a computer-readable storage medium storing instructions thereon that when executed cause one or more processors to: determine a two-dimensional (2D) octahedral representation of a prediction vector for predicting a 2D octahedral representation of a three-dimensional (3D) normal vector of a current vertex or current face of a base mesh, the normal vector extending outward from the current vertex or current face and perpendicular to the current vertex or current face; and encode or decode the 3D normal vector of the current vertex or current face based on the 2D octahedral representation of the prediction vector.

The details of one or more examples are set forth in the accompanying drawings and the description below. Other features, objects, and advantages will be apparent from the description, drawings, and claims.

BRIEF DESCRIPTION OF DRAWINGS

FIGS. 10C-F shows an example of a corner table data structure for triangle meshes.

FIGS. 22-28 are tables illustrating code for implementation of octahedral representation.

DETAILED DESCRIPTION

Figure 1:
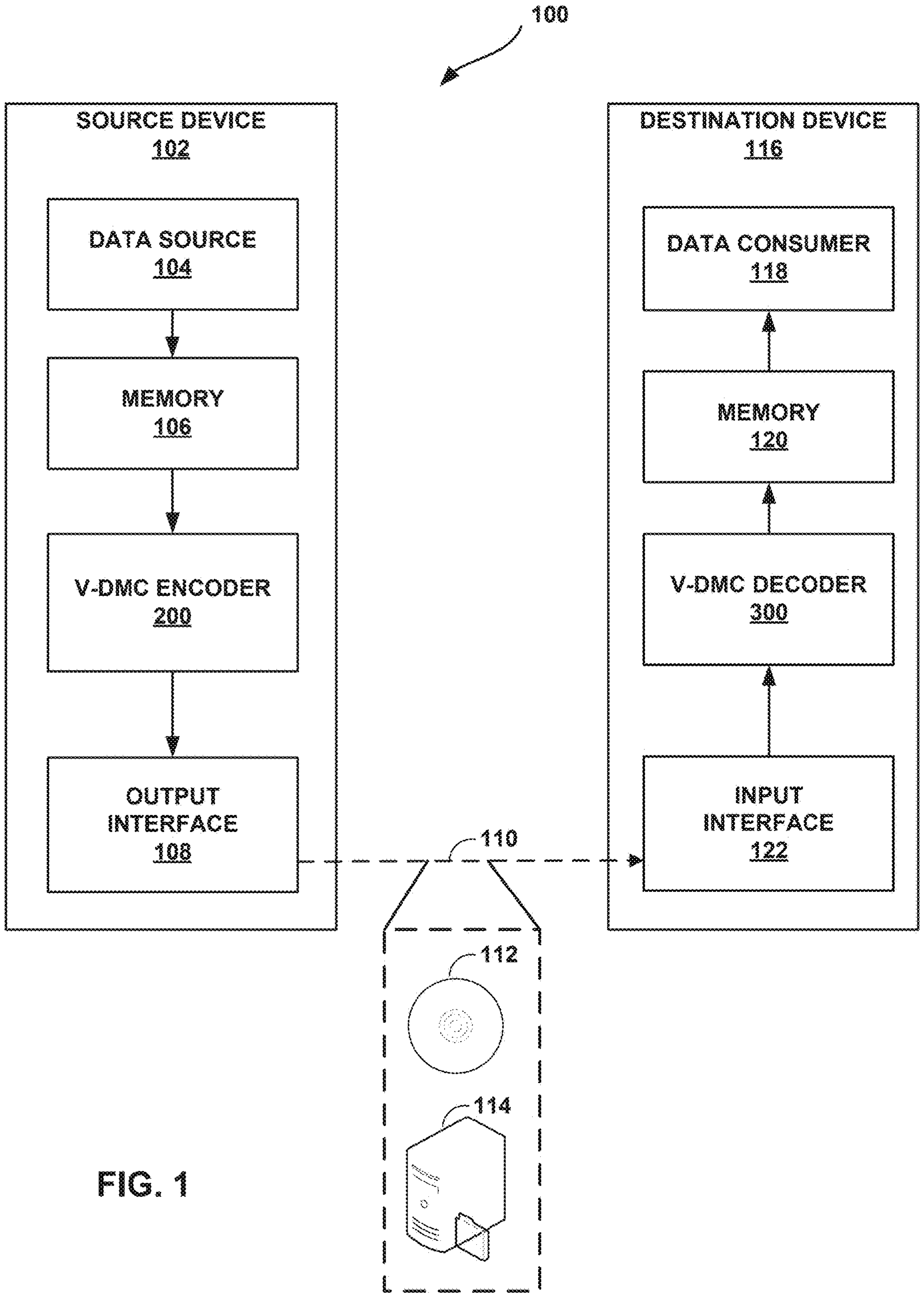
FIG. 1 is a block diagram illustrating an example encoding and decoding system that may perform the techniques of this disclosure.

This disclosure relates generally to video-based dynamic mesh coding (V-DMC). For instance, this disclosure describes techniques of utilizing octahedral normal encoding in V-DMC Test Model v7.0 (TMM v7.0). U.S. application Ser. No. 19/018,955, filed Jan. 13, 2025 described integration of normal encoding in V-DMC Test Model v6.0 (TMM v6.0) that was later ported to TMM v7.0. This disclosure describes further techniques for encoding and/or decoding of normal vectors (also called normals) by introducing a 2D octahedral representation for normals and then encoding and/or decoding that 2D representation.

In V-DMC, the original mesh is pre-processed and then encoded using a base mesh/static-mesh encoder. The base-mesh/static-mesh encoder encodes and the decoder decodes the connectivity of the mesh triangles as well as the attributes. These attributes include position/geometry, color, texture, normals, etc. Some techniques include the encoding of normal attribute (i.e., normal vector) in V-DMC. In this disclosure, the normal vector encoding and/or decoding may be performed by introducing 2D octahedral normal representation and encoding or decoding of the 2D octahedral normal representation. In this manner, the example techniques may improve normal encoding and/or decoding techniques for V-DMC.

For instance, a normal vector of a current vertex or current face of a base mesh is in three-dimensions (3D) that extends from the current vertex or current face and is perpendicular to the current vertex or current face. The current face may be a polygon (e.g., triangle) formed by a plurality of vertices, and the interconnection of the plurality of polygons may form the mesh. The normal vector for the current face may be vector extending from a point within the current face, such as a midpoint of the current face. The normal vector is one example of an attribute of the current vertex or current face. To encode the base mesh, a base mesh encoder of a V-DMC encoder encodes the attribute information of the vertices of the base mesh, including the normal vectors, and a base mesh decoder of a V-DMC decoder decodes the attribute information of the vertices of the base mesh, including the normal vectors, to reconstruct the base mesh.

While normal vectors are 3D, encoding and decoding normal vectors in 3D may not be bandwidth efficient. For example, with 3D coordinates (e.g., x, y, and z-coordinates), a normal vector can extend to any size in a 3D space. However, in V-DMC, the normal vectors may be constraint to a unit size of one. That is, normal vectors may point to any point on a surface of a unit sphere, and not to any point that extends outside or is within the unit sphere.

Due to the size constrained on the normal vectors, having flexibility to identify any point in 3D space, as is provided with 3D representation, is not necessary. Accordingly, encoding and decoding gains may be available by leveraging the size constraint of the normal vectors. In accordance with one or more examples, the base mesh encoder and base mesh decoder may encode or decode a normal vector in a 2D octahedral representation. In the 2D octahedral representation, the normal vector can be represented in two-dimensions instead of three-dimensions, thereby reducing the amount of information that needs to be signaled.

To encode or decode the normal vectors, the base mesh encoder and the base mesh decoder may each determine a prediction vector for the normal vector for the current vertex or current face. In one or more examples, the base mesh encoder and the base mesh decoder may determine a 2D octahedral representation of the prediction vector. As one example, the base mesh encoder and the base mesh decoder may determine normal vectors of previously encoded or decoded vertices of the base mesh, and utilize those normal vectors to generate the 2D octahedral representation of the prediction vector. As another example, the base mesh encoder and the base mesh decoder may determine attributes, excluding normal vectors, of previously encoded or decoded vertices of the base mesh and attributes, excluding normal vectors, of the current vertex or current face. Using these attributes, the base mesh encoder and the base mesh decoder may generate the 2D octahedral representation of the prediction vector.

The base mesh encoder may convert the 3D normal vector for the current vertex or current face into a 2D octahedral representation of the 3D normal vector, utilizing techniques described in further detail. The base mesh encoder may generate residual information indicative of a difference between the 2D octahedral representation of the prediction vector and the 2D octahedral representation of the 3D normal vector of the current vertex or current face. The base mesh encoder may then signal the residual information.

The base mesh decoder may receive residual information indicative of a difference between the 2D octahedral representation of the prediction vector and the 2D octahedral representation of the 3D normal vector of the current vertex or current face. The base mesh decoder may add the residual information to the 2D octahedral representation of the prediction vector to reconstruct the 2D octahedral representation of the 3D normal vector of the current vertex or current face. The base mesh decoder may reconstruct the 3D normal vector of the current vertex or current face from the 2D octahedral representation of the 3D normal vector of the current vertex or current face (e.g., convert from 2D octahedral representation to 3D, utilizing example techniques described in further detail).

The conversion from 3D normal vector to the 2D octahedral representation of the 3D normal vector of the current vertex or current face may be lossy. For instance, if the 3D normal vector is converted to the 2D octahedral representation of the 3D normal vector of the current vertex or current face, and then converted back to the 3D normal vector, the resulting 3D normal vector and the original 3D normal vector may not be identical.

In some cases, it may be desirable that the base mesh encoding and decoding be lossless. To provide lossless encoding and decoding, the base mesh encoder may signal, and the base mesh decoder may receive additional residual information. For instance, the base mesh encoder may reconstruct (e.g., by reconverting) the 2D octahedral representation of the 3D normal vector of the current vertex or current face back to the 3D normal vector. In this case, the reconstructed 3D normal vector for the current vertex or current face may be lossy (e.g., not identical to the actual 3D normal vector for the current vertex or current face). Accordingly, the reconstructed 3D normal vector for the current vertex or current face may be referred to as a 3D lossy representation of the normal vector. The base mesh encoder may determine residual information indicative of the difference between the 3D normal vector and the 3D lossy representation of the normal vector, and signal the residual information.

The base mesh decoder may have generated a 2D octahedral representation of the 3D normal vector, as described above. The base mesh decoder may convert the 2D octahedral representation of the 3D normal vector of the current vertex or current face to a 3D lossy representation of the normal vector of the current vertex or current face. Again, the result of the conversion from the 2D octahedral representation of the 3D normal vector of the current vertex or current face to 3D may not result in the same 3D normal vector that the base mesh encoder encoded. The base mesh decoder may add the residual information indicative of the difference between the 3D normal vector of the current vertex or current face and the 3D lossy representation of the normal vector of the current vertex or current face to the 3D lossy representation of the normal vector of the current vertex or current face to reconstruct the 3D normal vector in a lossless manner.

By signaling the residual information indicative of the difference between the 3D normal vector of the current vertex or current face and the 3D lossy representation of the normal vector of the current vertex or current face, the base mesh decoder may reconstruct the 3D normal vector in a lossless manner. For example, the reconstructed 3D normal vector and the original 3D normal vector that the base mesh encoder encoded are substantially the same.

Accordingly, in some examples, the base mesh encoder may signal first residual information indicative of a difference between the 2D octahedral representation of the prediction vector and the 2D octahedral representation of the 3D normal vector of the current vertex or current face, and signal second residual information indicative of a difference between the 3D normal vector and the 3D lossy representation of the normal vector. The base mesh decoder may receive the first residual information indicative of a difference between the 2D octahedral representation of the prediction vector and the 2D octahedral representation of the 3D normal vector of the current vertex or current face, and reconstruct the 2D octahedral representation of the 3D normal vector of the current vertex or current face. The base mesh decoder may then generate a 3D lossy representation of the normal vector (e.g., by converting the 2D octahedral representation of the 3D normal vector of the current vertex or current face back to 3D), and then add the second residual information to the 3D lossy representation of the normal vector to reconstruct the 3D normal vector.

Lossless encoding and decoding of the 3D normal vector is not necessary in all examples. However, the second residual information tends to be relatively small, and therefore does not substantially impact signaling bandwidth.

FIG. 1 is a block diagram illustrating an example encoding and decoding system 100 that may perform the techniques of this disclosure. The techniques of this disclosure are generally directed to coding (encoding and/or decoding) meshes. The coding may be effective in compressing and/or decompressing data of the meshes.

As shown in FIG. 1, system 100 includes a source device 102 and a destination device 116. Source device 102 provides encoded data to be decoded by a destination device 116. Particularly, in the example of FIG. 1, source device 102 provides the data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a V-DMC encoder 200, and an output interface 108. Destination device 116 includes an input interface 122, a V-DMC decoder 300, a memory 120, and a data consumer 118. In accordance with this disclosure, V-DMC encoder 200 of source device 102 and V-DMC decoder 300 of destination device 116 may be configured to apply the techniques of this disclosure related to displacement vector quantization. Thus, source device 102 represents an example of an encoding device, while destination device 116 represents an example of a decoding device. In other examples, source device 102 and destination device 116 may include other components or arrangements. For example, source device 102 may receive data from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to displacement vector quantization. Source device 102 and destination device 116 are merely examples of such devices in which source device 102 generates coded data for transmission to destination device 116. This disclosure refers to a "coding" device as a device that performs coding (encoding and/or decoding) of data. Thus, V-DMC encoder 200 and V-DMC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded data) and may provide a sequential series of "frames") of the data to V-DMC encoder 200, which encodes data for the frames. Data source 104 of source device 102 may include a mesh capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, mesh data may be computer-generated from scanner, camera, sensor or other data. For example, data source 104 may generate computer graphics-based data as the source data, or produce a combination of live data, archived data, and computer-generated data. In each case, V-DMC encoder 200 encodes the captured, pre-captured, or computer-generated data. V-DMC encoder 200 may rearrange the frames from the received order (sometimes referred to as "display order") into a coding order for coding. V-DMC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from V-DMC decoder 300. Additionally or alternatively, memory 106 and memory 120 may store software instructions executable by, e.g., V-DMC encoder 200 and V-DMC decoder 300, respectively. Although memory 106 and memory 120 are shown separately from V-DMC encoder 200 and V-DMC decoder 300 in this example, it should be understood that V-DMC encoder 200 and V-DMC decoder 300 may also include internal memories for functionally similar or equivalent purposes. Furthermore, memory 106 and memory 120 may store encoded data, e.g., output from V-DMC encoder 200 and input to V-DMC decoder 300. In some examples, portions of memory 106 and memory 120 may be allocated as one or more buffers, e.g., to store raw, decoded, and/or encoded data. For instance, memory 106 and memory 120 may store data representing a mesh.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to V-DMC encoder 200 and/or output interface 108, and destination device 116 may include an SoC device to perform the functionality attributed to V-DMC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by V-DMC encoder 200, which is also used by V-DMC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on meshes.

V-DMC encoder 200 and V-DMC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of V-DMC encoder 200 and V-DMC decoder 300 may be included in one or more encoders or decoders, either of which may be integrated as part of a combined encoder/decoder (CODEC) in a respective device. A device including V-DMC encoder 200 and/or V-DMC decoder 300 may comprise one or more integrated circuits, microprocessors, and/or other types of devices.

V-DMC encoder 200 and V-DMC decoder 300 may operate according to a coding standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, V-DMC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Working Group 7 (WG7), often referred to as the 3D Graphics and Haptics Coding Group (3DGH), is presently engaged in standardizing the video-based dynamic mesh coding (V-DMC) for XR applications. The current testing model includes preprocessing input meshes into possibly simplified versions called "base meshes." These base meshes may contain fewer vertices than the original mesh and may be encoded using a base mesh encoder also called a static mesh encoder. The preprocessing also generates displacement vectors as well as a texture attribute map that are both encoded using a video encoder. If the mesh is encoded in a lossless manner, then the base mesh is no longer a simplified version and is used to encode the original mesh. For the lossless manner, the V-DMC TMM v7.0 tool operates in intra-mode where the base mesh encoder becomes the primary encoding process.

The base mesh encoder encodes the connectivity of the mesh as well as the attributes associated with each vertex which typically involves the position and texture coordinates (e.g., UV coordinates) but are not limited to these attributes. The position includes 3D coordinates (x,y,z) of the vertex while, the texture is stored as a 2D UV coordinate (x,y), also called texture coordinates, that points to a texture map image pixel location. The base mesh in V-DMC is encoded using an edgebreaker algorithm, where the connectivity is encoded using a CLERS op code using edgebreaker traversal and the residual of the attribute is encoded using prediction from the previously encoded/decoded vertices. The triangle (e.g., polygon) connectivity is encoded using five symbols (C, L, E, R, S). Each triangle is assigned a single symbol based on its connectivity with its neighbor. When the symbols are combined, the symbols make CLERS or CLERS op code. The attributes for a mesh can be per-vertex or per-face.

The edgebreaker algorithm is an algorithm used in V-DMC to traverse through a mesh to determine which vertices are connected to which other vertices. In this disclosure, the edgebreaker algorithm is referred to for example purposes, and other algorithms may be used. Reference to the edgebreaker algorithm is made because edgebreaker algorithm is currently used in V-DMC.

Up until TMM v6.0, V-DMC did not support encoding of normals for meshes. Techniques, such as those of U.S. application Ser. No. 19/018,955, introduced encoding of normals (i.e., normal vectors) into V-DMC. This disclosure describes examples of normal encoding by introducing encoding normals (i.e., normal vectors) in 2D rather than 3D using a 2D octahedral representation. Decreasing one dimension of the normal vector may improve the performance of encoding and/or decoding schemes and decreases the bitrate (e.g., signaling) considerably.

A background of the V-DMC test model will now be provided. A detailed description of the proposal that was selected as the starting point for the V-DMC standardization can be found in the following documents:

U.S. Provisional Patent Application No. 63/614,139 filed 22 Dec. 2023 and U.S. patent application Ser. No. 18/982,775 filed 16 Dec. 2024.

U.S. Provisional Patent Applications 63/589,192 filed 10 Oct. 2023, 63/590,679 filed 16 Oct. 2023, and 63/621,478 filed 16 Jan. 2024, and U.S. patent application Ser. No. 18/882,516 filed 9 Sep. 2024.

Khaled Mammou, Jungsun Kim, Alexandros Tourapis, Dimitri Podborski, Krasimir Kolarov, [V-CG] Apple's Dynamic Mesh Coding CfP Response, ISO/IEC JTC1/SC29/WG7, m59281, April 2022 (hereinafter "m59281").

V-DMC codec description, ISO/IEC JTC1/SC29/WG7, N00716, October. 2023.

WD 5.0 of V-DMC, ISO/IEC JTC1/SC29/WG7, N00744, October 2023.

V-DMC codec description, ISO/IEC JTC1/SC29/WG7, N00644, July. 2023 (hereinafter "V-DMC codec description").

WD 4.0 of V-DMC, ISO/IEC JTC1/SC29/WG7, N00680, January 2023 (hereinafter "N00680").

Figure 2:
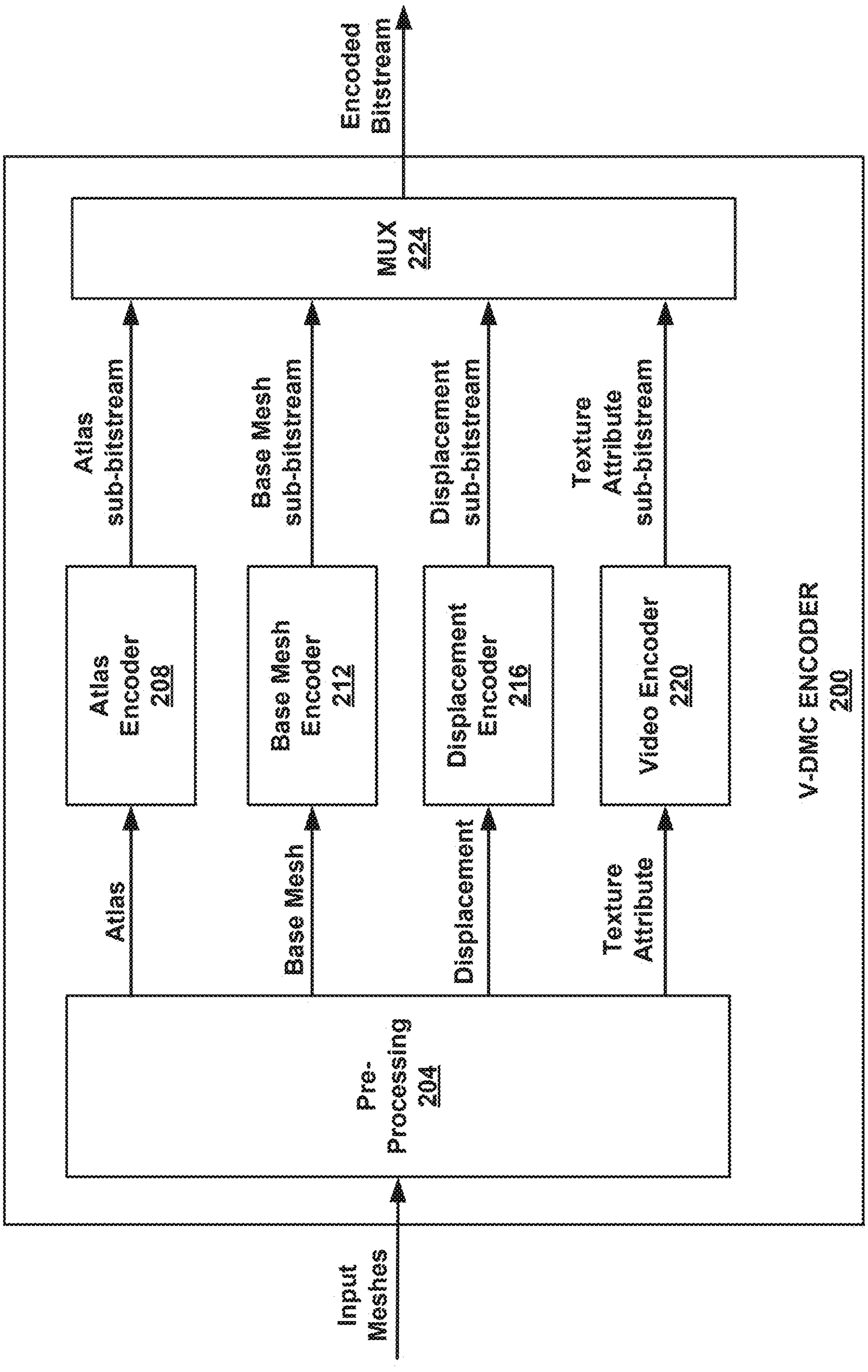
FIG. 2 shows an example implementation of a V-DMC (video-based dynamic mesh coding) encoder.
Figure 3:
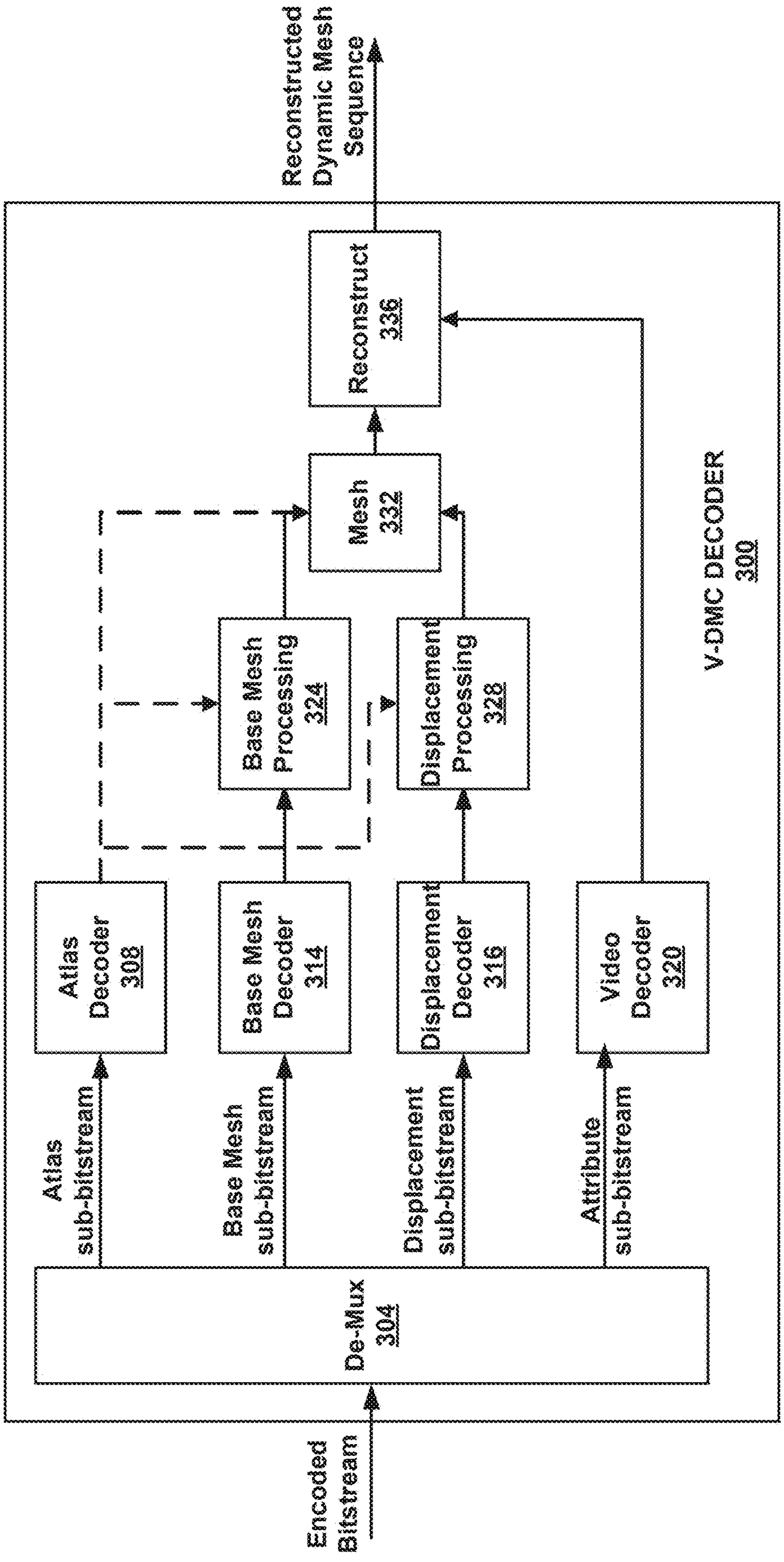
FIG. 3 shows an example implementation of a V-DMC decoder.
Figure 6:
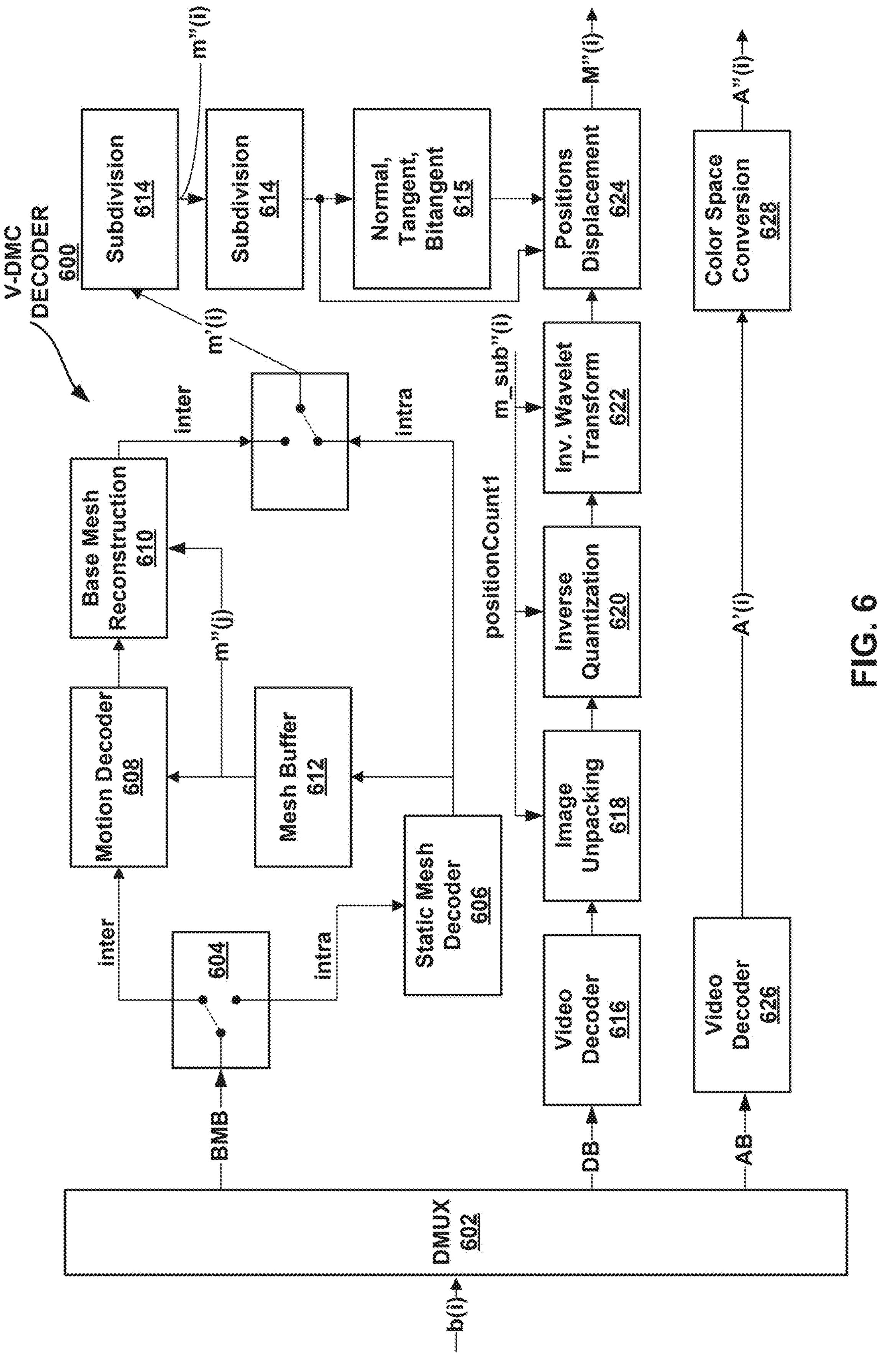
FIG. 6 shows an example implementation of a V-DMC decoder.

U.S. Provisional Patent Applications 63/614,139, 64/589,192, 63/590,679, and 63/621,478, and U.S. patent application Ser. No. 18/882,516 explain the V-DMC as well as basemesh coding. FIGS. 2 and 3 show the overall system model for the current V-DMC test model (TM) including the encoder and decoder architecture. Whereas FIG. 6 shows the detailed view of the V-DMC decoder.

A mesh generally refers to a 3D data storage format where the 3D data is represented in terms of triangles. The data includes of triangle connectivity and the corresponding attributes. Mesh Attributes generally refer to attributes that can includes of a lot of things per vertex geometry (x,y,z), texture, normals (also called normal vectors), per-vertex color, etc.

Texture vs color: Texture is different from the color attribute. A color attribute includes per-vertex color whereas texture is stored as a texture map (image) and texture coordinates (UV coordinates). Each individual vertex is assigned a UV coordinates that correspond to the (x,y) location on the texture map.

Texture encoding includes encoding both the per vertex texture coordinates (UV coordinates) and the corresponding texture map. UV coordinates are encoded in the base mesh encoder while the texture map is encoded using a video encoder.

Preprocessing: The input mesh sequence first goes through the pre-processing to generate an atlas, base mesh, the displacement vectors, and the attribute maps.

Atlas Encoding: Atlas parameterization includes packing 3D mesh into a 2D atlas, i.e., texture mapping. Atlas encoder encodes the information required to parameterize the 3D mesh into a 2D texture map.

Base Mesh: For lossy encoding, the base mesh is usually a simplified mesh with possibly a smaller number of vertices. For lossless encoding, the base mesh is the original mesh with little simplification.

Base Mesh Encoder: The base mesh is encoded using a base mesh encoder (referred to as static mesh encoder in FIG. 4). The base mesh encoder uses edgebreaker to encode the mesh connectivity and attributes (geometry, texture coordinates (UV coordinates), etc.) in a lossless manner.

Displacement Encoder: Displacements are per-vertex vectors that indicate how the base mesh is transformed/displaced to create the mesh. The displacement vectors can be encoded as V3C video component or using arithmetic displacement coding.

Texture Map Encoder: A video encoder is employed to encode the texture map.

Lossless mode: In the lossless mode there are no displacement vectors and the base mesh is not simplified. The base mesh encoder is a lossless encoder so it is sufficient for lossless mode of V-DMC. The texture map is encoded using lossless video encoder.

Lossy mode: In the lossy mode, the base mesh could be a simplified version of the original mesh. Displacement vectors are employed to subdivide and displace the base mesh to obtain reconstructed mesh. The texture map is encoded using lossy video encoder.

Normals: The normals are not currently supported in the V-DMC TMM v6.0. Like texture and color, the normals may also be per-vertex normals or may be a normal map with corresponding normal coordinates.

FIGS. 2 and 3 show the overall system model for the current V-DMC test model (TM) encoder (V-DMC encoder 200 in FIG. 2) and decoder (V-DMC decoder 300 in FIG. 3) architecture. V-DMC encoder 200 performs volumetric media conversion, and V-DMC decoder 300 performs a corresponding reconstruction. The 3D media is converted to a series of sub-bitstreams: base mesh, displacement, and texture attributes. Additional atlas information is also included in the bitstream to enable inverse reconstruction, as described in N00680.

FIG. 2 shows an example implementation of V-DMC encoder 200. In the example of FIG. 2, V-DMC encoder 200 includes pre-processing unit 204, atlas encoder 208, base mesh encoder 212, displacement encoder 216, and video encoder 220. Multiplexer (MUX) 224 may be configured to output encoded bitstream which may be the combination or one of the outputs from atlas encoder 208, base mesh encoder 212, displacement encoder 216, and video encoder 220.

Pre-processing unit 204 receives an input mesh sequence and generates a base mesh, the displacement vectors, and the texture attribute maps. Base mesh encoder 212 encodes the base mesh. Displacement encoder 216 encodes the displacement vectors, for example as V3C video components or using arithmetic displacement coding. Video encoder 220 encodes the texture attribute components, e.g., texture or material information, using any video codec, such as the High Efficiency Video Coding (HEVC) Standard or the Versatile Video Coding (VVC) standard.

Aspects of V-DMC encoder 200 will now be described in more detail. Pre-processing unit 204 represents the 3D volumetric data as a set of base meshes and corresponding refinement components. This is achieved through a conversion of input dynamic mesh representations into a number of V3C components: a base mesh, a set of displacements, a 2D representation of the texture map, and an atlas. The base mesh component is a simplified low-resolution approximation of the original mesh in the lossy compression and is the original mesh in the lossless compression. The base mesh component can be encoded by base mesh encoder 212 using any mesh codec.

Figure 4:
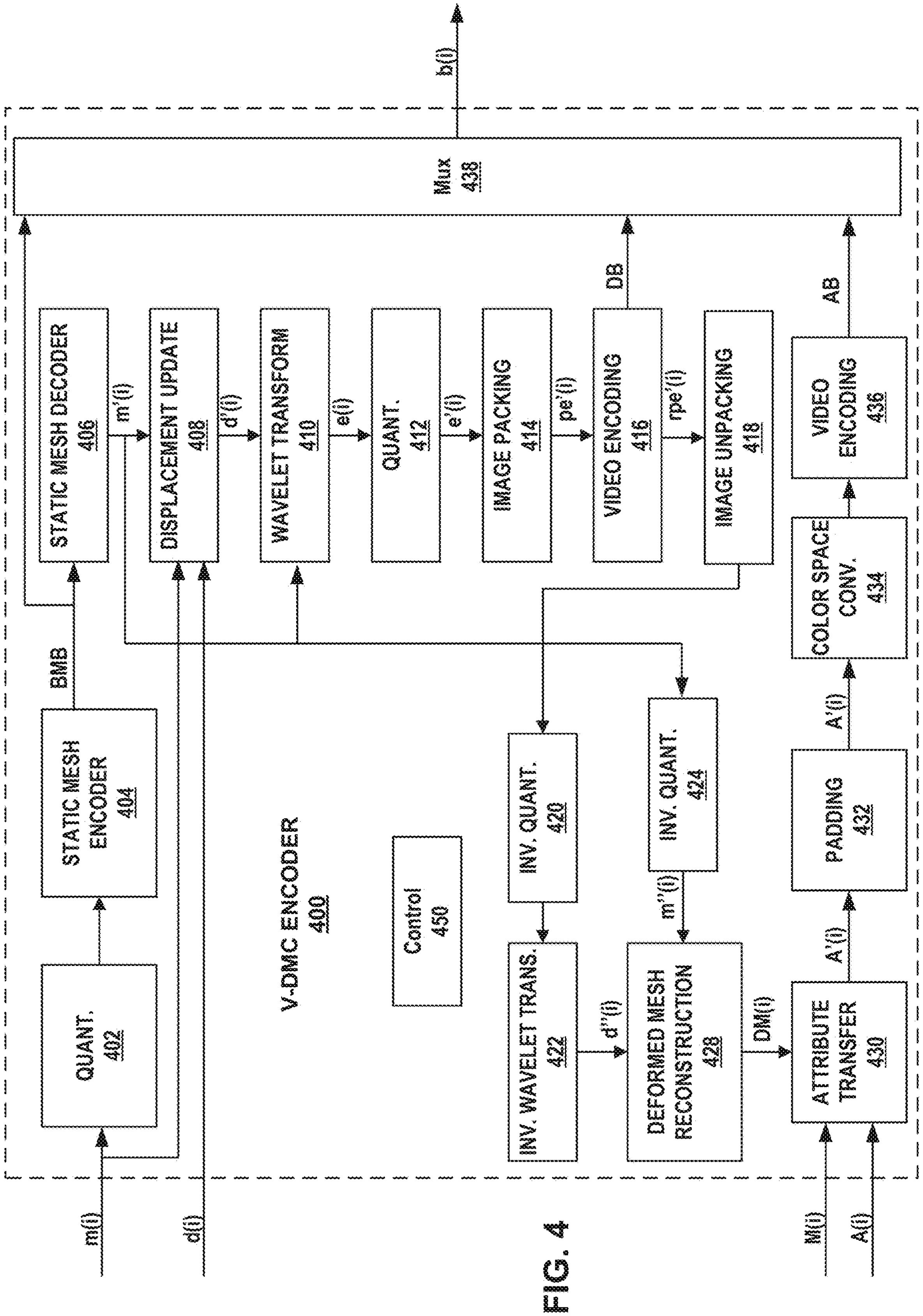
FIG. 4 shows an example implementation of an intra-mode encoder for V-DMC.

Base mesh encoder 212 is represented as Static Mesh Encoder in FIG. 4 and employs an implementation of the Edgebreaker algorithm for encoding the base mesh where the connectivity is encoded using a CLERS op code, and the residual of the attribute is encoded using prediction schemes from the previously encoded/decoded vertices. Examples of the Edgebreaker algorithm is described in Jean-Eudes Marvie, Olivier Mocquard, [V-DMC][EE4.4] An efficient Edgebreaker implementation, ISO/IEC JTC1/SC29/WG7, m63344, April 2023 and Jean-Eudes Marvie, Olivier Mocquard, [V-DMC][EE4.4] An efficient reverse edge breaker mode for MEB, ISO/IEC JTC1/SC29/WG7, m65920, January 2024. Examples of the CLERS op code are described in J. Rossignac, "3D compression made simple: Edgebreaker with ZipandWrap on a corner-table," in Proceedings International Conference on Shape Modeling and Applications, Genova, Italy, 2001 and H. Lopes, G. Tavares, J. Rossignac, A. Szymczak and A. Safonova, "Edgebreaker: a simple compression for surfaces with handles.," in ACM Symposium on Solid Modeling and Applications, Saarbrucken, 2002.

Aspects of base mesh encoder 212 will now be described in more detail. One or more submeshes are input to base mesh encoder 212. Submeshes are generated by pre-processing unit 204. Submeshes are generated from original meshes by utilizing semantic segmentation. Each base mesh may include of one or more submeshes.

Base mesh encoder 212 may process connected components. Connected components include of a cluster of triangles that are connected by their neighbors. A submesh can have one or more connected components. Base mesh encoder 212 may encode one "connected component" at a time for connectivity and attributes encoding and then performs entropy encoding on all "connected components".

Base mesh encoder 212 defines and categorizes the input base mesh into the connectivity and attributes. The geometry and texture coordinates (UV coordinates) are categorized as attributes.

FIG. 3 shows an example implementation of V-DMC decoder 300. In the example of FIG. 3, V-DMC decoder 300 includes demultiplexer 304, atlas decoder 308, base mesh decoder 314, displacement decoder 316, video decoder 320, base mesh processing unit 324, displacement processing unit 328, mesh generation unit 332, and reconstruction unit 336.

Demultiplexer 304 separates the encoded bitstream into an atlas sub-bitstream, a base-mesh sub-bitstream, a displacement sub-bitstream, and a texture attribute sub-bitstream. Atlas decoder 308 decodes the atlas sub-bitstream to determine the atlas information to enable inverse reconstruction. Base mesh decoder 314 decodes the base mesh sub-bitstream, and base mesh processing unit 324 reconstructs the base mesh. Displacement decoder 316 decodes the displacement sub-bitstream, and displacement processing unit 328 reconstructs the displacement vectors. Mesh generation unit 332 modifies the base mesh based on the displacement vector to form a displaced mesh.

Video decoder 320 decodes the texture attribute sub-bitstream to determine the texture attribute map, and reconstruction unit 336 associates the texture attributes with the displaced mesh to form a reconstructed dynamic mesh.

Figure 5:
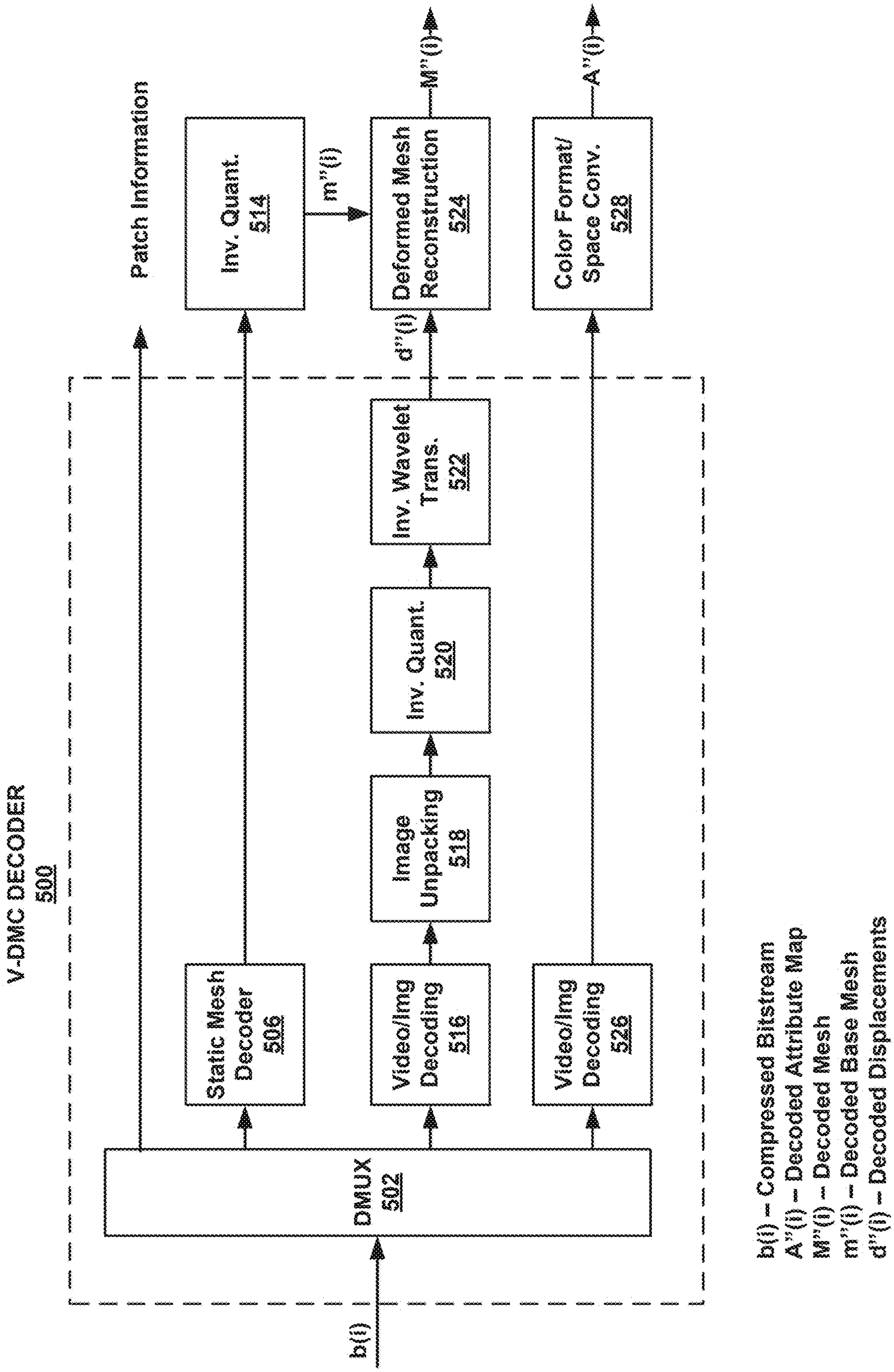
FIG. 5 shows an example implementation of an intra-mode decoder for V-DMC.

FIG. 4 shows intra-mode V-DMC encoder 400, and FIG. 5 shows an intra-mode V-DMC decoder 500. V-DMC encoder 400 generally represents a more detailed example implementation of V-DMC encoder 200, particularly with respect to intra-mode functionality, and V-DMC decoder 500 represents a more detailed example implementation of V-DMC decoder 300, particularly with respect to intra-mode functionality. FIG. 6 shows a V-DMC decoder 600, represents a more detailed example implementation of V-DMC decoder 300, particularly with respect to intra-mode and inter-mode functionality.

FIG. 4 includes the following abbreviations:

m(i)—Base mesh
d(i)—Displacements
m"(i)—Reconstructed Base Mesh
d"(i)—Reconstructed Displacements
A(i)—Attribute Map
A'(i)—Updated Attribute Map
M(i)—Static/Dynamic Mesh
DM(i)—Reconstructed Deformed Mesh
m'(i)—Reconstructed Quantized Base Mesh
d'(i)—Updated Displacements
e(i)—Wavelet Coefficients
e'(i)—Quantized Wavelet Coefficients
pe'(i)—Packed Quantized Wavelet Coefficients
rpe'(i)—Reconstructed Packed Quantized Wavelet Coefficients
AB—Compressed attribute bitstream
DB—Compressed displacement bitstream
BMB—Compressed base mesh bitstream V-DMC encoder 400 receives base mesh m(i) and displacements d(i), for example from a pre-processing system. V-DMC encoder 400 also retrieves mesh M(i) and attribute map A(i).

Quantization unit 402 quantizes the base mesh, and static mesh encoder 404 encodes the quantized based mesh to generate a compressed base mesh bitstream.

Displacement update unit 408 uses the reconstructed quantized base mesh m'(i) to update the displacement field d(i) to generate an updated displacement field d'(i). This process considers the differences between the reconstructed base mesh m'(i) and the original base mesh m(i). By exploiting the subdivision surface mesh structure, wavelet transform unit 410 applies a wavelet transform to d'(i) to generate a set of wavelet coefficients. The scheme is agnostic of the transform applied and may leverage any other transform, including the identity transform. Quantization unit 412 quantizes wavelet coefficients, and image packing unit 414 packs the quantized wavelet coefficients into a 2D image/video that can be compressed using a traditional image/video encoder in the same spirit as V-PCC to generate a displacement bitstream.

Attribute transfer unit 430 converts the original attribute map A(i) to an updated attribute map that corresponds to the reconstructed deformed mesh DM(i). Padding unit 432 pads the updated attributed map by, for example, filling patches of the frame that have empty samples with interpolated samples that may improve coding efficiency and reduce artifacts. Color space conversion unit 434 converts the attribute map into a different color space, and video encoding unit 436 encodes the updated attribute map in the new color space, using for example a video codec, to generate an attribute bitstream.

Multiplexer 438 combines the compressed attribute bitstream, compressed displacement bitstream, and compressed base mesh bitstream into a single compressed bitstream.

Image unpacking unit 418 and inverse quantization unit 420 apply image unpacking and inverse quantization to the reconstructed packed quantized wavelet coefficients generated by video encoding unit 416 to obtain the reconstructed version of the wavelet coefficients. Inverse wavelet transform unit 422 applies and inverse wavelet transform to the reconstructed wavelet coefficient to determine reconstructed displacements d"(i).

Inverse quantization unit 424 applies an inverse quantization to the reconstructed quantized base mesh m'(i) to obtain a reconstructed base mesh m"(i). Deformed mesh reconstruction unit 428 subdivides m"(i) and applies the reconstructed displacements d"(i) to its vertices to obtain the reconstructed deformed mesh DM(i).

Image unpacking unit 418, inverse quantization unit 420, inverse wavelet transform unit 422, and deformed mesh reconstruction unit 428 represent a displacement decoding loop. Inverse quantization unit 424 and deformed mesh reconstruction unit 428 represent a base mesh decoding loop. V-DMC encoder 400 includes the displacement decoding loop and the base mesh decoding loop so that V-DMC encoder 400 can make encoding decisions, such as determining an acceptable rate-distortion tradeoff, based on the same decoded mesh that a mesh decoder will generate, which may include distortion due to the quantization and transforms. V-DMC encoder 400 may also use decoded versions of the base mesh, reconstructed mesh, and displacements for encoding subsequent base meshes and displacements.

Control unit 450 generally represents the decision making functionality of V-DMC encoder 400. During an encoding process, control unit 450 may, for example, make determinations with respect to mode selection, rate allocation, quality control, and other such decisions.

FIG. 5 shows a block diagram of an intra decoder which may, for example, be part of V-DMC decoder 300. De-multiplexer (DMUX) 502 separates compressed bitstream (bi) into a mesh sub-stream, a displacement sub-stream for positions and potentially for each vertex attribute, zero or more attribute map sub-streams, and an atlas sub-stream containing patch information in the same manner as in V3C/V-PCC.

De-multiplexer 502 feeds the mesh sub-stream to static mesh decoder 506 to generate the reconstructed quantized base mesh m'(i). Inverse quantization unit 514 inverse quantizes the base mesh to determine the decoded base mesh m"(i). Video/image decoding unit 516 decodes the displacement sub-stream, and image unpacking unit 518 unpacks the image/video to determine quantized transform coefficients, e.g., wavelet coefficients. Inverse quantization unit 520 inverse quantizes the quantized transform coefficients to determine dequantized transform coefficients. Inverse transform unit 522 generates the decoded displacement field d"(i) by applying the inverse transform to the unquantized coefficients. Deformed mesh reconstruction unit 524 generates the final decoded mesh (M"(i)) by applying the reconstruction process to the decoded base mesh m"(i) and by adding the decoded displacement field d"(i). The attribute sub-stream is directly decoded by video/image decoding unit 526 to generate an attribute map A"(i). Color format/space conversion unit 528 may convert the attribute map into a different format or color space.

FIG. 6 shows V-DMC decoder 600, which may be configured to perform either intra- or inter-decoding. V-DMC decoder 600 represents an example implementation of V-DMC decoder 300. The processes described with respect to FIG. 6 may also be performed, in full or in part, by V-DMC encoder 200.

V-DMC decoder 600 includes demultiplexer (DMUX) 602, which receives compressed bitstream b(i) and separates the compressed bitstream into a base mesh bitstream (BMB), a displacement bitstream (DB), and an attribute bitstream (AB). Mode select unit 604 determines if the base mesh data is encoded in an intra mode or an inter mode. If the base mesh is encoded in an intra mode, then static mesh decoder 606 (also called base mesh decoder 606) decodes the mesh data without reliance on any previously decoded meshes. If the base mesh is encoded in an inter mode, then motion decoder 608 decodes motion, and base mesh reconstruction unit 610 applies the motion to an already decoded mesh (m"(j)) stored in mesh buffer 612 to determine a reconstructed quantized base mesh (m'(i))). Inverse quantization unit 614 applies an inverse quantization to the reconstructed quantized base mesh to determine a reconstructed base mesh (m"(i)).

Video decoder 616 decodes the displacement bitstream to determine a set or frame of quantized transform coefficients. Image unpacking unit 618 unpacks the quantized transform coefficients. For example, video decoder 616 may decode the quantized transform coefficients into a frame, where the quantized transform coefficients are organized into blocks with particular scanning orders. Image unpacking unit 618 converts the quantized transform coefficients from being organized in the frame into an ordered series. In some implementations, the quantized transform coefficients may be directly coded, using a context-based arithmetic coder for example, and unpacking may be unnecessary.

Regardless of whether the quantized transform coefficients are decoded directly or in a frame, inverse quantization unit 620 inverse quantizes, e.g., inverse scales, quantized transform coefficients to determine de-quantized transform coefficients. Inverse wavelet transform unit 622 applies an inverse transform to the de-quantized transform coefficients to determine a set of displacement vectors. Deformed mesh reconstruction unit 624 deforms the reconstructed base mesh using the decoded displacement vectors to determine a decoded mesh (M"(i)).

Video decoder 626 decodes the attribute bitstream to determine decoded attribute values (A'(i)), and color space conversion unit 628 converts the decoded attribute values into a desired color space to determine final attribute values (A"(i)). The final attribute values correspond to attributes, such as color or texture, for the vertices of the decoded mesh.

Figure 7:
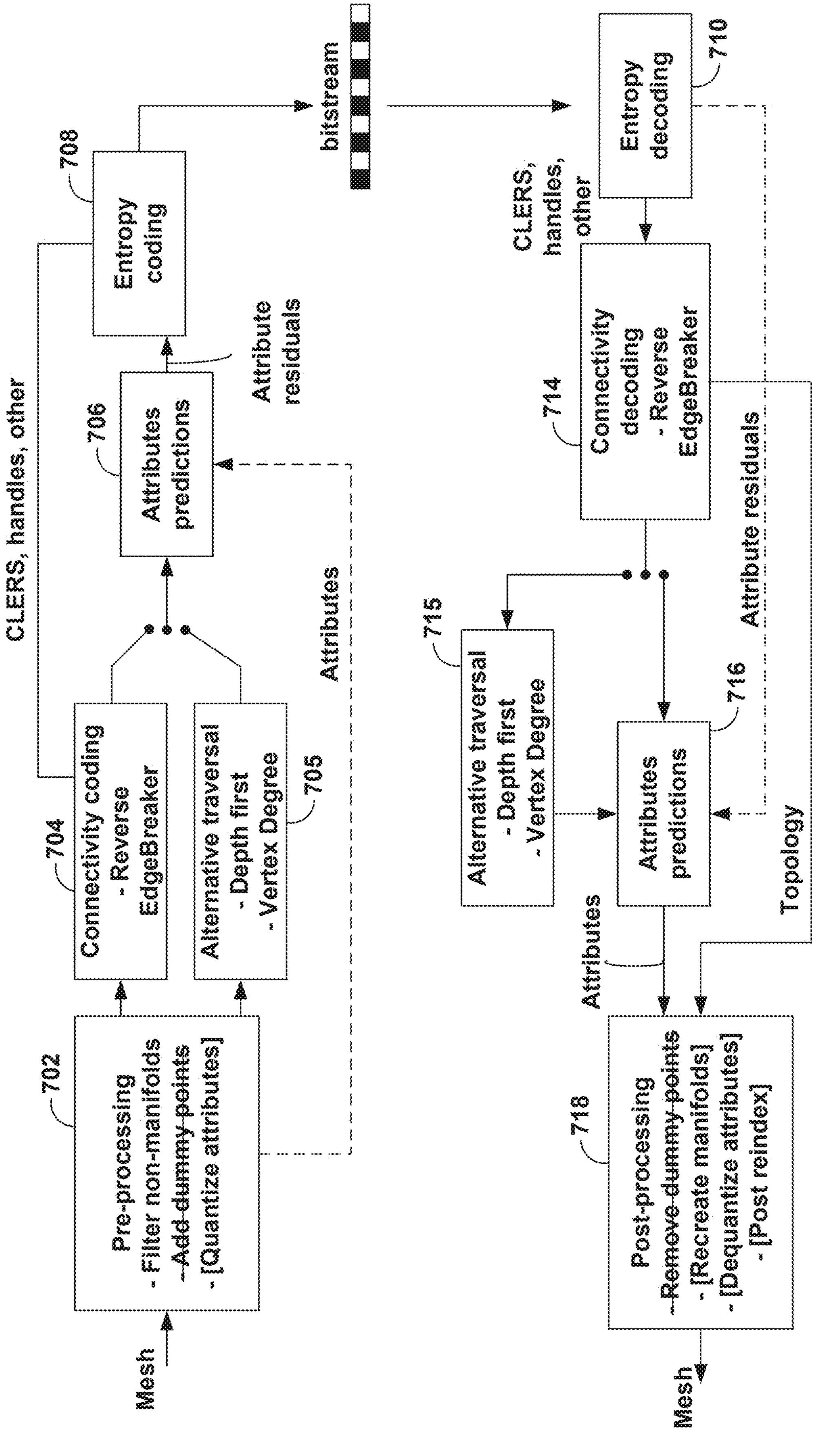
FIG. 7 shows an example implementation of a coding process for coding base mesh connectivity.

FIG. 7 is an overview of the complete Edgebreaker mesh codec. In FIG. 7, the top row is the encoding line, bottom row is the decoding line. FIG. 7 illustrates the end-to-end mesh codec based on Edgebreaker, which includes the following primary steps. The base mesh encoder defines and categorizes the input base mesh into the connectivity and attributes. The geometry and texture coordinates (UV coordinates) are categorized as attributes.

Encoding:

- Pre-processing (702): Initially, a pre-processing is performed to rectify potential connectivity issues in the input mesh, such as non-manifold edges and vertices. The EdgeBreaker algorithm employed may not operate with such connectivity problems. Addressing non-manifold issues may involve duplicating some vertices, which are tracked for later merging during decoding. This optimization reduces the number of points in the decoded mesh but necessitates additional information in the bitstream. Dummy points are also added in this pre-processing phase to fill potential surface holes, which EdgeBreaker does not handle. The holes are subsequently encoded by generating "virtual" dummy points by encoding dummy triangles attached to them, without requiring 3D position encoding. If needed, the vertex attributes are quantized in the pre-processing.
- Connectivity Encoding (704): Next, the mesh's connectivity is encoded using a modified Edgebreaker algorithm, generating a CLERS table along with other memory tables used for attribute prediction. An alternative traversal may be possible with depth first and vertex degree (705).
- Attribute Prediction (706): Vertex attributes are predicted, starting with geometry position attributes, and extending to other attributes, some of which may rely on position predictions, such as for texture UV coordinates.
- Bitstream Configuration (708): Finally, configuration and metadata are included in the bitstream. This includes the entropy coding of CLERS tables and attribute residuals.

Decoding:

- Entropy Decoding (710): The decoding process commences with the decoding of all entropy-coded sub-bitstreams.
- Connectivity Decoding (714): Mesh connectivity is reconstructed using the CLERS table and the Edgebreaker algorithm, with additional information to manage handles that describe topology.
- Attributes Predictions and Corrections (716), and possibly through alternative traversal (715): Vertex positions are predicted using the mesh connectivity and a minimal set of 3D coordinates. Subsequently, attribute residuals are applied to correct the predictions and obtain the final vertex positions. Other attributes are then decoded, potentially relying on the previously decoded positions, as is the case with UV coordinates. The connectivity of attributes using separate index tables is reconstructed using binary seam information that is entropy coded on a per-edge basis.
- Post-processing (718): In a post-processing stage, dummy triangles are removed. Optionally, non-manifold issues are recreated if the codec is configured for lossless coding. Vertex attributes are also optionally dequantized if they were quantized during encoding.

Figure 8:
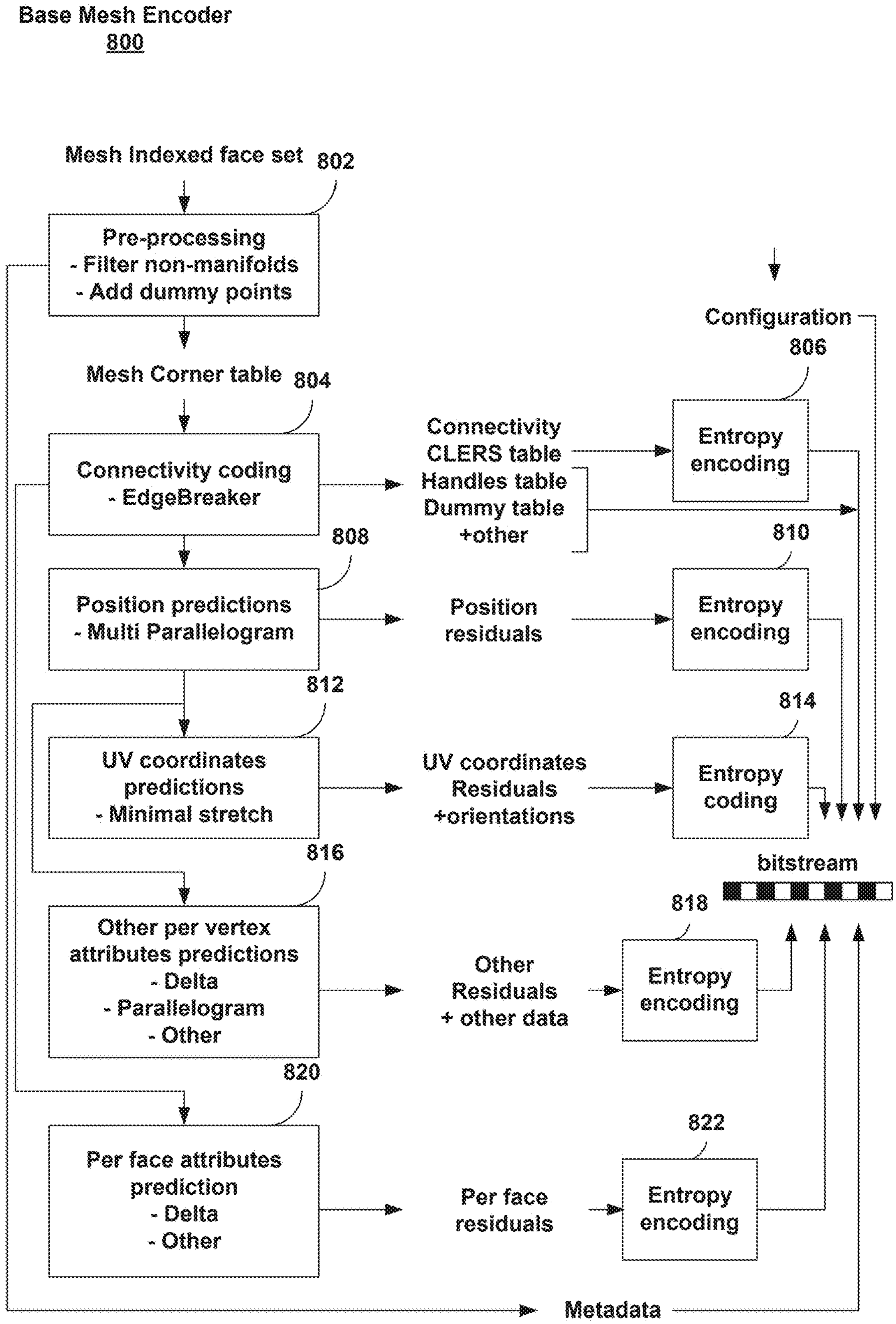
FIG. 8 shows an example implementation of a base mesh encoder.
Figure 9:
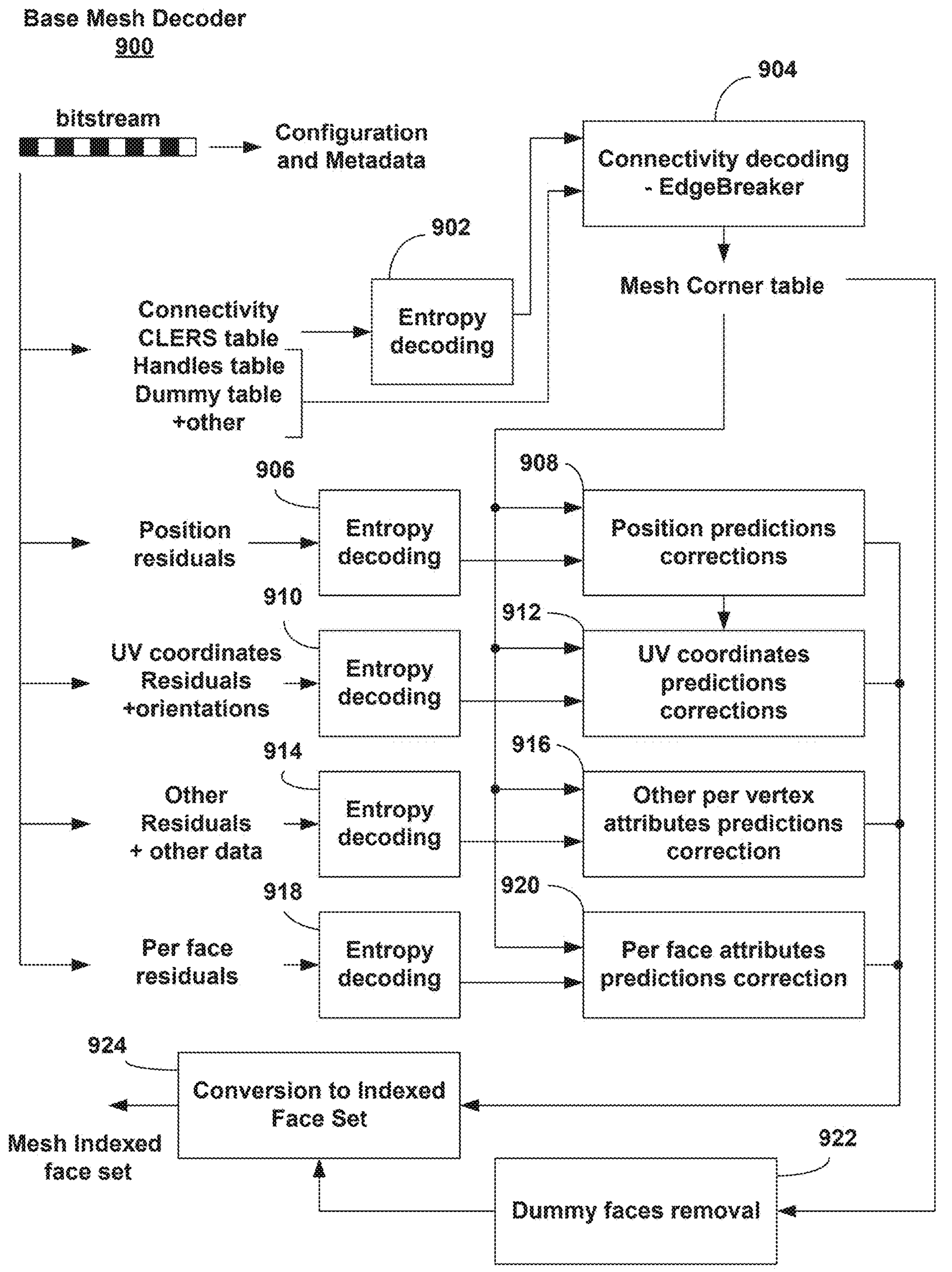
FIG. 9 shows an example implementation of a base mesh decoder.

The encoder and decoder are further illustrated in FIG. 8 and FIG. 9, respectively. A detailed description of Edgebreaker tool in V-DMC can be found in m63344 for V-DMC v6.0. This was further improved to reverse edgebreaker in m65920 for V-DMC v7.0. FIG. 8 shows base mesh encoder 800, which represents an example implementation of base mesh encoder 212. FIG. 9 shows base mesh decoder 900, which represents an example implementation of base mesh decoder 314.

In FIG. 8, base mesh encoder 800 may start with mesh indexed face set that are pre-processed (802) to generate mesh corner table. The metadata may be generated as part of the pre-processing (802) and/or as information that is to be signaled directly to the decoder.

Base mesh encoder 800 may perform connective coding (e.g., using Edgebreaker) to generate connectivity CLERS tables (804), which are then entropy encoded (806). Base mesh encoder 800 may perform position predictions (808) to generate position residuals, which are then entropy encoded (810). Base mesh encoder 800 may generate UV coordinates predictions for texture coordinates (812) to generate UV coordinates residuals, which are then entropy encoded (814). Base mesh encoder 800 may perform predictions for other attributes (816) to generate other residual data, which are then entropy encoded (818). Base mesh encoder 800 may perform per-face attributes prediction (820) to generate per-face residuals, which are then entropy encoded (822). The result of the entropy encoding may be a bitstream that then transmitted.

Base mesh decoder 900 of FIG. 9 may perform the reciprocal of base mesh encoder 800 of FIG. 8. For example, base mesh decoder 900 may receive encoded connectivity CLERS tables, which are then entropy decoded (902) so that connective decoding can be performed (904) to generate mesh corner table. Base mesh decoder 900 may entropy decode (906) position residuals to generate position predictions corrections (908). Base mesh decoder 900 may entropy decode (910) UV coordinates residuals to generate UV coordinates predictions corrections (912). Base mesh decoder 900 may entropy decode (914) other residuals to generate other per-vertex attributes predictions correction (916). Base mesh decoder 900 may entropy decode (918) per-face residuals to generate per-face attributes predictions corrections (920). Base mesh decoder 900 may perform dummy faces removal (922) and generate mesh indexed face set based on conversion to indexed face set (924).

Accordingly, base mesh encoder 800/edgebreaker encodes the attributes by encoding the residual of the attribute using a prediction scheme from the previously encoded/decoded vertices. One implementation of base mesh encoder (TMM v7.0) does not support normal encoding (e.g., normal vector encoding). Some techniques, such as those of U.S. application Ser. No. 19/018,955, integrate per-vertex normal encoding with the base mesh encoder (TMM v6.0). In accordance with one or more examples described in this disclosure, the normal encoding is moved to TMM v7.0 and the examples include an octahedral representation for normals which converts the 3D normals to a 2D representation. This 2D representation greatly decreases the size of the normals making it simpler to compress. The techniques also integrate and propose normal prediction schemes that now work with 2D octahedral representation of normals, which further improve the results.

The data representation for base mesh coding will now be described. The Edgebreaker algorithm utilizes the corner table data representation, a concept initially introduced by Rossignac to enhance the efficiency of the Edgebreaker algorithm, as described in J. Rossignac, "3D compression made simple: Edgebreaker with ZipandWrap on a corner-table," in Proceedings International Conference on Shape Modeling and Applications, Genova, Italy, 2001. A comprehensive overview of the properties of the corner table (CT) can be found in J. Rossigniac, "Course on triangle meshes and corner table," 2006. [Online]. Available: https://faculty.cc.gatech.edu/~jarek/courses/handouts/meshes.pdf.

The corner table, as initially described in Rossignac, is illustrated in FIGS. 10A-10F. It includes two key tables: one for vertex indices (V) and another for opposite corners (O), often referred to as an OV table. Furthermore, a third table is used to store the precise positions of each vertex, with these vertices being referenced by the V table. FIGS. 10C-10F show an example of a corner table data structure for triangle meshes, also described in more detail below.

Figure 11A:
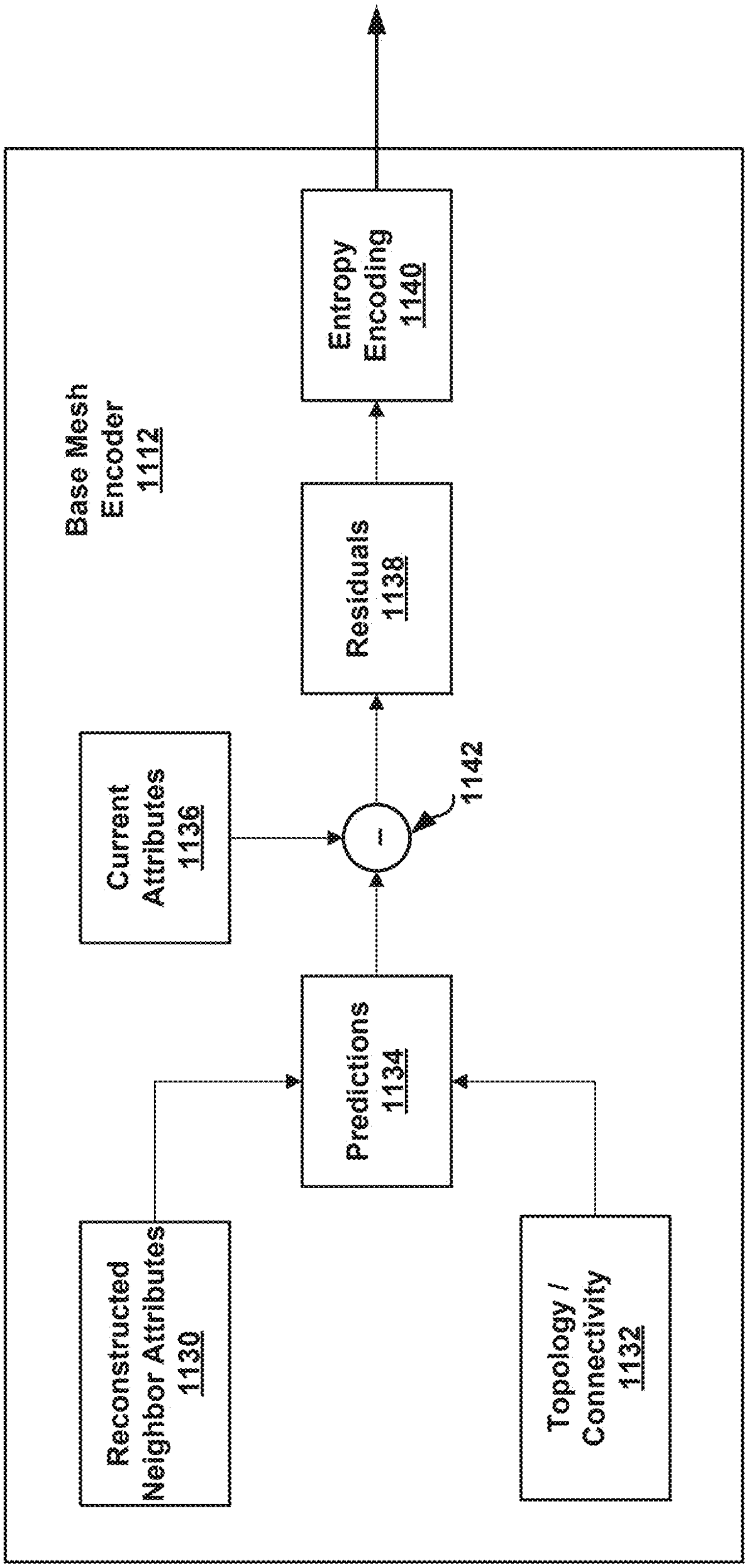
FIG. 11A shows an example implementations of a base mesh encoder.
Figure 11B:
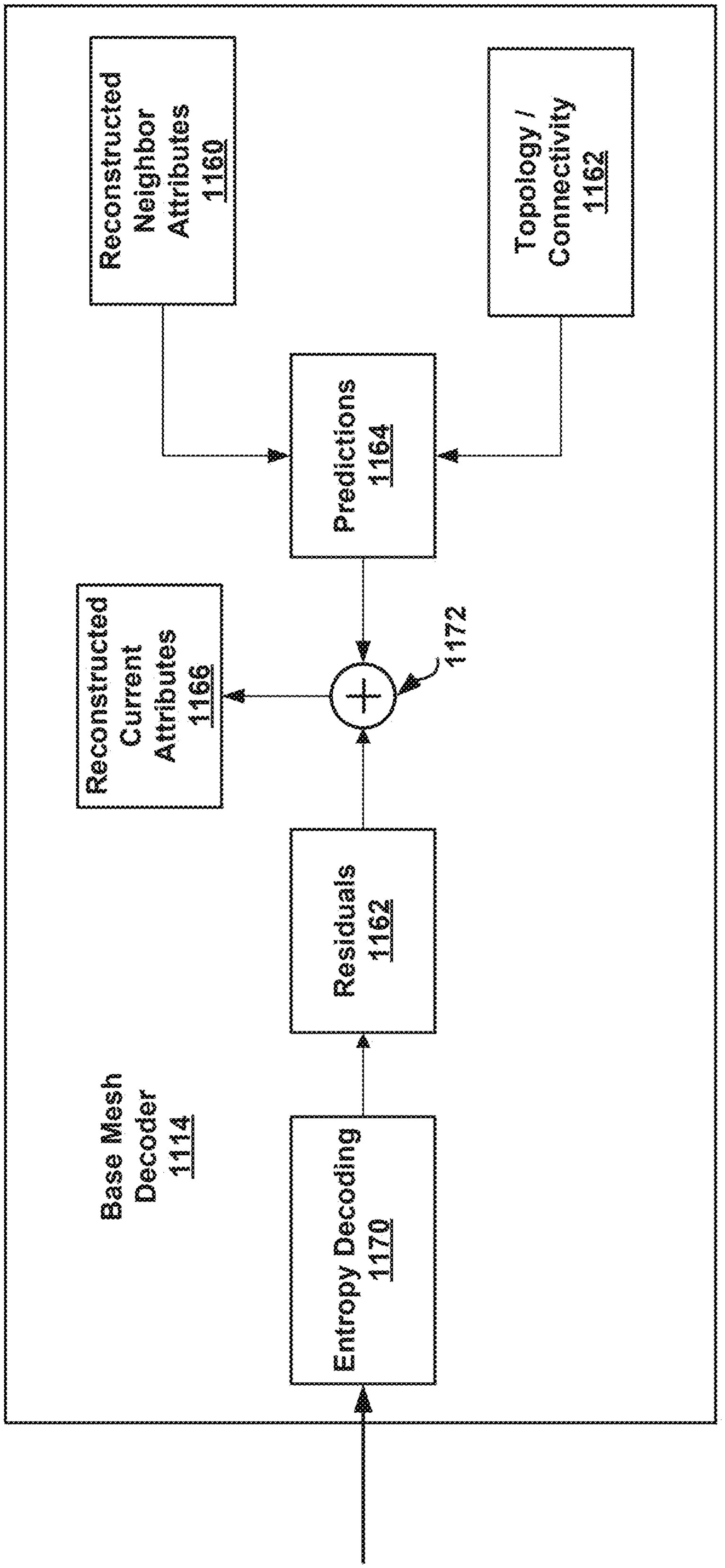
FIG. 11B shows an example implementations of a base mesh decoder.

The following describes attribute coding in basemesh. FIGS. 11A and 11B show the encoder and decoder architecture for attribute encoding/decoding within the base mesh encoder (also referred to as static mesh encoder and/or edgebreaker).

The base mesh encoder encodes both the attributes and the connectivity of the triangles and vertices. The attributes are typically encoded using a prediction scheme to predict the vertex attribute using previously visited/encoded/decoded vertices. Then the prediction is subtracted from the actual attribute value to obtain the residual. Finally, the residual attribute value is entropy encoded using an entropy encoder to obtain the encoded base mesh attribute bitstream. The attribute bitstream which contains vertex attribute usually has the geometry/position attribute and the UV coordinates (texture attribute) but can contain any number of attributes like normals, per vertex RGB values, etc.

The attribute encoding procedure in the base mesh encoder is shown in FIG. 11A and includes:

Topology/Connectivity: The topology in the base mesh is encoded through the edgebreaker using the CLERS op code. This contains not just the connectivity information but also the data structure for the mesh (current implementation employs corner table). The topology/connectivity information is employed to find the neighboring vertices.

Attributes: These include Geometry (3D coordinates), UV Coordinates (Texture), Normals, RGB values, etc.

Neighboring attributes: These are the attributes of the neighboring vertices that are employed to predict the current vertex's attribute.

Current Attributes: This is the attribute of the current vertex. The predicted attribute is subtracted from the current vertex attribute to obtain the residuals.

Predictions. These predictions may be obtained from the connectivity and/or from the previously visited/encoded/decoded vertices. E.g., multi-parallelogram process for geometry, min stretch scheme for UV coordinates, etc.

Residuals. These are obtained by subtracting the predictions from original attributes (e.g., residuals=current_vertex_attribute−predicted_attribute).

Entropy Encoding. Finally, the Residuals are entropy encoded to obtain the bitstream.

FIGS. 11A and 11B show an encoder and decoder architecture for base mesh encoding/decoding (also referred to as static mesh encoding/decoding). FIG. 11A shows base mesh encoder 1112, which represents an example implementation of base mesh encoder 212 in FIG. 2, and FIG. 11B shows base mesh decoder 1114, which represents an example implementation of base mesh decoder 314 in FIG. 3.

In the example of FIG. 11A, base mesh encoder 1112 determines reconstructed neighbor attributes 1130 and topology/connectivity information 1132 to determine predictions 1134. Base mesh encoder 1112 subtracts (1142) predictions 1134 from current attributes 1136 to determine residuals 1138. Reconstructed neighbor attributes 1130 represent the decoded values of already encoded vertex attributes, and current attributes 1136 represent the actual values of unencoded vertex attributes. Thus, residuals 1138 represent the differences between actual values of unencoded vertex attributes and predicted values for those vertex attributes. Base mesh encoder 1112 may entropy encode (1140) residuals 1138.

In the example of FIG. 11B, base mesh decoder 1114 determines reconstructed neighbor attributes 1160 and topology/connectivity information 1162 to determine predictions 1164 in the same manner that base mesh encoder 1112 determines predictions 1134. Base mesh decoder 1114 entropy decodes (1170) the entropy encoded residual values to determine residuals 1168. Base mesh decoder 1114 adds (1172) predictions 1164 to residuals 1168 to determine reconstructed current attributes 1166. Reconstructed current attributes 1166 represent the decoded versions of current attributes 1136.

Attribute coding uses a prediction scheme to find the residuals between the predicted and actual attributes. Finally, the residuals are entropy encoded into a base mesh attribute bitstream. Each vertex attribute is encoded differently. The geometry for 3D position and the UV coordinates for the texture are both encoded using prediction processes. To compute these predictions, the multi-parallelogram technique is utilized for geometry encoding, as described in D. Cohen-Or, R. Cohen and R. Irony., "Multi-way geometry encoding.," The School of Computer Science, Tel-Aviv University, Tel-Aviv, 2002, and M. Isenburg and P. Alliez, "Compressing polygon mesh geometry with parallelogram prediction," IEEE Visualization, no. doi: 10.1109/VISUAL.2002.1183768, pp. 141-146, 2002, while the min stretch process is employed for UV coordinates encoding, as described in I. M. and S. J., "Compressing Texture Coordinates with Selective Linear Predictions," in Computer Graphics International, Tokyo, Japan, 2003.

Figure 10A:
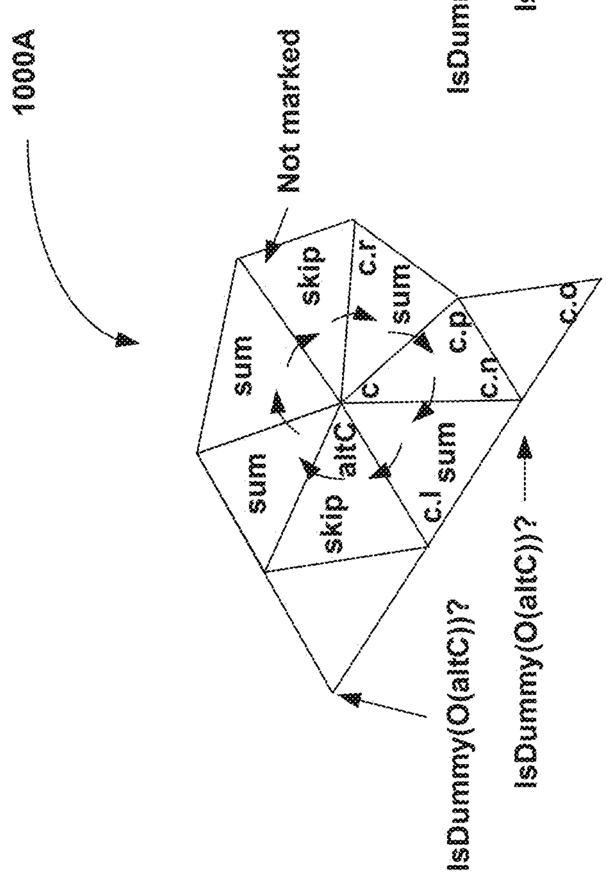
FIG. 10A shows an example of multi parallelogram prediction.
Figure 10B:
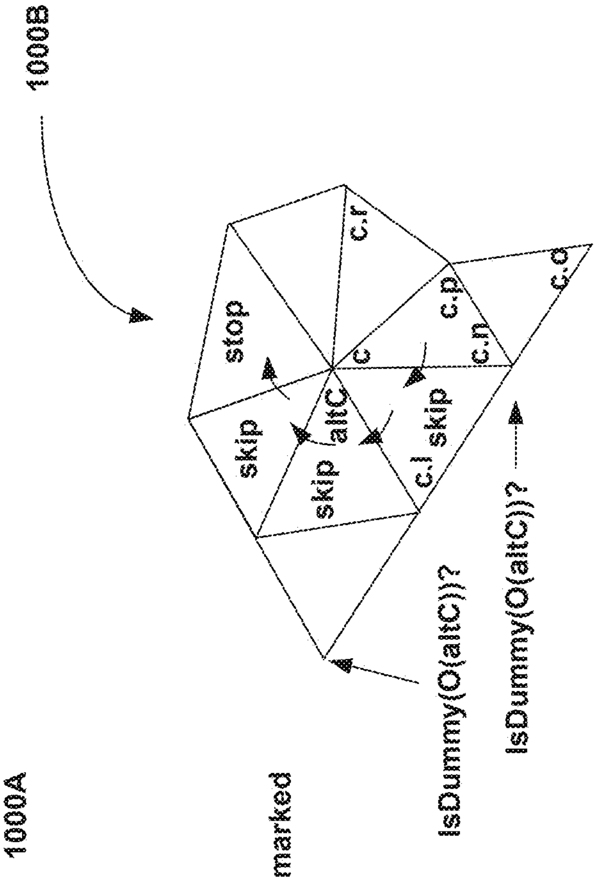
FIG. 10B shows an example of min stretch prediction.

The process of calculating position predictions for a corner and its associated vertex index within the coding chain is outlined in FIGS. 10A and 10B. FIGS. 10A and 10B shows both the multi-parallelogram 1000A and 1000B, respectively, approach for geometry and the min stretch technique for UV coordinates (texture). During the prediction of a vertex attributes, the triangle fan surrounding the vertex can be utilized to predict the current vertex's or current face's attributes. The current face may be one of a polygon, such as one of the triangles.

FIG. 10A shows a strategy for multi parallelogram prediction of corner c positions and dummy points filtering. FIG. 10B shows a strategy for min stretch prediction of corner c UV coordinates and dummy points filtering, as described in m63344.

For position prediction, multi-parallelogram is employed. The processing of the multi-parallelogram for a given corner involves performing a lookup all around its vertex to calculate and aggregate each parallelogram prediction, utilizing opposite corners, as shown in FIGS. 10A and 10B. A parallelogram used to predict a corner from a sibling corner is considered valid for prediction only if the vertices of the corner itself, the sibling corner, and their shared vertex have been previously processed by the connectivity recursion, which triggers the prediction. To verify this condition, the vertex marking table (designated as M) is employed. This table contains elements set to true for vertices that have already been visited by the connectivity encoding loop. In the parallelogram prediction, the parallelogram moves in an anti-clockwise (or clockwise) direction by swinging around the "triangle fan." If in a parallelogram, the next, previous, and opposite vertices are available, then that parallelogram (and the three other vertices) is used to predict the current vertices' position.

At the end of the loop, the sum of predictions is divided by the number of valid parallelograms that have been identified. The result is rounded and subsequently used to compute the residual (position-predicted), which is appended to the end of the output vertices table. In cases where no valid parallelogram is found, a fallback to delta coding is employed.

For UV coordinate predictions, min-stretch prediction is employed. For encoding predictions of UV coordinates, the procedure follows a similar extension to that used for positions. One possible distinction lies in the utilization of the min stretch approach rather than multi-parallelogram for prediction. Additionally, predictions are not summed up; instead, the process halts at the first valid (in terms of prediction) neighbor within the triangle fan, and the min stretch is computed, as depicted in FIGS. 10A and 10B.

The V-DMC tool has also added support for multiple attributes where a mesh can have more than one texture map. Similarly, base mesh encoder also has support added for separate index for UV coordinates. In this case the UV Coordinates do not have to be in the same order as the position (primary attribute).

In FIGS. 10A-10F, c is the current corner, c.n is the next corner, c.p is the previous corner and c.o is the opposite corner, as illustrated in FIG. 10C. FIG. 10D illustrates table of corners "c" for the triangles illustrated in FIG. 10E. For instance, in FIG. 10E, the three corners of each triangle are made consecutive and listed according to orientation of triangles. The access to triangle ID may be INT (c/3), where c.n=3c.t+(c+1) MOD, c.p=c.n.n, c.1=c.p.o, and c.r=c.n.o. In FIG. 10D, for each corner "c", the following is stored: c.v: integer reference in first column to vertex table illustrated in FIG. 10F, and c.o: integer reference in second column to opposite corner. In some examples, c.o may be derived from c.v.

The following describes "normal vectors" or "normals." The normal vector often simply called the "normal," to a surface is a vector which is perpendicular to the surface at a given point. For a mesh, a normal can be a per vertex-normal or a per-face normal. The normal for a vertex or a face is sometimes provided as a "unit vector" that is normalized. These normals are typically in cartesian coordinates expressed with (x,y,z), and some techniques utilized cartesian coordinates (x,y,z) to encode the normal. However, it may be possible to parameterize the 3D normals onto a 2D coordinate system to decrease the amount of data required to represent a normal.

Figure 12:
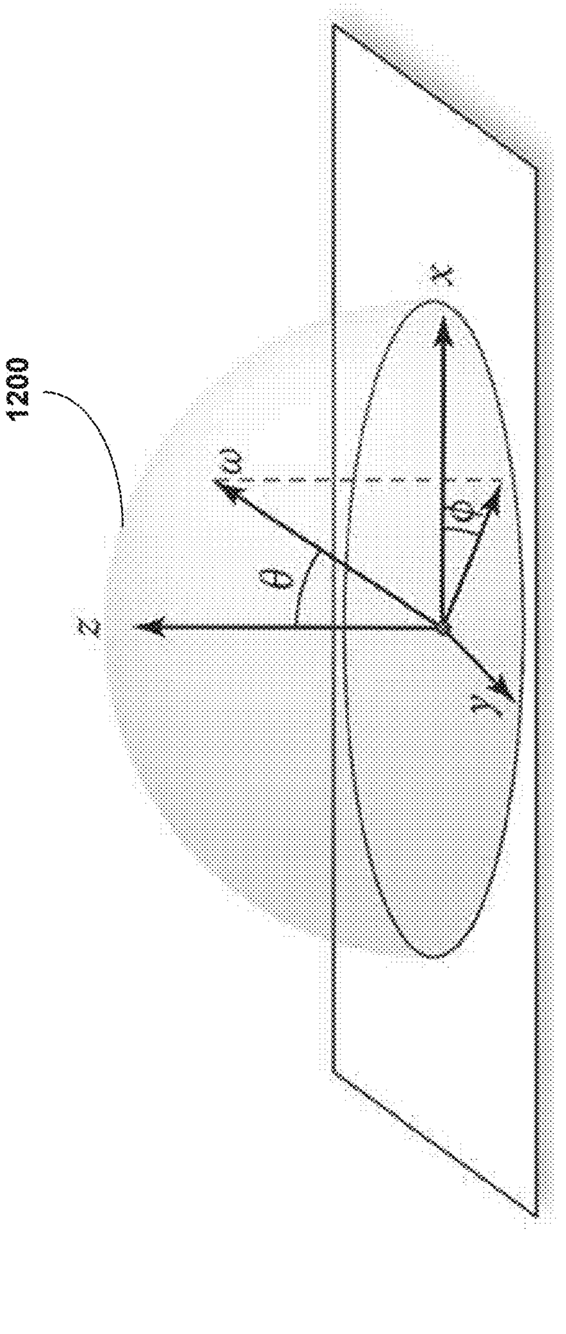
FIG. 12 is a conceptual diagram illustrating an example of spherical coordinates where a direction can be written in terms of spherical coordinates.
Figure 13A:
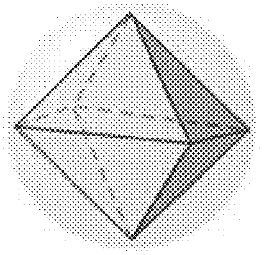
FIGS. 13A-13D and FIG. 14 show how a 3D unit vector can be converted to a 2D octahedral representation.
Figure 13B:
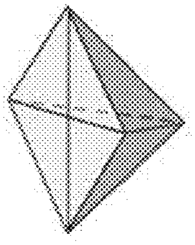
Figure 13C:
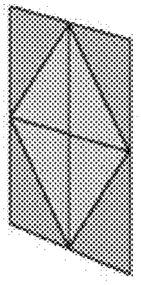
Figure 13D:
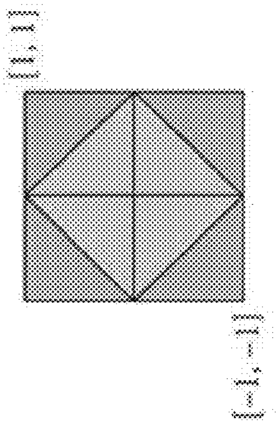

The following describes techniques using spherical coordinates. FIG. 12 is a conceptual diagram illustrating an example of spherical coordinates where a direction can be written in terms of spherical coordinates.

Spherical coordinates are a well-known parameterization of the sphere 1200. For a general sphere of radius r, the spherical coordinates are related to Cartesian coordinates as follows:

$$x = r\sin\theta\cos\phi$$

$$y = r\sin\theta\sin\phi$$

$$z = r\cos\theta$$

Parameterizing the sphere with spherical coordinates corresponds to the equirectangular mapping of the sphere. It is not a particularly good parameterization for representing regularly sampled data on the sphere due to substantial distortion at the sphere's poles.

The following describes octahedral representation. While storing cartesian coordinates in float vector representation is convenient for computing with unit vectors, it falls short in terms of storage efficiency. Not only does it consume large bytes of memory, but it can also represent 3D direction vectors of arbitrary lengths. Normalized vectors are a small subset of all the possible 3D direction vectors and hence can be represented by a smaller representation.

An alternative approach is to use spherical coordinates. By doing so, it may be possible to reduce the required storage to just two floats. However, this comes with a trade-off: converting between 3D cartesian and spherical coordinates involves relatively expensive trigonometric and inverse trigonometric functions. Additionally, spherical coordinates offer more precision near the poles and less near the equator, which may not be ideal for uniformly distributed unit vectors.

Octahedral representation may address some of these issues. Octahedral representation provides a compact storage format for unit vectors, distributing precision evenly across all directions. It uses less memory per unit vector, and all possible values correspond to valid unit vector. Octahedral is an attractive choice for in-memory storage of normalized vectors due to its easy conversion to and from 3D cartesian coordinate vectors.

Figure 14:
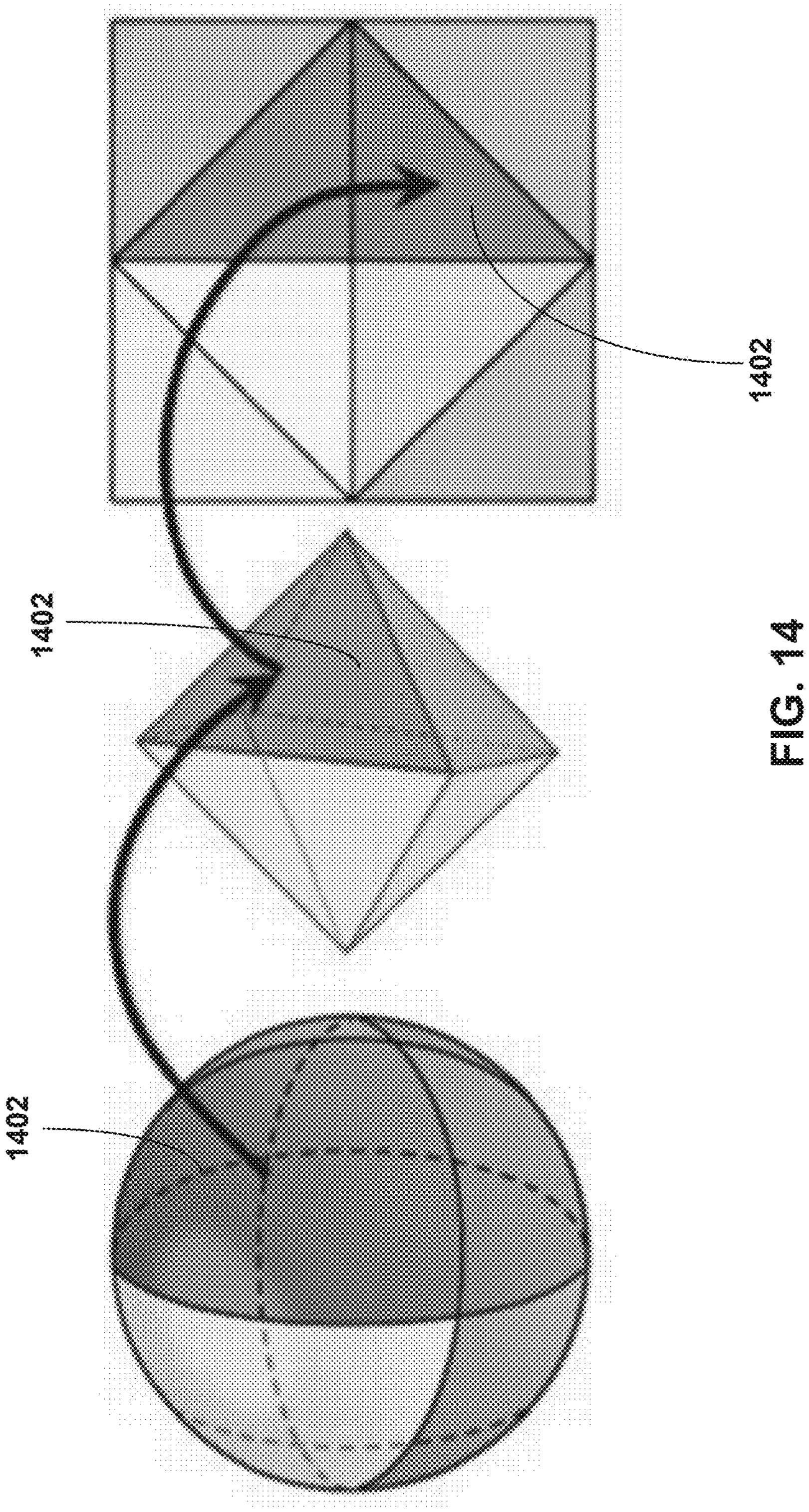

FIGS. 13A-13D and FIG. 14 show how a 3D unit vector can be converted to a 2D octahedral representation. The algorithm to convert a unit vector to this representation may not require computation bandwidth. The first step is to project the vector onto the faces of the 3D octahedron; this can be done by dividing the vector components by the vector's L1 norm. For points in the upper hemisphere (i.e., with z>0), projection down to the z=0 plane then just requires taking the x and y components directly. For directions in the lower hemisphere, the reprojection to the appropriate point in [−1, +1]^2 is slightly more complex. The negative z-hemisphere is reflected over the appropriate diagonal as shown in FIG. 14. This way the result may be with 3D unit points within a [−1, +1]^2 square as shown in FIGS. 13A-13D.

For instance, assume that the 3D vector is a unit vector with coordinates (x, y, z). The initial 2D coordinates (a, b) may be determined by projected the normal vector onto the octahedral plane with using the following:

$$a = x/(\text{abs}(x) + \text{abs}(y) + \text{abs}(z))$$

$$b = y/(\text{abs}(x) + \text{abs}(y) + \text{abs}(z))$$

If z is less than 0, then the vector is in the lower hemisphere and should be folded to ensure unique mapping, where:

$$a' = (1 - \text{abs}(b)) * \text{sign}(a)$$

$$b' = (1 - \text{abs}(a)) * \text{sign}(b).$$

In this example, (a', b') represent the 2D octahedral representation of the 3D normal vector.

To convert back from 2D octahedral representation to 3D normal vector, the following operations may be used. If the 2D octahedral representation has coordinates of (a', b'), then for the 3D normal vector, with coordinates (x, y, z), x=a', y=b', and z=1−abs (x)−abs (y). If z<0, then x'=(1−abs(y)) *sign(x) and y'=(1−abs(x))*sign(y). The resulting (x', y', z) coordinates may be re-normalized to a unit length.

Some encoding schemes employ 2D octahedral representation for normals. The code for techniques using octahedral, in accordance with one or more examples, is also described with various figures below.

The following describes example techniques in accordance with one or more examples. Static Mesh encoder employs edgebreaker to encode the connectivity/topology of the base mesh and encodes the base mesh attributes (position, UV coordinates) using a prediction scheme as shown in FIG. 11A.

To add a new attribute to the base mesh, this disclosure describes a prediction scheme used for octahedral techniques but that may follow the same method as shown in FIGS. 10A-10F. However, methods other than FIGS. 10A-10F are possible.

Figure 15:
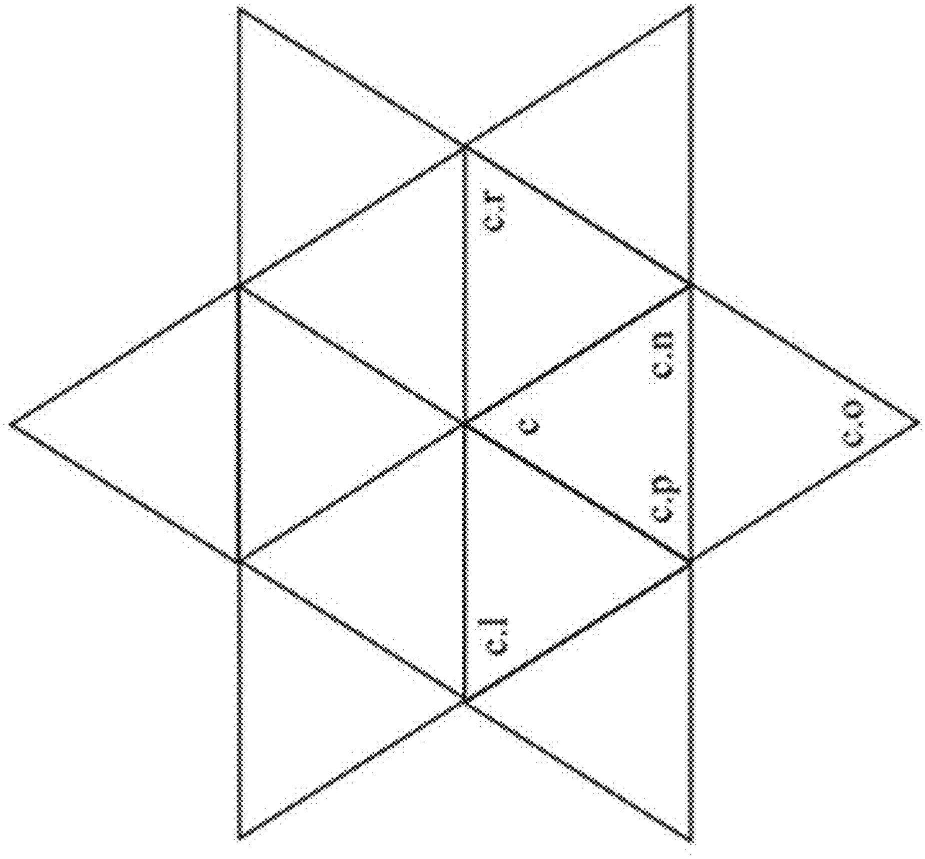
FIG. 15 shows an example of a corner table data structure for triangle meshes.

This disclosure describes one or more examples of employing 2D octahedral representation of normals and employing normal prediction schemes inside the static mesh encoder for normal attribute encoding. The prediction schemes may be used by the other attributes: min stretch prediction for UV coordinates (texture) and multi-parallelogram for position. Both these prediction schemes may employ the corner table representation shown in FIGS. 10C-10F and FIG. 15. FIG. 15 shows a fan around the current vertex whose attributes are to be predicted. c is the corner on the current vertex.

The example techniques described in the disclosure may also employ the edge breaker's default corner table data representation. c is the current corner, c.p is the previous corner, c.n is the next corner, c.o is the opposite corner, c.r is the right corner, and c.l is the left corner. The values of the vertices of these corners can be employed to predict the current corner's vertex attribute.

The example techniques are described with aspects. The example aspects may be performed separately or together.

The following describes 2D representation of Normals. A first aspect of this disclosure includes employing Octahedral representation to encode normals. The normal of a mesh are typically normalized and may be converted to a smaller representation such as a 2D Octahedral representation. Octahedral representation is explained in detail above. Example code of implementation of octahedral is shown in FIG. 22-28.

The following describes architecture with octahedral encoding. The Attribute Encoding Architecture in the current V-DMC Basemesh encoder is shown in FIG. 11A.

Figure 16:
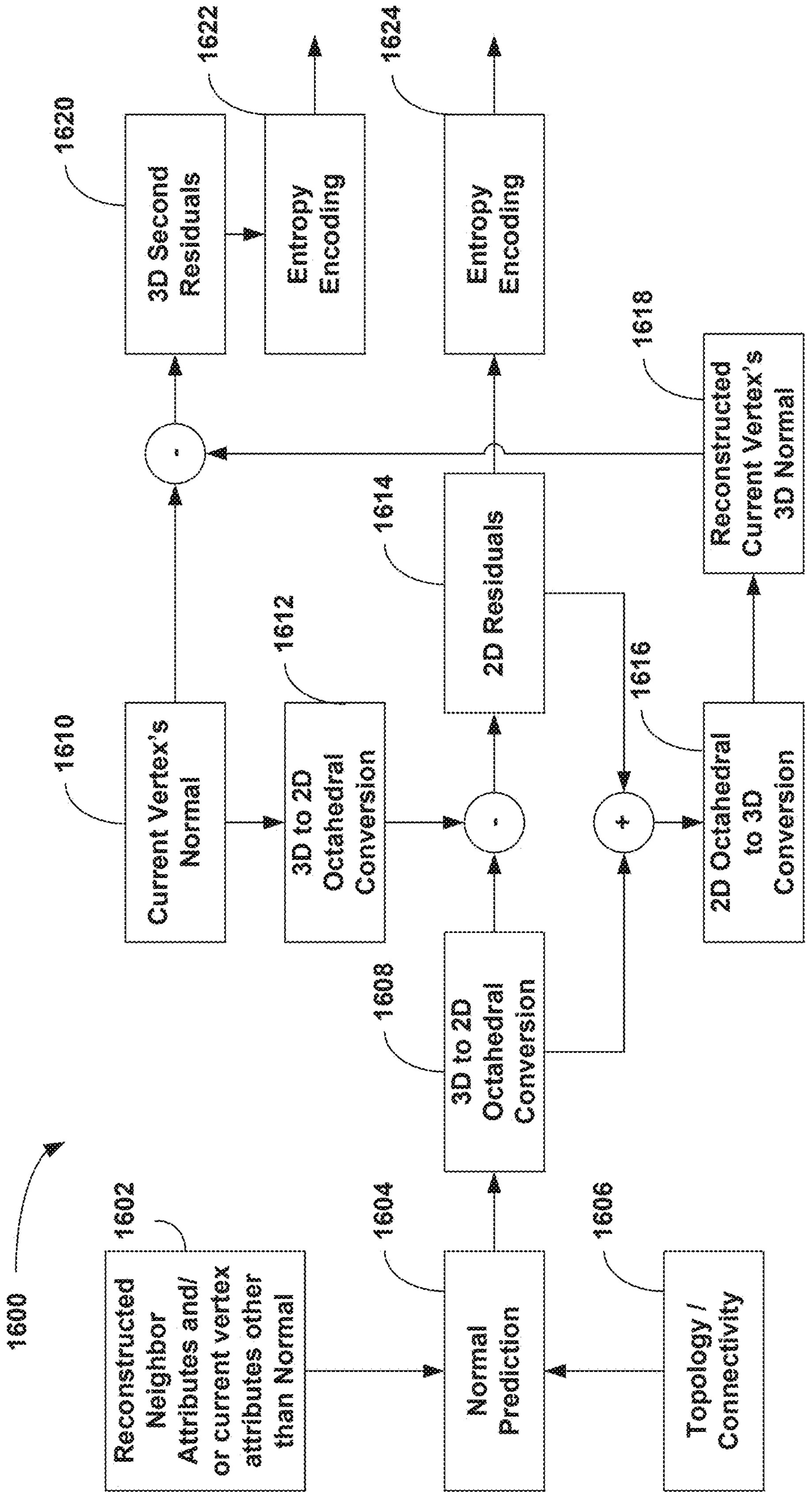
FIG. 16 is an example of an encoder of octahedral representation.
Figure 17:
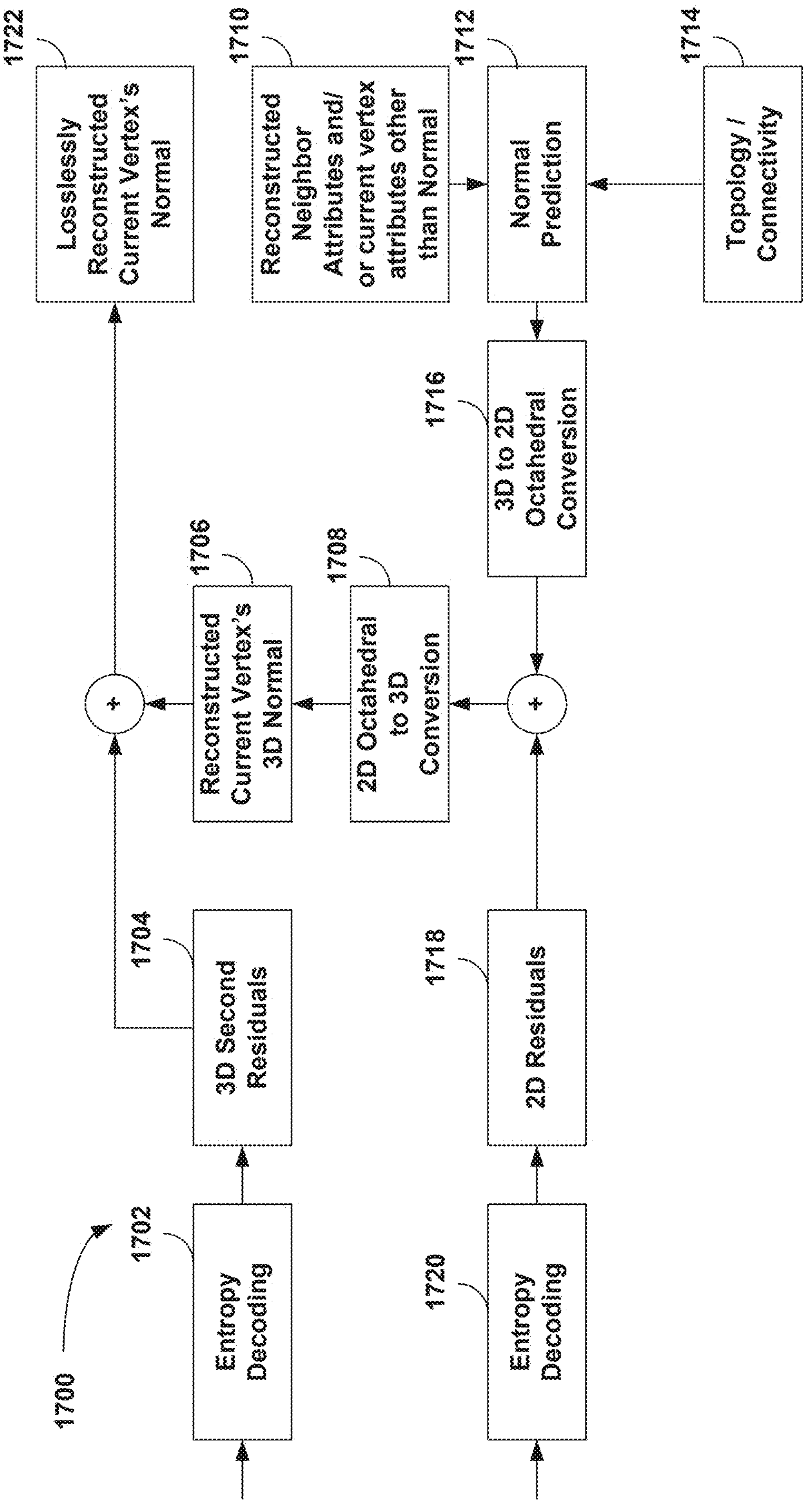
FIG. 17 is an example of a decoder of octahedral representation.

In a second aspect, with the addition of octahedral representation the architecture changes to FIGS. 11A and 11B are shown in FIGS. 16 and 17 and follows these techniques.

For instance, FIG. 16 illustrates base mesh encoder 1600, and FIG. 17 illustrates base mesh decoder 1700. As described in more detail, base mesh encoder 1600 and base mesh decoder 1700 may be configured to determine a 2D octahedral representation of a prediction vector for predicting a 2D octahedral representation of a 3D normal vector of a current vertex of the base mesh, and encode or decode the 3D normal vector of the current vertex based on the 2D octahedral representation of the prediction vector. Although the examples are described with respect to a current vertex, the examples are also applicable to a current face. The current face may be a polygon (e.g., triangle), where the interconnection of the polygons form the base mesh, and 3D normal vector for the current face may extend from a point on the current face (e.g., midpoint).

For example, base mesh encoder 1600 may determine one or more 3D normal vectors of previously encoded vertices of the base mesh, or determine one or more attributes, excluding normal vectors, of previously encoded vertices of the base mesh. For instance, the current vertex's normal is predicted using a normal prediction scheme that employs the topology/connectivity of the triangles (1606), the attributes of the neighboring vertices (1602), and the attributes other than normal vector of the current vertex (1602).

Base mesh encoder 1600 may generate a 3D prediction vector (1604). As one example, base mesh encoder 1600 may generate a 3D prediction vector based on the one or more 3D normal vectors of previously encoded vertices of the base mesh (e.g., normal vectors of one or more neighboring vertices). As another example, base mesh encoder 1600 may generate a 3D prediction vector based on the one or more attributes of the previously encoded vertices and the one or more attributes of the current vertex. Example techniques to generate the 3D prediction vector are described in more detail below.

Both the 3D prediction of the normal and the actual value of the normal are then converted to a 2D representation using "3D to 2D octahedral conversion." For example, base mesh encoder 1600 may determine the 2D octahedral representation of the prediction vector based on the 3D prediction vector (1608). For instance, base mesh encoder 1600 may convert the 3D prediction vector into the 2D octahedral representation of the prediction vector using the example techniques described above for converting from 3D to 2D octahedral representation.

In addition, base mesh encoder 1600 may access the 3D normal vector of a current vertex of the base mesh (1610). Base mesh encoder 1600 may convert the 3D normal vector of the current vertex to the 2D octahedral representation of the 3D normal vector of the current vertex using the example techniques described above for converting from 3D to 2D octahedral representation (1612).

Both the 2D prediction and 2D original normal are subtracted to find the 2D residual. For example, base mesh encoder 1600 may generate residual information (1614) indicative of a difference between the 2D octahedral representation of the prediction vector (1608) and the 2D octahedral representation of the 3D normal vector of the current vertex (1612). The 2D residual is entropy encoded and stored in the bitstream. That is, base mesh encoder 1600 may signal the residual information after entropy encoding (1624).

Since the "3D to 2D" and "2D to 3D" conversions are lossy, and base mesh encoder 1600 may be a lossless encoder, there may be encoding of a second residual that includes any difference/losses in the conversions. For the second residual, there may be reconstruction of the 3D current vertex's normal and subtraction of it from the original 3D normal to obtain a 3D second residual that is entropy encoded and stored in the bitstream.

That is, base mesh encoder 1600 may reconstruct a 3D lossy representation of the normal vector of the current vertex (1618) based on adding the first residual information (1614) to the 2D octahedral representation of the prediction vector (1608), and converting a result of the adding from 2D octahedral representation (1616) to reconstruct the 3D lossy representation of the normal vector. Another example way in which base mesh encoder 1600 may reconstruct a 3D lossy representation of the normal vector of the current vertex (1618) is by converting the 2D octahedral representation of the 3D normal vector of the current vertex (1612) back to 3D to reconstruct the 3D lossy representation of the normal vector (1618).

Base mesh encoder 1600 may generate second residual information (1620) indicative of a difference between the 3D normal vector (1610) and the 3D lossy representation of the normal vector (1618). Base mesh encoder 1600 may signal the second residual information after entropy encoding (1622).

The decoder follows the inverse step to reconstruct the original normal in a lossless manner. For instance, base mesh decoder 1700 may, after entropy decoding (1720), receive residual information (1718) indicative of a difference between the 2D octahedral representation of a prediction vector and a 2D octahedral representation of a 3D normal vector of a current vertex of a base mesh. Base mesh decoder 1700 may also determine a 2D octahedral representation of a prediction vector (1716) for predicting a 2D octahedral representation of a three-dimensional (3D) normal vector of a current vertex of the base mesh.

For example, base mesh decoder 1700 may determine one or more 3D normal vectors of previously decoded vertices of the base mesh, or determine one or more attributes, excluding normal vectors, of previously decoded vertices of the base mesh. For instance, the current vertex's normal is predicted using a normal prediction scheme that employs the topology/connectivity of the triangles (1714), the attributes of the neighboring vertices (1710), and the attributes other than normal vector of the current vertex (1710).

Base mesh decoder 1700 may generate a 3D prediction vector (1712). As one example, base mesh decoder 1700 may generate a 3D prediction vector based on the one or more 3D normal vectors of previously decoded vertices of the base mesh (e.g., normal vectors of one or more neighboring vertices). As another example, base mesh decoder 1700 may generate a 3D prediction vector based on the one or more attributes of the previously decoded vertices and the one or more attributes of the current vertex. Example techniques to generate the 3D prediction vector are described in more detail below.

Base mesh decoder 1700 may add the residual information (1718) to the 2D octahedral representation of the prediction vector (1716) to reconstruct the 2D octahedral representation of the 3D normal vector of the current vertex. Base mesh decoder 1700 may reconstruct the 3D normal vector of the current vertex from the 2D octahedral representation of the 3D normal vector of the current vertex (1706). For example, base mesh decoder 1700 may convert 2D octahedral representation to 3D using the example techniques described above.

The 3D normal vector may be a 3D lossy representation of the normal vector of the current vertex since 3D to 2D conversion or 2D to 3D conversion is lossy. In examples where lossless decoding is desired, base mesh decoder 1700 may, after entropy decoding (1702), receive second residual information (1704) indicative of a difference between the 3D normal vector of the current vertex and a 3D lossy representation of the normal vector of the current vertex. Base mesh decoder 1700 may add the second residual information (1704) to the 3D lossy representation of the normal vector of the current vertex (1706) to reconstruct the 3D normal vector (1722).

In a third aspect, which may be an alternative or addition to above examples, there is a case where the original normal was already in the 2D octahedral domain. In this case FIGS. 11A and 11B architecture would be employed as is. For example, to determine the 2D octahedral representation of the prediction vector (1608 of FIG. 16 or 1716 of FIG. 17), base mesh encoder 1600 or base mesh decoder 1700 may access one or more 2D octahedral representations of 3D normal vectors of one or more previously encoded or decoded vertices of the base mesh. For instance, the one or more 2D octahedral representations of 3D normal vectors of one or more previously encoded or decoded vertices of the base mesh were generated and stored during encoding or decoding of the one or more previously encoded or decoded vertices of the base mesh. In such examples, base mesh encoder 1600 or base mesh decoder 1700 may generate the 2D octahedral representation of the prediction vector (1608 of FIG. 16 or 1716 of FIG. 17) based on the one or more 2D octahedral representations of 3D normal vectors of one or more previously encoded or decoded vertices of the base mesh.

Figure 18:
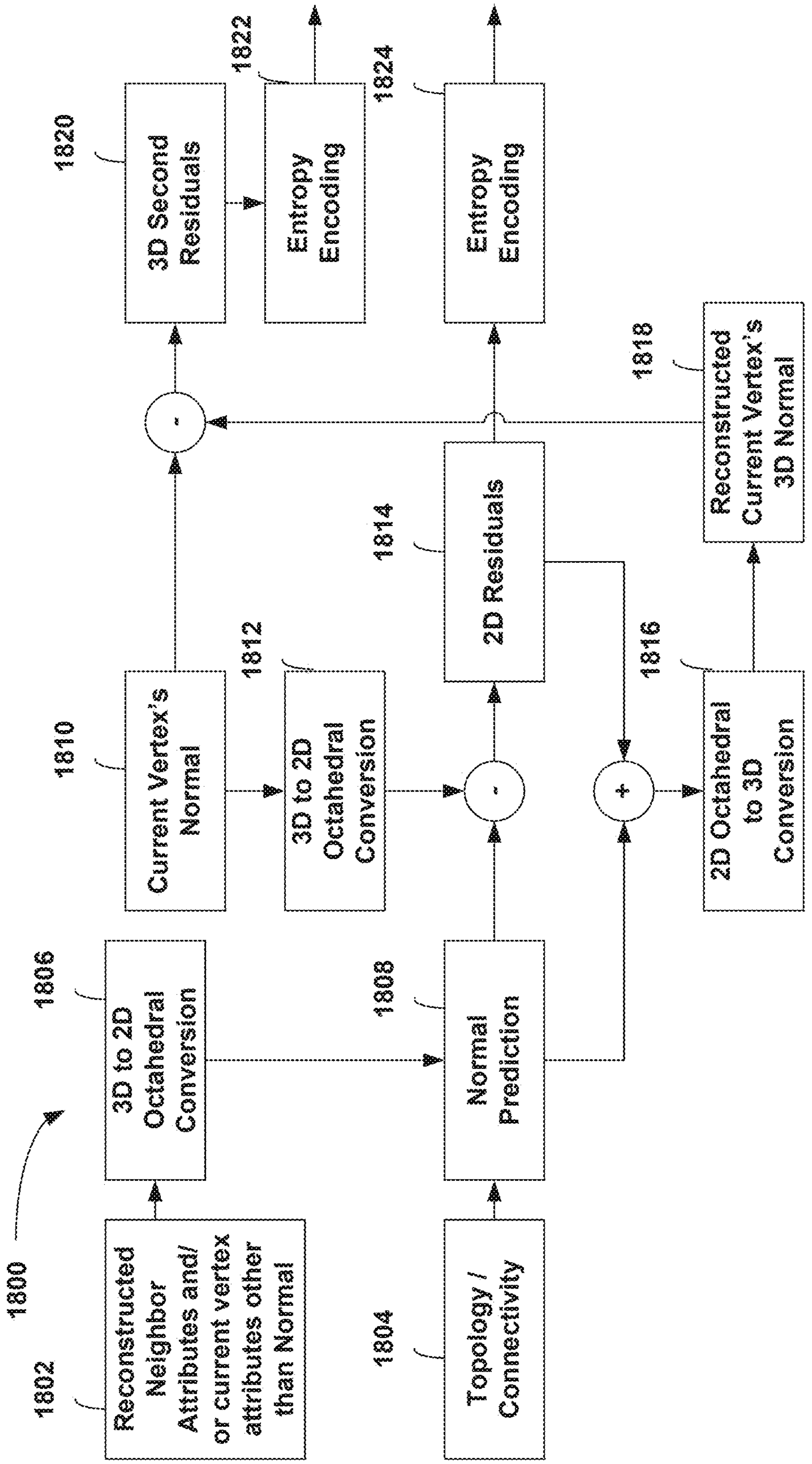
FIG. 18 is an example of an encoder of octahedral representation.
Figure 19:
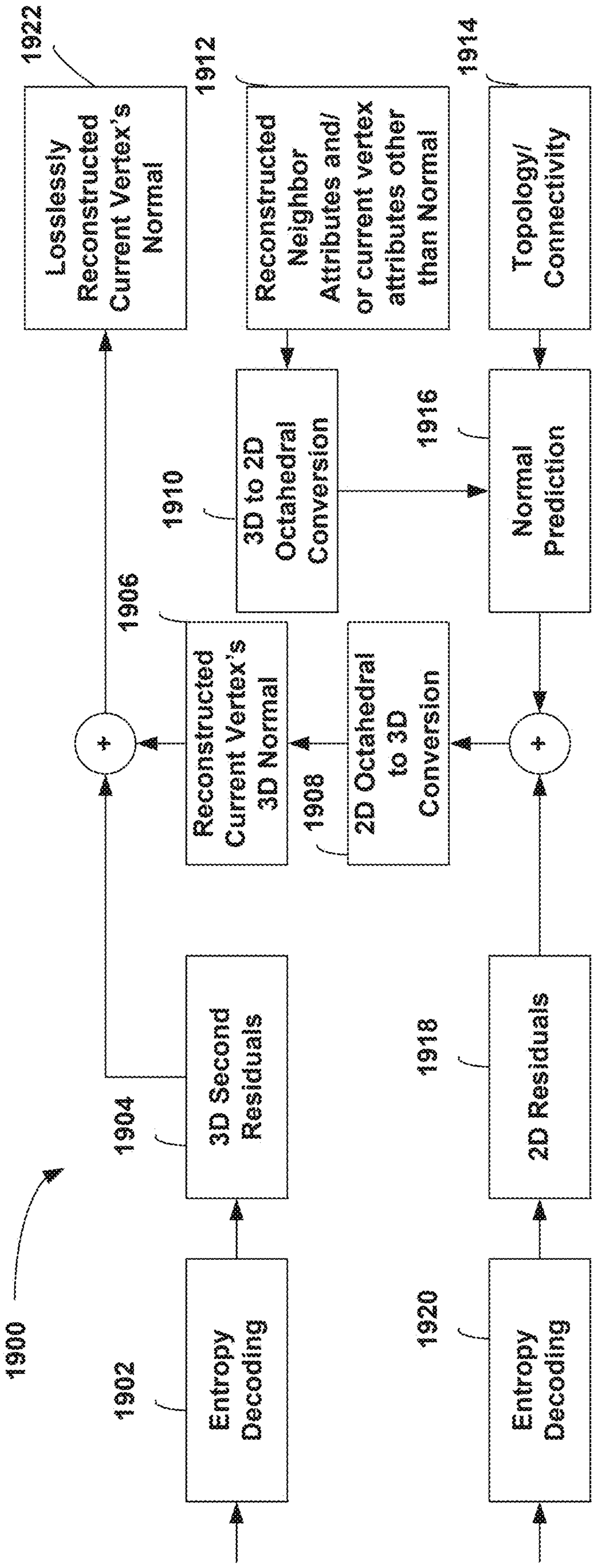
FIG. 19 is an example of a decoder of octahedral representation.

In a fourth aspect, which may be an alternative or addition to above examples, an example architecture is shown in FIGS. 18 and 19. In such examples, the current normal and the neighboring normals are all converted to 2D before the predictions happen. The prediction schemes may be in 2D domain.

For instance, FIG. 18 illustrates base mesh encoder 1800, and FIG. 19 illustrates base mesh decoder 1900. As described in more detail, base mesh encoder 1800 and base mesh decoder 1900 may be configured to determine a 2D octahedral representation of a prediction vector for predicting a 2D octahedral representation of a 3D normal vector of a current vertex of the base mesh, and encode or decode the 3D normal vector of the current vertex based on the 2D octahedral representation of the prediction vector. Although the examples are described with respect to a current vertex, the examples are also applicable to a current face. The current face may be a polygon (e.g., triangle), where the interconnection of the polygons form the base mesh, and 3D normal vector for the current face may extend from a point on the current face (e.g., midpoint).

In FIG. 18, base mesh encoder 1800 may access normal vectors or attributes of previously encoded vertices to generate a 3D vectors (1802). Base mesh encoder 1800 may perform 3D to 2D octahedral conversion (1806) to generate 2D vectors. Base mesh encoder 1800 may utilize topology/connectivity information (1804), and the 2D vectors to determine a 2D octahedral representation of a prediction vector (1808).

Base mesh encoder 1800 may convert the 3D normal vector of the current vertex to a 2D octahedral representation (1812) of a 3D normal vector of a current vertex of the base mesh (1810). Base mesh encoder 1800 may generate residual information (1814) indicative of a difference between the 2D octahedral representation of the prediction vector and the 2D octahedral representation of the 3D normal vector of the current vertex, and entropy encode (1824) the residual information for signaling.

For lossless encoding, base mesh encoder 1800 may add the first residual information (1814) to the 2D octahedral representation of the prediction vector (1808), and convert a result of the adding from 2D octahedral representation (1816) to reconstruct a 3D lossy representation of the normal vector (1818). Base mesh encoder 1800 may generate second residual information (1820) indicative of a difference between the 3D normal vector and the 3D lossy representation of the normal vector, and, after entropy encoding (1822) signal the second residual information.

Base mesh decoder 1900 may, after entropy decoding (1920), receive residual information (1918) indicative of a difference between the 2D octahedral representation of a prediction vector and a 2D octahedral representation of a 3D normal vector of a current vertex of a base mesh. Base mesh decoder 1900 may also determine a 2D octahedral representation of a prediction vector (1916) for predicting a 2D octahedral representation of a three-dimensional (3D) normal vector of a current vertex of the base mesh.

For example, base mesh decoder 1900 may determine one or more 3D normal vectors of previously decoded vertices of the base mesh, or determine one or more attributes, excluding normal vectors, of previously decoded vertices of the base mesh (1912). Base mesh decoder 1900 may perform 3D to 2D octahedral conversion (1910) to generate 2D vectors. Base mesh decoder 1900 may utilize topology/connectivity information (1904), and the 2D vectors to determine a 2D octahedral representation of a prediction vector (1916).

Base mesh decoder 1900 may add the residual information (1918) to the 2D octahedral representation of the prediction vector (1916) to reconstruct the 2D octahedral representation of the 3D normal vector of the current vertex. Base mesh decoder 1900 may reconstruct the 3D normal vector of the current vertex from the 2D octahedral representation of the 3D normal vector of the current vertex (1908). For example, base mesh decoder 1900 may convert 2D octahedral representation to 3D using the example techniques described above.

The 3D normal vector may be a 3D lossy representation of the normal vector of the current vertex since 3D to 2D conversion or 2D to 3D conversion is lossy. In examples where lossless decoding is desired, base mesh decoder 1900 may, after entropy decoding (1902), receive second residual information (1904) indicative of a difference between the 3D normal vector of the current vertex and a 3D lossy representation of the normal vector of the current vertex. Base mesh decoder 1900 may add the second residual information (1904) to the 3D lossy representation of the normal vector of the current vertex (1906) to reconstruct the 3D normal vector (1922).

Figure 20:
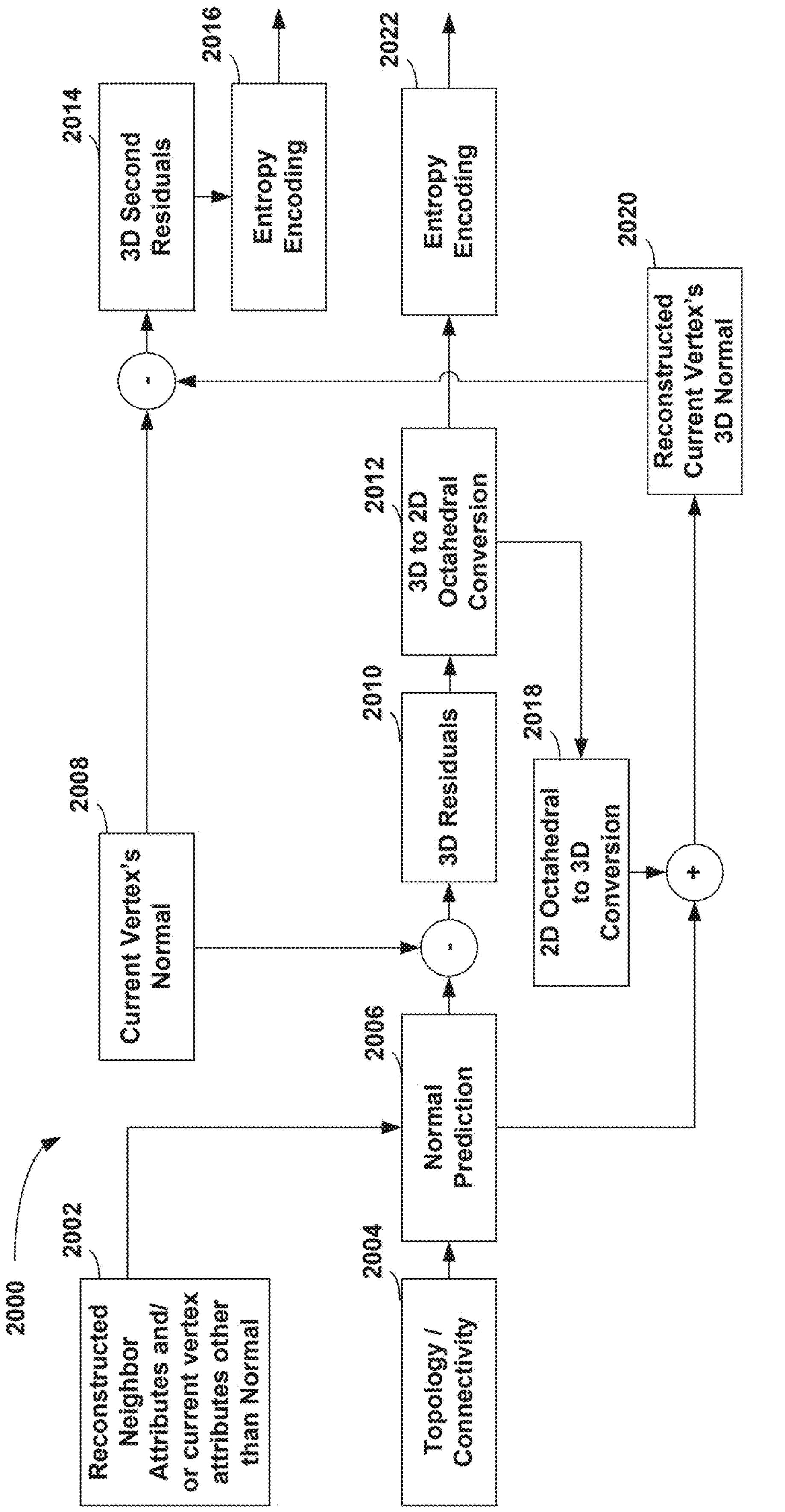
FIG. 20 is an example of an encoder of octahedral representation.
Figure 21:
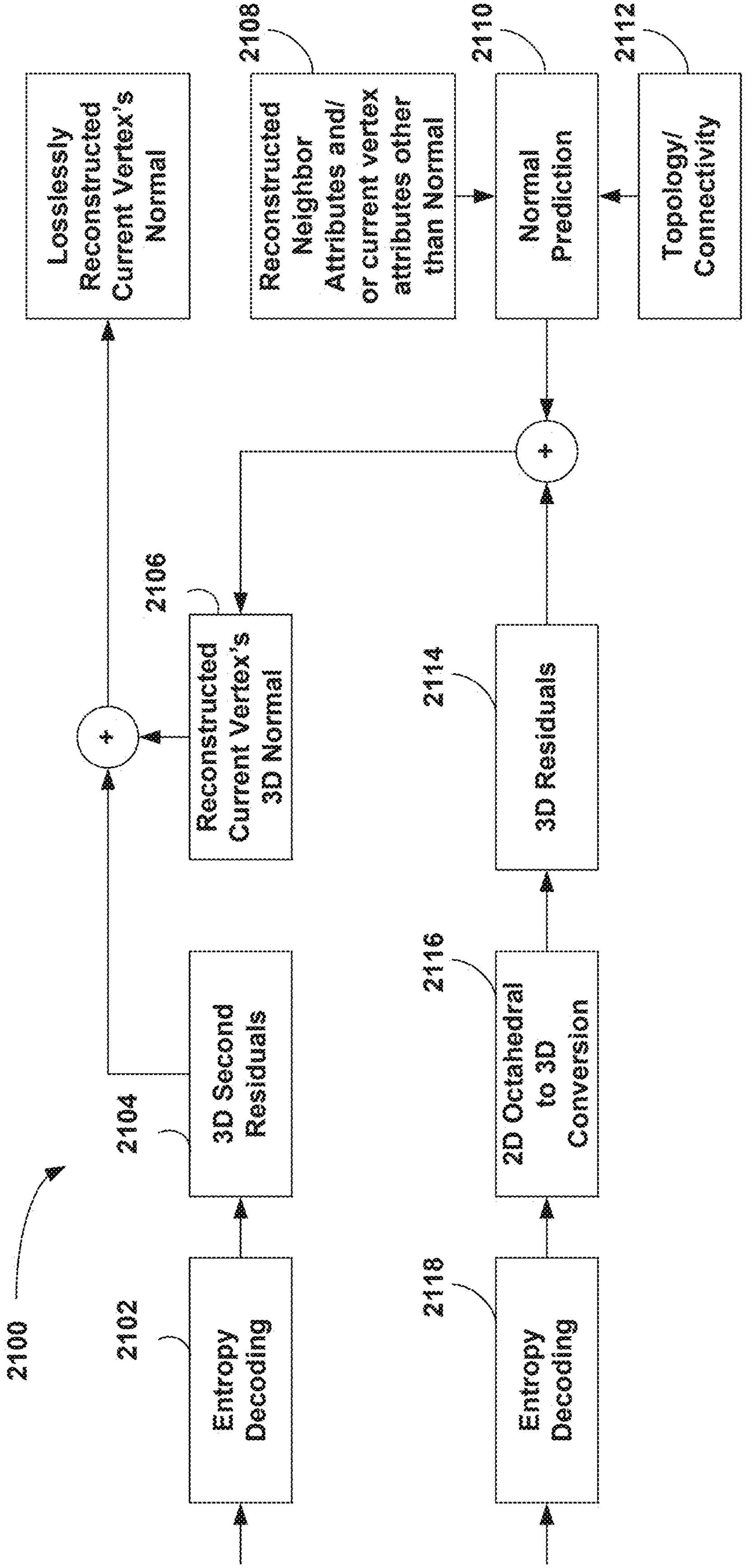
FIG. 21 is an example of a decoder of octahedral representation.

In a fifth aspect, which may be an alternative or addition to above examples, the is shown in FIGS. 20 and 21. In such examples, the current normal, the neighboring normals and the predictions are all in 3D. The residuals may be calculated in 3D and then converted to 2D before entropy encoding.

For instance, FIG. 20 illustrates base mesh encoder 2000, and FIG. 21 illustrates base mesh decoder 2100. As described in more detail, base mesh encoder 2000 and base mesh decoder 2100 may be configured to determine 3D residual information indicative of a difference between a 3D prediction vector and a 3D normal vector for the current vertex. Although the examples are described with respect to a current vertex, the examples are also applicable to a current face. The current face may be a polygon (e.g., triangle), where the interconnection of the polygons form the base mesh, and 3D normal vector for the current face may extend from a point on the current face (e.g., midpoint).

As illustrated in FIG. 20, base mesh encoder 2000 may utilize 3D normal vectors or attributes of previously encoded vertices (2002) and topology/connectivity information (2004) to generate a 3D prediction vector (2006). Base mesh encoder 2000 may subtract the 3D prediction vector (2006) from the 3D normal vector of the current vertex (2008) to generate 3D residual information (2010). Base mesh encoder 2000 may convert the 3D residual information to 2D octahedral representation of the 3D residual information. Base mesh encoder 2000 may entropy encode (2022) and signal 2D octahedral representation of the residual information.

For lossless encoding, base mesh encoder 2000 may convert the 2D octahedral representation of the 3D residual information back to 3D residual information (2018). Base mesh encoder 2000 may add the 3D prediction vector to the 3D residual information to generate a 3D lossy representation of the normal vector (2020). Base mesh encoder 2000 may subtract the 3D lossy representation of the normal vector from the 3D normal vector of the current vertex (2008) to generate 3D second residuals (2014). Base mesh encoder 2000 may entropy encode (2016), and signal the second residuals.

Base mesh decoder 2100 may utilize 3D normal vectors or attributes of previously decoded vertices (2108) and topology/connectivity information (2112) to generate a 3D prediction vector (2110). Base mesh decoder 2100 may also receive, after entropy decoding (2118), 2D octahedral representation of residual information. Base mesh decoder 2100 may perform 2D octahedral to 3D conversion (2114) to generate 3D residuals (2114). Base mesh decoder 2100 may add the 3D prediction vector (2110) to the 3D residual information (2114) to generate lossy 3D normal vector (2106).

Base mesh decoder 2100 may receive, after entropy decoding (2102), 3D second residuals (2104). For lossless decoding, base mesh decoder 2100 may add lossy 3D normal vector (2106) to second residuals (2104) to generate lossless 3D normal vector for the current vertex.

As described above, a base mesh encoder and a base mesh decoder may determine a 2D octahedral representation of a prediction vector for predicting a 2D octahedral representation of a 3D normal vector of a current vertex of the base mesh. In some examples, to determine the 2D octahedral representation of the prediction vector, the base mesh encoder or the base mesh decoder may determine one or more 3D normal vectors of previously encoded or decoded vertices of the base mesh, generate a 3D prediction vector based on the one or more 3D normal vectors of previously encoded or decoded vertices of the base mesh, and determine the 2D octahedral representation of the prediction vector based on the 3D prediction vector. In some examples, to determine the 2D octahedral representation of the prediction vector, the base mesh encoder or the base mesh decoder may determine one or more attributes, excluding normal vectors, of previously encoded or decoded vertices of the base mesh, determine one or more attributes of the current vertex, generate a 3D prediction vector based on the one or more attributes of the previously encoded or decoded vertices and the one or more attributes of the current vertex, and determine the 2D octahedral representation of the prediction vector based on the 3D prediction vector. The following describes example ways in which the base mesh encoder and the base mesh decoder may implement these example techniques to determine the 2D octahedral representation of the prediction vector.

The following describes prediction schemes. The follow are three example prediction schemes. Some techniques may use over 23 different prediction schemes. In one or more example, it may be possible to narrow down to three prediction schemes specifically adapted and optimized for octahedral representation of normals. However, more than three prediction schemes are possible. Although the examples are described with respect to a current vertex, the examples are also applicable to a current face. The current face may be a polygon (e.g., triangle), where the interconnection of the polygons form the base mesh, and 3D normal vector for the current face may extend from a point on the current face (e.g., midpoint).

The three prediction schemes include: Delta: Delta prediction scheme, MPARA: Multi-parallelogram for normal prediction, and Cross: Cross product-base normal prediction. Table 1 includes the code for the delta prediction scheme. Table 2 includes the code the MPARA. Table 3 includes the code of Cross.

TABLE 1

Delta Prediction Scheme for Normal Encoding

```
void EBReversiEncoder::normalEncodeWithPredictionDelta(const int c) {
  const auto& ov = _ovTable;
  const auto& V = ov.V;
  const auto& O = ov.O;
  const auto& Norm = ov.normals;
  const auto& v = ov.v(c);
  // is vertex already predicted ?
  if (MV[v] > 0)
    return;
  // mark the vertex
  MV[v]=1;
  oNrmFine.push_back(false); // Always False for Delta
  glm::vec3 predNorm(0, 0, 0);        // the predicted position
  int count = 0;                      // number of valid parallelograms found
  int altC = c;
  // loop through corners attached to the current vertex
  // swing right around the fan
  int nextC = ov.n(O[ov.n(altC)]);
  while (nextC >= 0 && nextC != c)
  {
    altC = nextC;
    nextC = ov.n(O[ov.n(altC)]);
  };
  bool isBoundary = (nextC != c);
  // 1. Use delta with available values
  const auto& c_p_v = ov.v(ov.p(c));
  const auto& c_n_v = ov.v(ov.n(c));
  if (c_p_v > -1 && MV[c_p_v] > -1) {
    if (cfg.useOctahedral) {
      calculate2DResiduals(Norm[v], Norm[c_p_v]);
    }
    else
      oNormals.push_back(Norm[v] - Norm[c_p_v]);
    return;
  }
  if (c_n_v > -1 && MV[c_n_v] > -1) {
    if (cfg.useOctahedral) {
      calculate2DResiduals(Norm[v], Norm[c_n_v]);
```

TABLE 1-continued

| Delta Prediction Scheme for Normal Encoding |
| --- |

```
    }
    else
      oNormals.push_back(Norm[v] − Norm[c_n_v]);
    return;
  }
  // 2. if on a boundary
  // then may use deltas from previous vertex on the boundary
  if (isBoundary) {
    const auto b = ov.p(altC);        // b is on boundary
    const auto b_v = ov.v(b);
    auto marked = MV[b_v];
    if (marked > −1) {
      if (cfg.useOctahedral) {
      calculate2DResiduals(Norm[v], Norm[b_v]);
      }
      else
        oNormals.push_back(Norm[v] − Norm[b_v]);
      return;
    }
  }
  // 3. no other choice
  osNormals.push_back(Norm[v]);       // global value (it is a start, pushed in separate table)
}
```

TABLE 2

| Multi-parallelogram Prediction Scheme for Normal Encoding |
| --- |

```
void EBReversiEncoder::normalEncodeWithPredictionMPARA(const int c) {
  const auto MAX_PARALLELOGRAMS = 4;
  const auto& ov =_ ovTable;
  const auto& V = ov.V;
  const auto& O = ov.O;
  const auto& Norm = ov.normals;
  const auto& v = ov.v(c);
  // is vertex already predicted ?
  if (MV[v] > 0)
    return;
  // mark the vertex
  MV[v] = 1;
  // go around the fan of a vertex and predict using all the parallelograms.
  // A parallelogram consists of the current, next, previous, and opposite vertex.
  // The previous, next, and opposite vertex is employed to predict the normal of
  // the current vertex.
  glm::vec3 predNorm(0, 0, 0);                 // the predicted normals
  int count = 0;                               // number of valid parallelograms found
  int altC = c;
  // loop through corners attached to the current vertex
  // swing right around the fan
  int nextC = ov.n(O[ov.n(altC)]);
  while (nextC >= 0 && nextC != c)
  {
    altC = nextC;
    nextC = ov.n(O[ov.n(altC)]);
  };
  bool isBoundary = (nextC != c);
  // now in position on the right most corner sharing v
  // turn left an evaluate the possible predictions
  const int startC = altC;
  do
  {
    if (count >= MAX_PARALLELOGRAMS) break;
    const auto& oppoV = ov.v(O[altC]);
    const auto& prevV = ov.v(ov.p(altC));
    const auto& nextV = ov.v(ov.n(altC));
    if ((oppoV > −1 && prevV > −1 && nextV > −1) &&
      ((MV[oppoV] > 0) && (MV[prevV] > 0) && (MV[nextV] > 0)))
    {
      // parallelogram prediction estNorm = prevNrm + nextNrm − oppoNrm
      glm::vec3 estNorm = Norm[prevV] + Norm[nextV] − Norm[oppo V];
      predNorm += estNorm;                     // accumulate parallelogram predictions
      ++count;
    }
    altC = ov.p(O[ov.p(altC)]);                // swing around the triangle fan
  } while (altC >= 0 && altC != startC);       // incomplete fan or full rotation
```

TABLE 2-continued

Multi-parallelogram Prediction Scheme for Normal Encoding

```
  // 1. use parallelogram prediction when possible
  if (count > 0) {
    predNorm = glm :: round(predNorm / glm :: vec3(count));
    // center the prediction.
    const int32_t center = ( 1u << static_cast<uint32_t>( qn-1 ) );
    for (int c = 0; c < 3; c++) {
      predNorm[c] = predNorm[c] − center;
    }
    // normalize the prediction
    predNorm = glm::normalize( predNorm );
    if (!std :: isnan( predNorm[0] ) ) {
      // Quantize the normals
      const glm::vec3 minNrm                    = {−1.0, −1.0, −1.0};
      const glm::vec3 maxNrm                    = {1.0, 1.0, 1.0};
      const glm::vec3 diag                      = maxNrm - minNrm;
      const float range                         = std :: max( std::max( diag.x, diag.y ), diag.z );
      const int32_t maxNormalQuantizedValue     = ( 1u << static_cast<uint32_t>( qn
)) − 1;
      for (int c = 0; c < 3; c++) {
        predNorm[c] = static_cast<float>(std::floor( ( ( predNorm[c] − minNrm[c] ) /
range ) *
                                  maxNormalQuantizedValue + 0.5f ) );
      }
      if (cfg.useOctahedral) {
        calculate2DResiduals(Norm[v], predNorm);
      }
      else
        oNormals.push_back(Norm[v] - predNorm);
      oNrmFine.push_back(true);
      return;
    }
  }
        // 2. or fallback to delta with available values
        const auto& c_p_v = ov.v(ov.p(c));
        const auto& c_n_v = ov.v(ov.n(c));
        if (c_p_v > −1 && MV[c_p_v] > −1) {
          if (cfg.useOctahedral) {
            calculate2DResiduals(Norm[v], Norm[c_p_v]);
          }
          else
            oNormals.push_back(Norm[v] − Norm[c_p_v]);
          oNrmFine.push_back(false);
          return;
        }
        if (c_n_v > −1 && MV[c_n_v] > −1) {
          if (cfg.useOctahedral) {
            calculate2DResiduals(Norm[v], Norm[c_n_v]);
          }
          else
            oNormals.push_back(Norm[v] − Norm[c_n_v]);
          oNrmFine.push_back(false);
          return;
        }
        // 3. if on a boundary
        // then may use deltas from previous vertex on the boundary
        if (isBoundary) {
          const auto b = ov.p(startC); // b is on boundary
          const auto b_v = ov.v(b);
          auto marked = MV[b_v];
          if (marked > −1) {
            if (cfg.useOctahedral) {
              calculate2DResiduals(Norm[v], Norm[b_v]);
            }
            else
              oNormals.push_back(Norm[v] − Norm[b_v]);
            oNrmFine.push_back(false);
            return;
          }
        }
        // 4. no other choice
        osNormals.push_back(Norm[v]);             // global value (it is a start, pushed
in separate table)
      }
```

TABLE 3

Cross product-based Prediction Scheme for Normal Encoding

```
void EBReversiEncoder::normalEncode WithPredictionCross(const int c) {
   const auto& ov = _ovTable;
   const auto& V = ov.V;
   const auto& O = ov.O;
   const auto& Norm = ov.normals;
   const auto& G = ov.positions;
   const auto& v = ov.v(c);
   // is vertex already predicted ?
   if (MV[v] > 0)
      return;
   // mark the vertex
   MV[v]=1;
   // Go around the fan and start getting cross products of vectors to predict normals
   // Average all the predictions to obtain the final prediction.
   glm::vec3 predNorm(0, 0, 0);                    // the predicted normals
   int count = 0;                                   // number of valid parallelograms found
   int altC = c;
   // loop through corners attached to the current vertex
   // swing right around the fan
   int nextC = ov.n(O[ov.n(altC)]);
   while (nextC >= 0 && nextC != c)
   {
      altC = nextC;
      nextC= ov.n(O[ov.n(altC)]);
   };
   bool isBoundary = (nextC != c);
   // now in position on the right most corner sharing v
   // turn left an evaluate the possible predictions
   const int startC = altC;
   do
   {
      const auto& prevV = ov.v(ov.p(altC));
      const auto& nextV = ov.v(ov.n(altC));
      /*if ((prevV > -1 && nextV > -1) &&
         ((MV[prevV] > 0) && (MV[nextV] > 0)))*/
      if (prevV > -1 && nextV > -1)
      {
         const glm::vec3 v12 = G[prevV] - G[v];
         const glm::vec3 v13 = G[nextV] - G[v];
         predNorm += glm::cross( v13, v12);                // Accumulate predictions
         ++count;
      }
      altC= ov.p(O[ov.p(altC)]);                         // swing around the triangle fan
   } while (altC >= 0 && altC != startC);                  // incomplete fan or full rotation
   // 1. use cross products
   if (count > 0) {
      // normalize the prediction
      predNorm = glm::normalize( predNorm );
      if (!std::isnan( predNorm[0] ) ) {
         // Quantize the normals
         const glm::vec3 minNrm                       = {-1.0, -1.0, -1.0};
         const glm::vec3 maxNrm                         = {1.0, 1.0, 1.0};
         const glm::vec3 diag                      = maxNrm - minNrm;
         const float range                   = std::max( std::max( diag.x, diag.y ), diag.z );
         const int32_t maxNormalQuantizedValue          = ( 1u << static_cast<uint32_t>( qn
) ) - 1;
         for (int c = 0; c < 3; c++) {
            predNorm[c] = static_cast<float>(std::floor( ( ( predNorm[c] - minNrm[c] ) /
range ) *
                                                    maxNormalQuantizedValue + 0.5f
                                              ) );
         }
         if (cfg.useOctahedral) {
            calculate2DResiduals(Norm[v], predNorm);
         }
         else
            oNormals.push_back(Norm[v] - predNorm);
         oNrmFine.push_back(true);
         return;
      }
   }
            // 2. or fallback to delta with available values
            const auto& c_p_v = ov.v(ov.p(c));
            const auto& c_n_v = ov.v(ov.n(c));
            if (c_p_v > -1 && MV[c_p_v] > -1) {
               if (cfg.useOctahedral) {
                  calculate2DResiduals(Norm[v], Norm[c_p_v]);
               }
```

TABLE 3-continued

Cross product-based Prediction Scheme for Normal Encoding

```
            else
               oNormals.push_back(Norm[v] − Norm[c_p_v]);
            oNrmFine.push_back(false);
            return;
         }
         if (c_n_v > −1 && MV[c_n_v] > −1) {
            if (cfg.useOctahedral) {
               calculate2DResiduals(Norm[v], Norm[c_n_v]);
            }
            else
               oNormals.push_back(Norm[v] − Norm[c_n_v]);
            oNrmFine.push_back(false);
            return;
         }
         // 3. if on a boundary
         // then may use deltas from previous vertex on the boundary
         if (isBoundary) {
            const auto b = ov.p(startC); // b is on boundary
            const auto b_v = ov.v(b);
            auto marked = MV[b_v];
            if (marked > −1) {
               if (cfg.useOctahedral) {
                  calculate2DResiduals(Norm[v], Norm[b_v]);
               }
               else
                  oNormals.push_back(Norm[v] − Norm[b_v]);
               oNrmFine.push_back(false);
               return;
            }
         }
         // 4. no other choice
         osNormals.push_back(Norm[v]);                    // global value (it is a start, pushed
in separate table)
      }
```

The following describes delta prediction. In a sixth aspect, delta coding is shown in table 1 and follows these steps. First loop through corners attached to the current vertex to find whether the current vertex is on a boundary or not. Then, first check whether the previous vertex's normal has been visited/encoded/decoded. If yes, then use the previous vertex's normal as the prediction and end the prediction scheme. Then, check whether the next vertex's normal has been visited/encoded/decoded. If yes, then use the next vertex's normal as the prediction and end the prediction scheme.

If both the previous and next vertex's normals are not available, then see if the current vertex is on the boundary. If yes, then use the boundary neighboring vertex's normal as the prediction and end the prediction scheme.

If none of these are true, this means that the current vertex is the very first starting vertex of the encoding scheme and therefore, would store the global value of this vertex's normal rather than predicting the normal.

The following describes MPARA prediction. In a seventh aspect, the multi-parallelogram prediction scheme for normals is similar to the multi-parallelogram prediction scheme employed for positions/geometry is shown in Table 2 and follows the following steps.

First loop through corners attached to the current vertex to find whether the current vertex is on a boundary or not. Once the loop ends, the process would be on the on the right most corner sharing the current vertex and the process would turn left one triangle at a time and evaluate the possible predictions. For each triangle visited, the process checks if the next, previous, and the opposite corners have been visited/encoded/decoded in the past. If yes, then all three are available and the process can predict the current vertex's normal using the formula:

$$N\_current = N\_next + N\_previous - N\_opposite$$

The parallelogram formula calculates the current corner's normal by adding the next and previous corner's normals and subtracting the opposite corner's normal.

By rotating around the fan, multiple parallelogram predictions are performed, and the predictions are accumulated. Afterwards, the average of the predictions is taken to find the final predictions. The final prediction may be normalized and converted to unsigned integer.

If for some reason the multi-parallelogram prediction cannot be performed, then the prediction scheme falls back on Delta prediction and follows the steps outlined above and Table 1.

The derivation behind the formula shown for parallelogram prediction before is shown below:

$$N\_midPN = ((N\_next + N\_previous))/2$$

$$N\_current = N\_midPN - (N\_opposite - N\_midPN$$

$$N\_current = N\_next + N\_previous - N\_opposite$$

The following describes cross prediction. In an eighth aspect, this prediction is a cross product-based prediction scheme. This prediction scheme uses geometry/position attribute of the current and neighboring vertices to predict the normal of the current vertex. In other two prediction schemes, the neighboring vertices normals were employed to predict the current vertex's normal. However, this prediction may employ the geometry to predict the current vertex's normal.

Cross prediction shown in Table 3 employs the following step. First loop through corners attached to the current vertex to find whether the current vertex is on a boundary or not. Once the loop ends, the process would be on the on the right most corner sharing the current vertex and the process would turn left one triangle at a time and evaluate the possible predictions.

For each triangle, find two vectors. First vector is from current to previous vertex. The second vector is from current to next vertex. Then the process performs cross-product of these two vectors to obtain the current vertex's normal.

The predictions from multiple triangles are accumulated and averaged to obtain the final prediction. The final prediction may be normalized and converted to unsigned integer.

If for some reason the multi-parallelogram prediction cannot be performed, then the prediction scheme falls back on Delta prediction and follows the steps outlined above and in Table 1.

In some cases, unlike multi-parallelogram, the cross-prediction scheme may not use opposite corner and, therefore, may not use the whole parallelogram. Instead, it employs on only a triangle formed by current, previous, and next corners.

The following describes improvement to the 2D octahedral normal encoding. The ninth aspect relates to wrap around. The current implementation of octahedral encoding subtracts the 2D octahedral prediction from the original 2D octahedral normal to get the residual. However, if the prediction and the original normal are on the boundary edge of the sphere as shown in FIG. 14, and if in FIG. 14, the prediction and the original normal fall on a boundary and end up in a different square/triangle. For example, in FIG. 14, area 1402 in the sphere would map to area 1402 in the 3D octahedral, which then maps to area 1402 on the 2D octahedral representation. These areas would be warped to a much farther distance in the 2D octahedral representation. This increase in distance between the prediction and the original would lead to a higher residual.

To improve the encoding efficiency, some techniques may use wrap around where when the distance between the original and prediction in one dimension is greater than half the square's length, the process moves in the other direction.

The algorithm employs the minimum (MIN) and maximum (MAX) limits of the original normal to wrap the stored residual values around the center point of zero. Specifically, when the range of the original values, denoted as (N), is confined within (<MIN, MAX>) and defined by (N=MAX−MIN), any residual value (R), which is the difference between (N) and a predicted value (P), is stored as follows:

$$R' = \begin{cases} R+N & \text{if } R < -\frac{N}{2} \\ R-N & \text{if } R > \frac{N}{2} \\ R & \text{otherwise} \end{cases}$$

To decode this value, the decoder evaluates whether the final reconstructed value (F=P+R') exceeds the original dataset's bounds. If (F) is outside these bounds, it is adjusted using:

$$\begin{cases} F+N, & \text{if } F < \text{MIN} \\ F-N, & \text{if } F > \text{MAX} \end{cases}$$

This method of wrapping effectively reduces the diversity of values, leading to an improved entropy for the stored values and, consequently, more efficient compression ratios.

For example, a base mesh encoder may determine that a value of the residual information (e.g., R) is less than a minimum threshold (e.g., less than −N/2) or greater than a maximum threshold (e.g., greater than N/2). The base mesh encoder may adjust the value of the residual information based on the value of the reconstructed 3D normal vector being less than the minimum threshold or greater than the maximum threshold to generate the 3D normal vector (e.g., determine R'). In this example, the base mesh encoder may signal the adjusted residual information.

A base mesh decoder may determine that a value of the reconstructed 3D normal vector (e.g., F) is less than a minimum threshold (e.g., MIN) or greater than a maximum threshold (e.g., MAX). The base mesh decoder may adjust the value of the reconstructed 3D normal vector based on the value of the reconstructed 3D normal vector being less than the minimum threshold or greater than the maximum threshold to generate the 3D normal vector (e.g., determine the value of the reconstructed 3D normal vector to be F+N or F−N).

A tenth aspect relates to rotating the octahedral square. The transformation is applied to normals represented in octahedral coordinates. The process subdivides a square into eight triangles: four form an inner diamond pattern, and four are outer triangles. The inner diamond is associated with the octahedron's upper hemisphere, while the outer triangles correspond to the lower hemisphere as shown in FIG. 14. For a given predicted value (P) and the actual value (N) that requires encoding, the transformation first evaluates whether (P) lies outside the diamond. If (P) is outside, the transformation inverts the outer triangles towards the diamond's interior and vice versa. Subsequently, the transformation checks if (P) resides within the bottom-left quadrant. If (P) is not in this quadrant, it applies a rotation to both (P) and (N) to reposition them. This makes sure that the (P) is always in the bottom-left quadrant. The residual value is then calculated based on the new positions of (P) and (N) post-mapping and rotation. This inversion typically results in more concise residuals, and the rotation ensures that all larger residual values are positive. This positivity reduces the residual values' range, thereby increasing the frequency of large positive residual values, which benefits the entropy encoder's efficiency. This encoding strategy is possible because the decoder also has knowledge of (P).

Option 1: Encode Either 3D or 2D Octahedral Normals. In an eleventh aspect, for normal encoding, it may be possible to transmit a flag in the syntax/bitstream to signal whether the normals were encoded in 2D or 3D. For 3D normal encoding, FIGS. 11A and 11B is employed. For 2D normal encoding, FIGS. 16 and 17, or other example architectures may be employed.

Option 2: Lossy or Lossless Normal Encoding. In a twelfth aspect, for normal encoding, it may be possible to transmit a flag in the syntax/bitstream to signal whether the second residuals for normals are transmitted or not. In case the second residuals are not transmitted, the normal encoding becomes lossless.

FIGS. 16-21 show the architecture for the lossless encoding of basemesh attributes. The current version of V-DMC only supports lossless encoding of basemesh/static mesh encoder.

However, if needs arise, the second residual can be disabled using the flag and a lossy transmission of normals can be enabled. This may simplify the architecture shown in FIGS. 16-21 as the second residual part from these techniques could be removed.

The following describes examples of syntax changes. In a thirteenth aspect, the part identified in italics is the one added to the V-DMC syntax and the bitstream to be able to support the octahedral encoding of normals. The following syntax elements may be used.

normal_octrahedral_flag: Is explained above for option 1 and determines whether to encode normals in 3D or 2D octahedral representation. Accordingly, a base mesh encoder may signal, and a base mesh decoder may receive information (e.g., normal_octrahedral_flag) indicating that the 3D normal vector of the current vertex is to be decoded based on the 2D octahedral representation of the prediction vector.

normal_octahedral_second_residual_flag[index]: Is explained above for option 2 and determines whether to encode normals in a lossy or lossless manner. This flag may only be active when the 2D octahedral encoding is enabled. For lossless mode the second residuals are encoded while for lossy mode the second residuals are disabled.

mesh_normal_octrahedral_second_residuals_quantization_parameters[index][k]: This signals the quantization parameters for the second residual.

mesh_normal_octahedral_extra_data: This syntax function stores all the extra data required to decode the octahedral representation. It also stores the entropy encoded second residual bitstream.

1.8.3.2 Mesh coding header syntax

| | Descriptor |
|---|---|
| mesh_coding_header( ) { | |
| mesh_codec_type | u(2) |
| mesh_vertex_traversal_method | u(2) |
| mesh_position_encoding_parameters( ) | |
| mesh_position_dequantize_flag | u(1) |
| if (mesh_position_dequantize_flag ) | |
| mesh_position_dequantize_parameters( ) | |
| mesh_attribute_count | u(5) |
| for( i=0; i<mesh_attribute_count; i++ ){ | |
| mesh_attribute_type[ i ] | u(3) |
| if( mesh_attribute_type[ i ] == MESH_ATTR_TEXCOORD ) | |
| NumComponents[ i ] = 2 | |
| else | |
| if( mesh_attribute_type[ i ] == MESH_ATTR_NORMAL ) | |
| mesh_normal_octrahedral_flag[ i ] | u(1) |
| if( normal_octrahedral_flag[ i ] ) | |
| NumComponents[ i ] = 2 | |
| else | |
| NumComponents[ i] = 3 | |
| else | |
| if( mesh_attribute_type[ i ] == MESH_ATTR_COLOR ) | |
| NumComponents[ i ] = 3 | |
| else if( mesh_attribute_type[ i ] == MATERIAL_ID ) | |
| NumComponents[ i ] = 1 | |
| else if( mesh_attribute_type[ i ] == GENERIC ) { | |
| mesh_attribute_num_components_minus1[ i ] | u(2) |
| NumComponents[ i ] = mesh_attribute_num_components_minus1 [ i ]+1 | |
| } | |
| mesh_attribute_encoding_parameters ( i ) | |
| mesh_attribute_dequantize_flag[ i ] | u(1) |
| if (mesh_attribute_dequantize_flag[ i ] ) | |
| mesh_attribute_dequantize_parameters ( i ) | |
| } | |
| mesh_deduplicate_method | ue(v) |
| length_alignment( ) | |
| } | |

1.8.3.9 Mesh attribute coding payload syntax

| | Descriptor |
|---|---|
| mesh_attribute_coding_payload( ) { | |
| for( i=0; i<mesh_attribute_count; i++ ){ | |
| if( mesh_attribute_separate_index_flag[ i ]) { | |
| mesh_attribute_seams_count[ i ] | vu(v) |
| mesh_coded_attribute_seams_size[ i ] | vu(v) |
| for( j=0; j< mesh_attribute_seams_count[ i ]; j++ X{ | |
| mesh_attribute_seam[ i ][ j ] | ae(v) |
| } | |
| length_alignment( ) | |
| } | |
| mesh_attribute_start_count[ i ] | vu(v) |
| NumAttributeStart[i] = mesh_attribute_start_count[ i ] | |
| If (mesh_attribute_type[ i ] == MESH_ATTR_NORMAL ) | |
| NumAttributeStartComponents[ i ] = 3 | |
| else | |
| NumAttributeStartComponents[ i ] = NumComponents [ i ] | |
| for( j=0; j< mesh_attribute_start_count[ i ]; j++ X{ | |
| for( k=0; k< NumAttributeStartComponents[ i ]; k++ ){ | |
| mesh_attribute_start[ i ][ j ][ k ] | u(v) |
| } } | |
| length_alignment( ) | |
| mesh_attribute_residuals_count[ i ] | vu(v) |
| if( mesh attribute_residuals_count[ i ] }{ | |
| mesh_coded_attribute_residuals_size[ i ] | vu(v) |
| for( j=0; j<mesh_attribute_residuals_count[ i ]; j++ X{ | |
| for( k=0; k< NumComponents[ i ]; k++ ){ | |
| mesh_attribute_residual[ i ][ j ][ k ] | ae(v) |
| } | |
| } | |
| length_alignment( ) | |
| } | |
| mesh_attribute_coarse_residuals_count[ i ] | vu(v) |
| if( mesh attribute_coarse_residuals_count[ i ] > 0 ){ | |
| mesh_coded_attribute_coarse_residuals_size[ i ] | vu(v) |
| for( j=0; j<mesh_attribute_coarse_residuals_count[ i ]; j++ ){ | |
| for( k=0; k< NumComponents[ i ]; k++ ){ | |
| mesh_attribute_coarse_residual[ i ][ j ][ k ] | ae(v) |
| } } | |
| length_alignment( ) | |
| } | |
| if (mesh_attribute_separate_index_flag[ i ]) | |
| mesh_attribute_deduplicate_info( i ) | |
| /* extra data dependent on the selected prediction scheme */ | |
| Attribute Type = mesh_attribute_type[ i ] | |
| AttributePredictionMethod = mesh_attribute_prediction_method[ i ] | |
| mesh_attribute_extra_data( i, AttributeType, AttributePredictionMethod ) | |
| } | |
| length_alignment( ) | |
| } | |

1.8.3.10 Mesh extra attribute data syntax

| | Descriptor |
|---|---|
| mesh_attribute_extra_data( index, type, method ) { | |
| if( type == MESH_ATTR_TEXCOORD ) { | |
| if ( method == MESH_TEXCOORD_MSTRETCH ) | |
| mesh_texcoord_stretch_extra_data( index ) | |
| } | |
| else if(type == MESH_ATTR_NORMAL ) | |
| if( normal_octrahedral_flag[ index ] ){ | |
| mesh_normal_octrahedral_extra_data( index ) | |
| } | |
| else if(type == MESH_ATTR_COLOR ) | |
| /* No extra data defined for specified prediction methods applied on colors */ | |
| else if(type == MESH_ATTR_MATERIAL_ID ) { | |
| if ( method == MESH_MATERIALID_DEFAULT ) | |

-continued 1.8.3.10 Mesh extra attribute data syntax

| | Descriptor |
|---|---|
| mesh_materialid_default_extra_data( index ) | |
| } | |
| else if(type == MESH_ATTR_GENERIC ) | |
| /* No extra data defined for specified prediction methods applied | |
| on generic*/ | |
| } | |

1.8.3.11 Mesh texcoord stretch extra data syntax

| | Descriptor |
|---|---|
| mesh_texcoord_stretch_extra_data( index ) { | |
| mesh_texcoord_stretch_orientations_count[index] | vu(v) |
| if(mesh_texcoord_stretch_orientations_count > 0 ){ | |
| mesh_coded_texcoord_stretch_orientations_size[index] | vu(v) |
| for( j=0; j< | |
| mesh_texcoord_stretch_orientations_count[index]; j++ ){ | |
| mesh_texcoord_stretch_orientation[index][ j ] | ae(v) |
| } | |
| } | |
| length_alignment( ) | |
| } | |

1.8.3.15 Mesh normal octahedral extra data syntax

| | Descriptor |
|---|---|
| mesh_normal_octahedral_extra_data [index] ) { | |
| mesh_normal_octahedral_bit_depth_minus1 [index] | u(5) |
| normal_octahedral_second_residual_flag[ index ] | u(1) |
| If ( normal_octahedral_second_residuals_flag[ index ] ){ | |
| for ( k=0; k< numCC; k++) | |
| mesh_normal_octrahedral_second_residuals_quantization_parameters [index][k] | u(7) |
| mesh_normal_octrahedral_second_residuals_count[ index ] | vu(v) |
| if( mesh_normal_octrahedral_second_residuals_count[ index ] ){ | |
| mesh_normal_octrahedral_second_residuals_size[ index ] | vu(v) |
| for( j=0; ]< | |
| mesh_normal_octrahedral_second_residuals_count[ index ]; j++ ){ | |
| for( k=0; k< 3; k++ ){ | |
| mesh_normal_octahedral_second_residual[ index ][ j ][ k ] | ae(v) |
| } | |
| } | |
| } | |
| } | |
| length_alignment( ) | |
| } | |

In the above techniques, some data representation methods such as are described floatx3, spherical, octahedral. The example techniques of 3D Unit vector representation can also be applied like snormx3, cube, warpedcube, latlong, stereo (Stereographic), eqarea (Lambert Equal Area), and eqdist (Equidistant), etc. Although the example techniques described above employ 2D octahedral representation, the example techniques are not specifically limited to octahedral representation and can be employed with any representation or parameterization.

Figure 29:
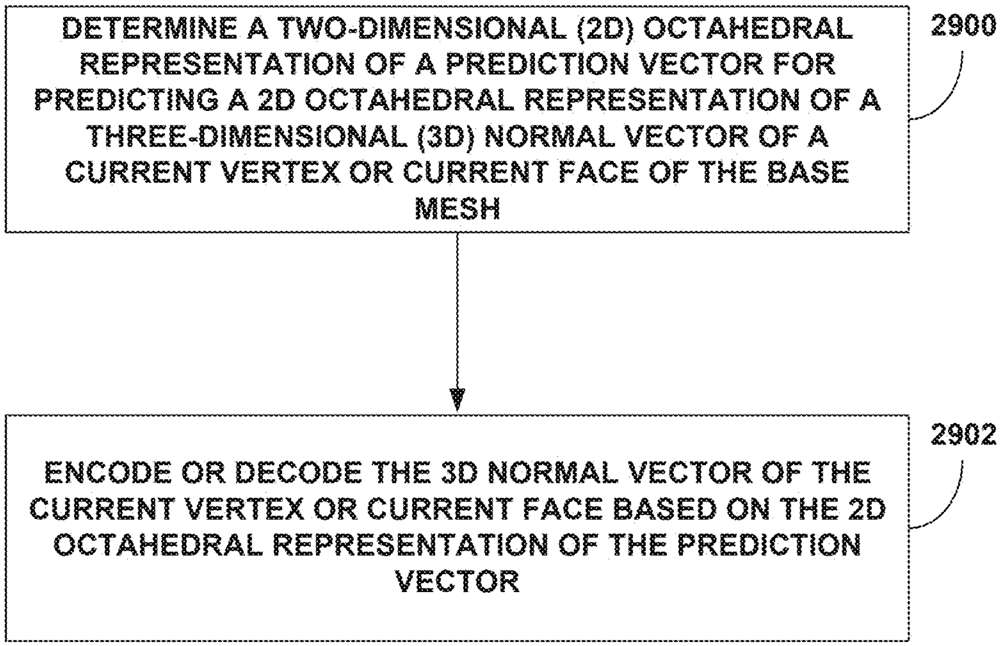
FIG. 29 is a flowchart illustrating an example method of operation.

FIG. 29 is a flowchart illustrating an example method of operation. For instance, FIG. 29 illustrates an example of encoding or decoding a base mesh. For purposes of illustration, the example of FIG. 29 is described with respect to processing circuitry coupled to one or more memories configured to store data for the base mesh. The processing circuitry may be processing circuitry of the example base mesh encoders and base mesh decoders described above.

The processing circuitry may determine a 2D octahedral representation of a prediction vector for predicting a 2D octahedral representation of a 3D normal vector of a current vertex or current face of the base mesh (2900). The normal vector extends outward from the current vertex or current face and is perpendicular to the current vertex or current face.

There may be various ways in which the processing circuitry may determine the 2D octahedral representation of the prediction vector. As one example, to determine the 2D octahedral representation of the prediction vector, the processing circuitry may determine one or more 3D normal vectors of previously encoded or decoded vertices of the base mesh (e.g., 3D normal vectors of neighboring vertices). The processing circuitry may generate a 3D prediction vector based on the one or more 3D normal vectors of previously encoded or decoded vertices of the base mesh. For example, the processing circuitry may utilize the delta prediction or the MARPA prediction, described above, to generate the 3D prediction vector. The processing circuitry may determine the 2D octahedral representation of the prediction vector based on the 3D prediction vector. For example, the processing circuitry may perform a 3D to 2D octahedral conversion using techniques described above.

As another example, to determine the 2D octahedral representation of the prediction vector, the processing circuitry may determine one or more attributes, excluding normal vectors, of previously encoded or decoded vertices of the base mesh (e.g., attributes of neighboring vertices). The processing circuitry may determine one or more attributes of the current vertex or current face (e.g., excluding normal vectors). The processing circuitry may generate a 3D prediction vector based on the one or more attributes of the previously encoded or decoded vertices and the one or more attributes of the current vertex or current face. For example, the processing circuitry may utilize the cross prediction, described above, to generate the 3D prediction vector. The processing circuitry may determine the 2D octahedral representation of the prediction vector based on the 3D prediction vector.

As another example, to determine the 2D octahedral representation of the prediction vector, the processing circuitry may access one or more 2D octahedral representations of 3D normal vectors of one or more previously encoded or decoded vertices of the base mesh. The one or more 2D octahedral representations of 3D normal vectors of one or more previously encoded or decoded vertices of the base mesh were generated and stored during encoding or decoding of the one or more previously encoded or decoded vertices of the base mesh. That is, at the time of encoding or decoding the previously encoded or decoded vertices, the processing circuitry may have determined 2D octahedral representations of the 3D normal vectors of these vertices. The processing circuitry may store the 2D octahedral representations of the 3D normal vectors of these vertices (e.g., previously encoded or decoded vertices), and access the 2D octahedral representations of the 3D normal vectors of these previously encoded or decoded vertices when encoding or decoding the current vertex or current face. The processing circuitry may generate the 2D octahedral representation of the prediction vector based on the one or more 2D octahedral representations of 3D normal vectors of one or more previously encoded or decoded vertices of the base mesh.

The processing circuitry may encode or decode the 3D normal vector of the current vertex or current face based on the 2D octahedral representation of the prediction vector (2900). For instance, the processing circuitry for a base mesh encoder may signal residual between the 2D octahedral representation of the prediction vector and the 2D octahedral representation of the 3D normal vector of the current vertex or current face. The processing circuitry for a base mesh decoder may add the residual between the 2D octahedral representation of the prediction vector and the 2D octahedral representation of the 3D normal vector of the current vertex or current face to the 2D octahedral representation of the prediction vector.

There may be additional residuals used for lossless encoding and decoding as well, as described above, and also below. Furthermore, in some examples, the processing circuitry for a base mesh encoder may signal and the processing circuitry for a base mesh decoder may receive information (e.g., normal_octrahedral_flag) indicating that the 3D normal vector of the current vertex or current face is to be decoded based on the 2D octahedral representation of the prediction vector.

Figure 30:
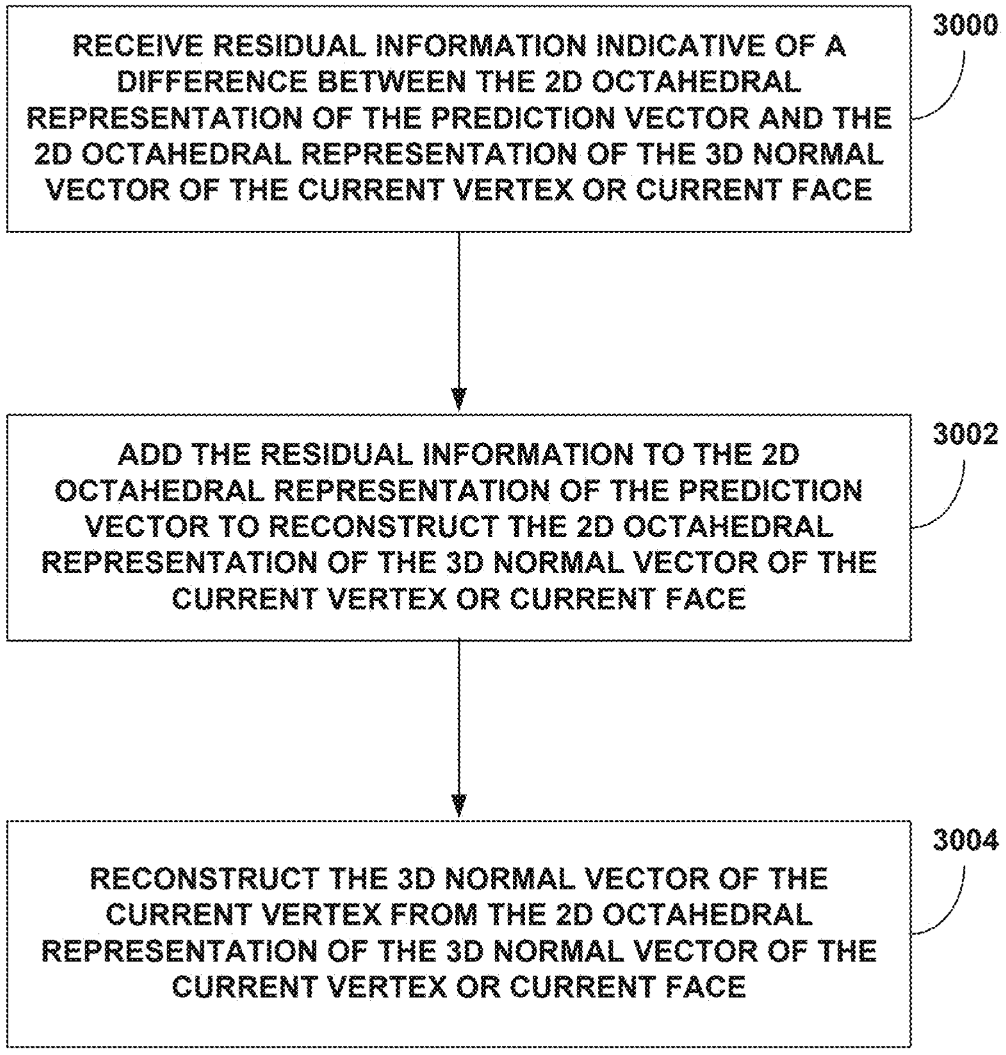
FIG. 30 is another flowchart illustrating an example method of operation.

FIG. 30 is another flowchart illustrating an example method of operation. FIG. 30 illustrates an example of decoding a base mesh. For purposes of illustration, the example of FIG. 30 is described with respect to processing circuitry coupled to one or more memories configured to store data for the base mesh. The processing circuitry may be processing circuitry of the example base mesh decoders described above.

The processing circuitry may receive residual information indicative of a difference between the 2D octahedral representation of the prediction vector and the 2D octahedral representation of the 3D normal vector of the current vertex or current face (3000). The processing circuitry may add the residual information to the 2D octahedral representation of the prediction vector to reconstruct the 2D octahedral representation of the 3D normal vector of the current vertex or current face (3002).

The processing circuitry may reconstruct the 3D normal vector of the current vertex or current face from the 2D octahedral representation of the 3D normal vector of the current vertex or current face (3004). For example, the processing circuitry may perform the 2D octahedral to 3D conversion using techniques described above.

Figure 31:
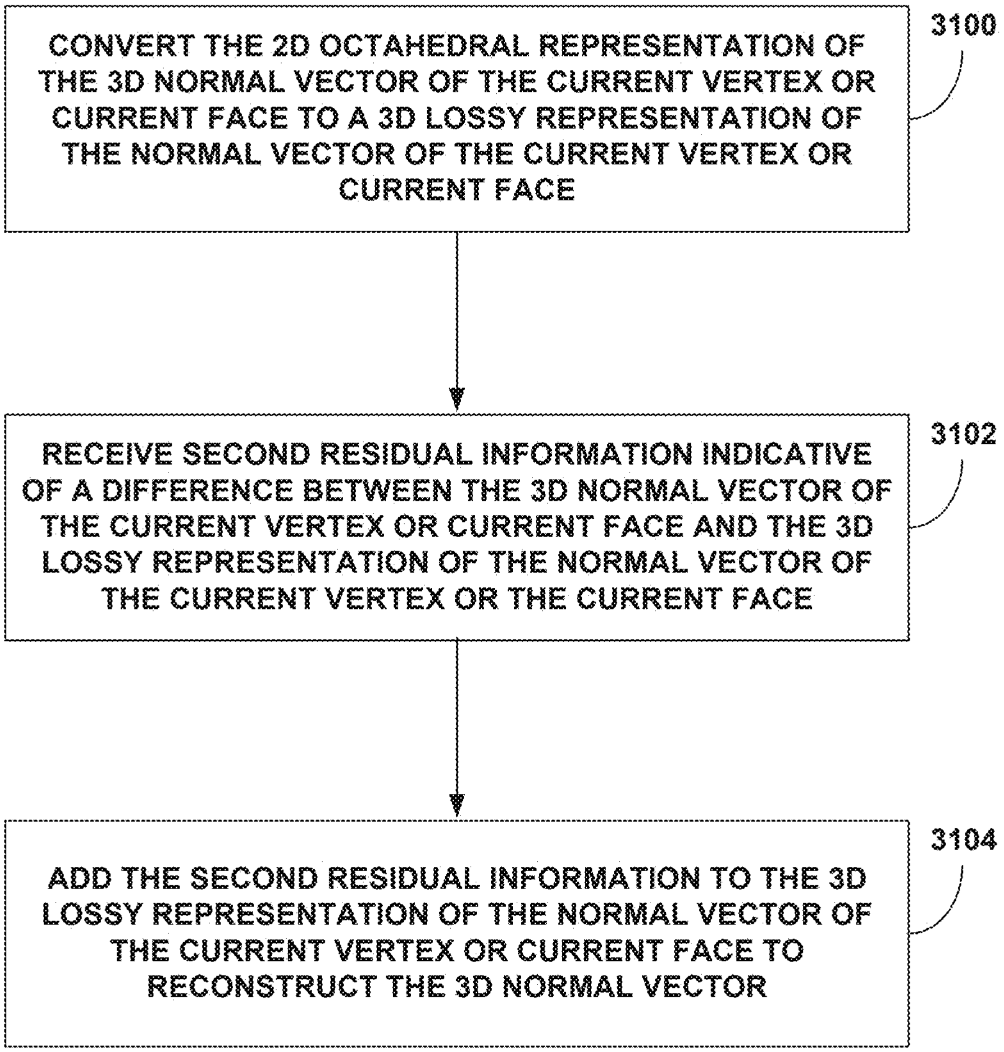
FIG. 31 is another flowchart illustrating an example method of operation.

In the example of FIG. 30, the reconstructed 3D normal vector may not be exactly the same as the original 3D normal vector. FIG. 31 is another flowchart illustrating an example method of operation. In FIG. 31, the processing circuitry of a base mesh decoder may perform additional operations for lossless reconstruction of the 3D normal vector of the current vertex or current face.

In FIG. 31, the residual information indicative of a difference between the 2D octahedral representation of the prediction vector and the 2D octahedral representation of the 3D normal vector of the current vertex or current face may be considered as first residual information. To reconstruct the 3D normal vector of the current vertex or current face from the 2D octahedral representation of the 3D normal vector of the current vertex or current face, the processing circuitry of the base mesh decoder may be configured to convert the 2D octahedral representation of the 3D normal vector of the current vertex or current face to a 3D lossy representation of the normal vector of the current vertex or current face (3100).

The processing circuitry of the base mesh decoder may receive second residual information indicative of a difference between the 3D normal vector of the current vertex or current face and the 3D lossy representation of the normal vector of the current vertex or current face (3102). The processing circuitry of the base mesh decoder may add the second residual information to the 3D lossy representation of the normal vector of the current vertex or current face to reconstruct the 3D normal vector (3104).

In some examples, to reduce the amount of signaling, the base mesh encoder may have adjusted the residual values from the original residual values. In such examples, the processing circuitry may adjust the reconstructed 3D normal vector. For example, the processing circuitry may determine that a value of the reconstructed 3D normal vector (e.g., F) is less than a minimum threshold (e.g., MIN) or greater than a maximum threshold (e.g., MAX). The processing circuitry may adjust the value of the reconstructed 3D normal vector based on the value of the reconstructed 3D normal vector being less than the minimum threshold or greater than the maximum threshold to generate the 3D normal vector (e.g., determine the value of the reconstructed 3D normal vector to be F+N if F is less than MIN or F−N if F is greater than MAX).

Figure 32:
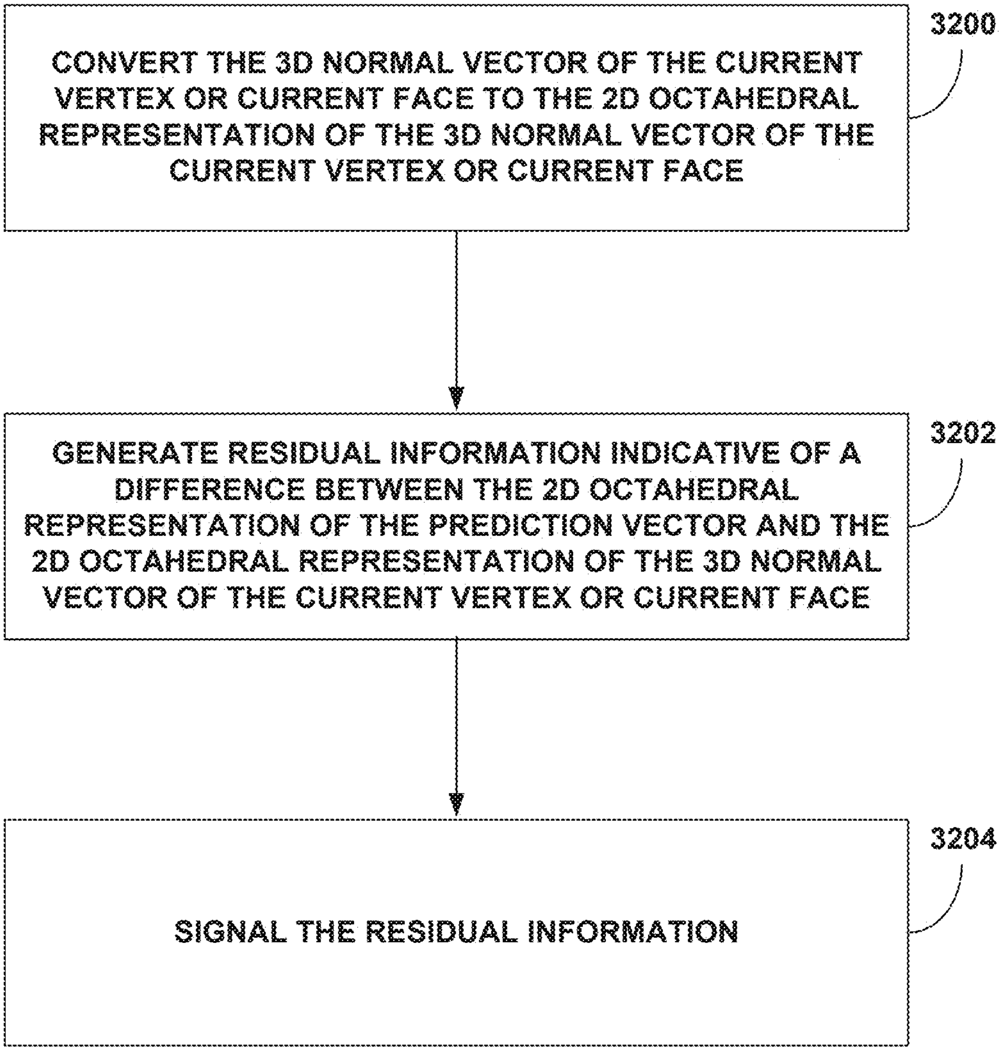
FIG. 32 is another flowchart illustrating an example method of operation.

FIG. 32 is another flowchart illustrating an example method of operation. FIG. 32 illustrates an example of encoding a base mesh. For purposes of illustration, the example of FIG. 32 is described with respect to processing circuitry coupled to one or more memories configured to store data for the base mesh. The processing circuitry may be processing circuitry of the example base mesh encoders described above.

The processing circuitry of the base mesh encoder may convert the 3D normal vector of the current vertex or current face to the 2D octahedral representation of the 3D normal vector of the current vertex or current face (3200). For example, the processing circuitry may perform the 3D to 2D octahedral conversion using the example techniques described above.

The processing circuitry of the base mesh encoder may generate residual information indicative of a difference between the 2D octahedral representation of the prediction vector and the 2D octahedral representation of the 3D normal vector of the current vertex or current face (3202). The processing circuitry of the base mesh encoder may signal the residual information (3204).

Figure 33:
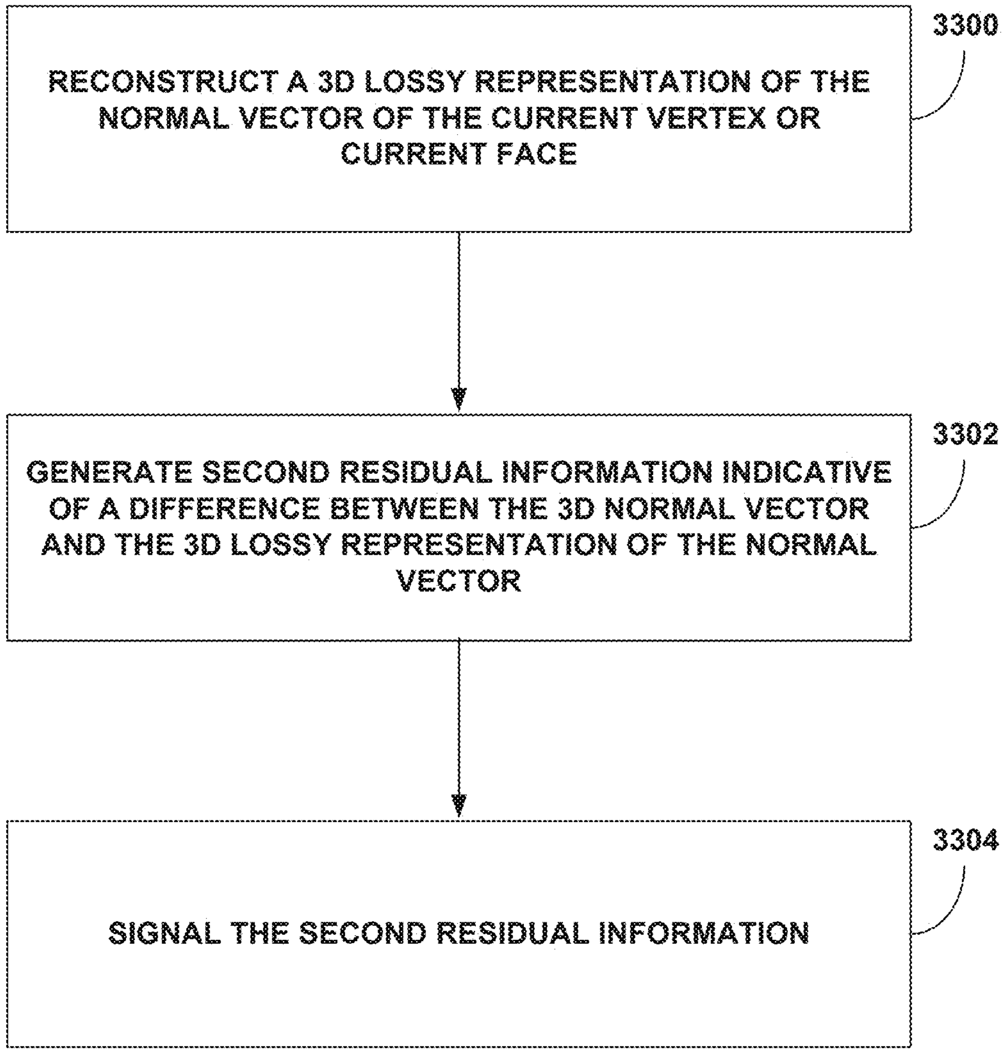
FIG. 33 is another flowchart illustrating an example method of operation.

In the example of FIG. 32, the conversion from 3D normal vector to 2D may be lossy. FIG. 33 is another flowchart illustrating an example method of operation. In FIG. 33, the processing circuitry of a base mesh encoder may perform additional operations for lossless encoding of the 3D normal vector of the current vertex or current face.

In FIG. 33, the residual information indicative of a difference between the 2D octahedral representation of the prediction vector and the 2D octahedral representation of the 3D normal vector of the current vertex or current face may be considered as first residual information. The processing circuitry of the base mesh encoder may reconstruct a 3D lossy representation of the normal vector of the current vertex or current face (3300). As one example, the processing circuitry may add the first residual information to the 2D octahedral representation of the prediction vector, and convert a result of the adding from 2D octahedral representation to reconstruct the 3D lossy representation of the normal vector. As another example, the processing circuitry may convert the 2D octahedral representation of the 3D normal vector of the current vertex or current face back to 3D to reconstruct the 3D lossy representation of the normal vector.

The processing circuitry may generate second residual information indicative of a difference between the 3D normal vector and the 3D lossy representation of the normal vector (3302). The processing circuitry may signal the second residual information (3304).

In some examples, to reduce the amount of signaling (e.g., reduce the value of the residual information), the processing circuitry of the base mesh encoder may adjust the residual value. For example, the processing circuitry of the base mesh encoder may determine that a value of the residual information (e.g., R) is less than a minimum threshold (e.g., less than −N/2) or greater than a maximum threshold (e.g., greater than N/2). The processing circuitry of the base mesh encoder may adjust the value of the residual information based on the value of the reconstructed 3D normal vector being less than the minimum threshold or greater than the maximum threshold to generate the 3D normal vector. For instance, the processing circuitry of the base mesh encoder may determine R', where R' is equal to R+N if R less than −N/2, equal to R−N if R is greater than N/2, and R otherwise. In this example, the processing circuitry of the base mesh encoder may signal the adjusted residual information.

The following describe examples that may be performed together or separately.

Clause 1. A method of encoding or decoding a base mesh, the method comprising: determining a two-dimensional (2D) octahedral representation of a prediction vector for predicting a 2D octahedral representation of a three-dimensional (3D) normal vector of a current vertex or current face of the base mesh, the normal vector extending outward from the current vertex or current face and perpendicular to the current vertex or current face; and encoding or decoding the 3D normal vector of the current vertex or current face based on the 2D octahedral representation of the prediction vector.

Clause 2. The method of clause 1, wherein encoding or decoding comprises decoding the normal vector of the current vertex or current face, the method further comprising: receiving residual information indicative of a difference between the 2D octahedral representation of the prediction vector and the 2D octahedral representation of the 3D normal vector of the current vertex or current face; adding the residual information to the 2D octahedral representation of the prediction vector to reconstruct the 2D octahedral representation of the 3D normal vector of the current vertex or current face; and reconstructing the 3D normal vector of the current vertex or current face from the 2D octahedral representation of the 3D normal vector of the current vertex or current face.

Clause 3. The method of clause 2, wherein the residual information is first residual information, and wherein reconstructing the 3D normal vector of the current vertex or current face from the 2D octahedral representation of the 3D normal vector of the current vertex or current face comprises: converting the 2D octahedral representation of the 3D normal vector of the current vertex or current face to a 3D lossy representation of the normal vector of the current vertex or current face; receiving second residual information indicative of a difference between the 3D normal vector of the current vertex or current face and the 3D lossy representation of the normal vector of the current vertex or current face; and adding the second residual information to the 3D lossy representation of the normal vector of the current vertex or current face to reconstruct the 3D normal vector.

Clause 4. The method of any of clauses 2 and 3, further comprising: determining that a value of the reconstructed 3D normal vector is less than a minimum threshold or greater than a maximum threshold; and adjusting the value of the reconstructed 3D normal vector based on the value of the reconstructed 3D normal vector being less than the minimum threshold or greater than the maximum threshold to generate the 3D normal vector.

Clause 5. The method of clause 1, wherein encoding or decoding comprises encoding the normal vector of the current vertex or current face, the method further comprising: converting the 3D normal vector of the current vertex or current face to the 2D octahedral representation of the 3D normal vector of the current vertex or current face; generating residual information indicative of a difference between the 2D octahedral representation of the prediction vector and the 2D octahedral representation of the 3D normal vector of the current vertex or current face; and signaling the residual information.

Clause 6. The method of clause 5, wherein the residual information comprises first residual information, the method further comprising: reconstructing a 3D lossy representation of the normal vector of the current vertex or current face based on one of: adding the first residual information to the 2D octahedral representation of the prediction vector, and converting a result of the adding from 2D octahedral representation to reconstruct the 3D lossy representation of the normal vector; or converting the 2D octahedral representation of the 3D normal vector of the current vertex or current face back to 3D to reconstruct the 3D lossy representation of the normal vector; generating second residual information indicative of a difference between the 3D normal vector and the 3D lossy representation of the normal vector; and signaling the second residual information.

Clause 7. The method of any of clauses 5 and 6, further comprising: determining that a value of the residual information is less than a minimum threshold or greater than a maximum threshold; and adjusting the value of the residual information based on the value of the reconstructed 3D normal vector being less than the minimum threshold or greater than the maximum threshold to generate the 3D normal vector, wherein signaling the residual information comprises signaling the adjusted residual information.

Clause 8. The method of any of clauses 1-7, wherein determining the 2D octahedral representation of the prediction vector comprises: determining one or more 3D normal vectors of previously encoded or decoded vertices of the base mesh; generating a 3D prediction vector based on the one or more 3D normal vectors of previously encoded or decoded vertices of the base mesh; and determining the 2D octahedral representation of the prediction vector based on the 3D prediction vector.

Clause 9. The method of any of clauses 1-7, wherein determining the 2D octahedral representation of the prediction vector comprises: determining one or more attributes, excluding normal vectors, of previously encoded or decoded vertices of the base mesh; determining one or more attributes of the current vertex or current face; generating a 3D prediction vector based on the one or more attributes of the previously encoded or decoded vertices and the one or more attributes of the current vertex or current face; and determining the 2D octahedral representation of the prediction vector based on the 3D prediction vector.

Clause 10. The method of any of clauses 1-7, wherein determining the 2D octahedral representation of the prediction vector comprises: accessing one or more 2D octahedral representations of 3D normal vectors of one or more previously encoded or decoded vertices of the base mesh, wherein the one or more 2D octahedral representations of 3D normal vectors of one or more previously encoded or decoded vertices of the base mesh were generated and stored during encoding or decoding of the one or more previously encoded or decoded vertices of the base mesh; and generating the 2D octahedral representation of the prediction vector based on the one or more 2D octahedral representations of 3D normal vectors of one or more previously encoded or decoded vertices of the base mesh.

Clause 11. The method of any of clauses 1-10, further comprising: signaling or receiving information indicating that the 3D normal vector of the current vertex or current face is to be decoded based on the 2D octahedral representation of the prediction vector.

Clause 12. A device for encoding or decoding a base mesh, the device comprising: one or more memories configured to store data for the base mesh; and processing circuitry coupled to the one or more memories, wherein the processing circuitry is configured to: determine a two-dimensional (2D) octahedral representation of a prediction vector for predicting a 2D octahedral representation of a three-dimensional (3D) normal vector of a current vertex or current face of the base mesh, the normal vector extending outward from the current vertex or current face and perpendicular to the current vertex or current face; and encode or decode the 3D normal vector of the current vertex or current face based on the 2D octahedral representation of the prediction vector.

Clause 13. The device of clause 12, wherein to encode or decode, the processing circuitry is configured to decode the normal vector of the current vertex or current face, and wherein the processing circuitry is configured to: receive residual information indicative of a difference between the 2D octahedral representation of the prediction vector and the 2D octahedral representation of the 3D normal vector of the current vertex or current face; add the residual information to the 2D octahedral representation of the prediction vector to reconstruct the 2D octahedral representation of the 3D normal vector of the current vertex or current face; and reconstruct the 3D normal vector of the current vertex or current face from the 2D octahedral representation of the 3D normal vector of the current vertex or current face.

Clause 14. The device of clause 13, wherein the residual information is first residual information, and wherein to reconstruct the 3D normal vector of the current vertex or current face from the 2D octahedral representation of the 3D normal vector of the current vertex or current face, the processing circuitry is configured to: convert the 2D octahedral representation of the 3D normal vector of the current vertex or current face to a 3D lossy representation of the normal vector of the current vertex or current face; receive second residual information indicative of a difference between the 3D normal vector of the current vertex or current face and the 3D lossy representation of the normal vector of the current vertex or current face; and add the second residual information to the 3D lossy representation of the normal vector of the current vertex or current face to reconstruct the 3D normal vector.

Clause 15. The device of any of clauses 13 and 14, wherein the processing circuitry is configured to: determine that a value of the reconstructed 3D normal vector is less than a minimum threshold or greater than a maximum threshold; and adjust the value of the reconstructed 3D normal vector based on the value of the reconstructed 3D normal vector being less than the minimum threshold or greater than the maximum threshold to generate the 3D normal vector.

Clause 16. The device of clause 12, wherein to encode or decode, the processing circuitry is configured to encode the normal vector of the current vertex or current face, and wherein the processing circuitry is configured to: convert the 3D normal vector of the current vertex or current face to the 2D octahedral representation of the 3D normal vector of the current vertex or current face; generate residual information indicative of a difference between the 2D octahedral representation of the prediction vector and the 2D octahedral representation of the 3D normal vector of the current vertex or current face; and signal the residual information.

Clause 17. The device of clause 16, wherein the residual information comprises first residual information, and wherein the processing circuitry is configured to: reconstruct a 3D lossy representation of the normal vector of the current vertex or current face based on one of: adding the first residual information to the 2D octahedral representation of the prediction vector, and converting a result of the adding from 2D octahedral representation to reconstruct the 3D lossy representation of the normal vector; or converting the 2D octahedral representation of the 3D normal vector of the current vertex or current face back to 3D to reconstruct the 3D lossy representation of the normal vector; generate second residual information indicative of a difference between the 3D normal vector and the 3D lossy representation of the normal vector; and signal the second residual information.

Clause 18. The device of any of clauses 16 and 17, wherein the processing circuitry is configured to: determine that a value of the residual information is less than a minimum threshold or greater than a maximum threshold; and adjust the value of the residual information based on the value of the reconstructed 3D normal vector being less than the minimum threshold or greater than the maximum threshold to generate the 3D normal vector, wherein to signal the residual information, the processing circuitry is configured to signal the adjusted residual information.

Clause 19. The device of any of clauses 13-18, wherein the processing circuitry is configured to at least one of: signal or receive information indicating that the 3D normal vector of the current vertex or current face is to be decoded based on the 2D octahedral representation of the prediction vector.

Clause 20. A computer-readable storage medium storing instructions thereon that when executed cause one or more processors to: determine a two-dimensional (2D) octahedral representation of a prediction vector for predicting a 2D octahedral representation of a three-dimensional (3D) normal vector of a current vertex or current face of a base mesh, the normal vector extending outward from the current vertex or current face and perpendicular to the current vertex or current face; and encode or decode the 3D normal vector of the current vertex or current face based on the 2D octahedral representation of the prediction vector.

Clause 21. A device for encoding or decoding a base mesh, the device comprising: one or more memories configured to store data for the base mesh; and processing circuitry coupled to the one or more memories, wherein the processing circuitry is configured to perform the method of any of clauses 1-12.

Clause 22. A device for encoding or decoding a base mesh, the device comprising means for performing the method of any of clauses 1-12.

Clause 23. A computer-readable storage medium storing instructions thereon that when executed cause one or more processors to perform the method of any of clauses 1-12.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding a base mesh, the method comprising:

determining a two-dimensional (2D) octahedral representation of a prediction vector for predicting a 2D octahedral representation of a three-dimensional (3D) normal vector of a current vertex or current face of the base mesh, the normal vector extending outward from the current vertex or current face and perpendicular to the current vertex or current face; and encoding or decoding the 3D normal vector of the current vertex or current face based on the 2D octahedral representation of the prediction vector.

2. The method of claim 1, wherein encoding or decoding comprises decoding the normal vector of the current vertex or current face, the method further comprising:

receiving residual information indicative of a difference between the 2D octahedral representation of the prediction vector and the 2D octahedral representation of the 3D normal vector of the current vertex or current face;

adding the residual information to the 2D octahedral representation of the prediction vector to reconstruct the 2D octahedral representation of the 3D normal vector of the current vertex or current face; and reconstructing the 3D normal vector of the current vertex or current face from the 2D octahedral representation of the 3D normal vector of the current vertex or current face.

3. The method of claim 2, wherein the residual information is first residual information, and wherein reconstructing the 3D normal vector of the current vertex or current face from the 2D octahedral representation of the 3D normal vector of the current vertex or current face comprises:

converting the 2D octahedral representation of the 3D normal vector of the current vertex or current face to a 3D lossy representation of the normal vector of the current vertex or current face;

receiving second residual information indicative of a difference between the 3D normal vector of the current vertex or current face and the 3D lossy representation of the normal vector of the current vertex or current face; and adding the second residual information to the 3D lossy representation of the normal vector of the current vertex or current face to reconstruct the 3D normal vector.

4. The method of claim 2, further comprising:

determining that a value of the reconstructed 3D normal vector is less than a minimum threshold or greater than a maximum threshold; and adjusting the value of the reconstructed 3D normal vector based on the value of the reconstructed 3D normal vector being less than the minimum threshold or greater than the maximum threshold to generate the 3D normal vector.

5. The method of claim 1, wherein encoding or decoding comprises encoding the normal vector of the current vertex or current face, the method further comprising:

converting the 3D normal vector of the current vertex or current face to the 2D octahedral representation of the 3D normal vector of the current vertex or current face;

generating residual information indicative of a difference between the 2D octahedral representation of the prediction vector and the 2D octahedral representation of the 3D normal vector of the current vertex or current face; and signaling the residual information.

6. The method of claim 5, wherein the residual information comprises first residual information, the method further comprising:

reconstructing a 3D lossy representation of the normal vector of the current vertex or current face based on one of:

adding the first residual information to the 2D octahedral representation of the prediction vector, and converting a result of the adding from 2D octahedral representation to reconstruct the 3D lossy representation of the normal vector; or converting the 2D octahedral representation of the 3D normal vector of the current vertex or current face back to 3D to reconstruct the 3D lossy representation of the normal vector;

generating second residual information indicative of a difference between the 3D normal vector and the 3D lossy representation of the normal vector; and signaling the second residual information.

7. The method of claim 5, further comprising:

determining that a value of the residual information is less than a minimum threshold or greater than a maximum threshold; and adjusting the value of the residual information based on the value of the reconstructed 3D normal vector being less than the minimum threshold or greater than the maximum threshold to generate the 3D normal vector, wherein signaling the residual information comprises signaling the adjusted residual information.

8. The method of claim 1, wherein determining the 2D octahedral representation of the prediction vector comprises:

determining one or more 3D normal vectors of previously encoded or decoded vertices of the base mesh;

generating a 3D prediction vector based on the one or more 3D normal vectors of previously encoded or decoded vertices of the base mesh; and determining the 2D octahedral representation of the prediction vector based on the 3D prediction vector.

9. The method of claim 1, wherein determining the 2D octahedral representation of the prediction vector comprises:

determining one or more attributes, excluding normal vectors, of previously encoded or decoded vertices of the base mesh;

determining one or more attributes of the current vertex or current face;

generating a 3D prediction vector based on the one or more attributes of the previously encoded or decoded vertices and the one or more attributes of the current vertex or current face; and determining the 2D octahedral representation of the prediction vector based on the 3D prediction vector.

10. The method of claim 1, wherein determining the 2D octahedral representation of the prediction vector comprises:

accessing one or more 2D octahedral representations of 3D normal vectors of one or more previously encoded or decoded vertices of the base mesh, wherein the one or more 2D octahedral representations of 3D normal vectors of one or more previously encoded or decoded vertices of the base mesh were generated and stored during encoding or decoding of the one or more previously encoded or decoded vertices of the base mesh; and generating the 2D octahedral representation of the prediction vector based on the one or more 2D octahedral representations of 3D normal vectors of one or more previously encoded or decoded vertices of the base mesh.

11. The method of claim 1, further comprising:

signaling or receiving information indicating that the 3D normal vector of the current vertex or current face is to be decoded based on the 2D octahedral representation of the prediction vector.

12. A device for encoding or decoding a base mesh, the device comprising:

one or more memories configured to store data for the base mesh; and processing circuitry coupled to the one or more memories, wherein the processing circuitry is configured to:

determine a two-dimensional (2D) octahedral representation of a prediction vector for predicting a 2D octahedral representation of a three-dimensional (3D) normal vector of a current vertex or current face of the base mesh, the normal vector extending outward from the current vertex or current face and perpendicular to the current vertex or current face; and encode or decode the 3D normal vector of the current vertex or current face based on the 2D octahedral representation of the prediction vector.

13. The device of claim 12, wherein to encode or decode, the processing circuitry is configured to decode the normal vector of the current vertex or current face, and wherein the processing circuitry is configured to:

receive residual information indicative of a difference between the 2D octahedral representation of the prediction vector and the 2D octahedral representation of the 3D normal vector of the current vertex or current face;

add the residual information to the 2D octahedral representation of the prediction vector to reconstruct the 2D octahedral representation of the 3D normal vector of the current vertex or current face; and reconstruct the 3D normal vector of the current vertex or current face from the 2D octahedral representation of the 3D normal vector of the current vertex or current face.

14. The device of claim 13, wherein the residual information is first residual information, and wherein to reconstruct the 3D normal vector of the current vertex or current face from the 2D octahedral representation of the 3D normal vector of the current vertex or current face, the processing circuitry is configured to:

convert the 2D octahedral representation of the 3D normal vector of the current vertex or current face to a 3D lossy representation of the normal vector of the current vertex or current face;

receive second residual information indicative of a difference between the 3D normal vector of the current vertex or current face and the 3D lossy representation of the normal vector of the current vertex or current face; and add the second residual information to the 3D lossy representation of the normal vector of the current vertex or current face to reconstruct the 3D normal vector.

15. The device of claim 13, wherein the processing circuitry is configured to:

determine that a value of the reconstructed 3D normal vector is less than a minimum threshold or greater than a maximum threshold; and adjust the value of the reconstructed 3D normal vector based on the value of the reconstructed 3D normal vector being less than the minimum threshold or greater than the maximum threshold to generate the 3D normal vector.

16. The device of claim 12, wherein to encode or decode, the processing circuitry is configured to encode the normal vector of the current vertex or current face, and wherein the processing circuitry is configured to:

convert the 3D normal vector of the current vertex or current face to the 2D octahedral representation of the 3D normal vector of the current vertex or current face;

generate residual information indicative of a difference between the 2D octahedral representation of the prediction vector and the 2D octahedral representation of the 3D normal vector of the current vertex or current face; and signal the residual information.

17. The device of claim 16, wherein the residual information comprises first residual information, and wherein the processing circuitry is configured to:

reconstruct a 3D lossy representation of the normal vector of the current vertex or current face based on one of:

adding the first residual information to the 2D octahedral representation of the prediction vector, and converting a result of the adding from 2D octahedral representation to reconstruct the 3D lossy representation of the normal vector; or converting the 2D octahedral representation of the 3D normal vector of the current vertex or current face back to 3D to reconstruct the 3D lossy representation of the normal vector;

generate second residual information indicative of a difference between the 3D normal vector and the 3D lossy representation of the normal vector; and signal the second residual information.

18. The device of claim 16, wherein the processing circuitry is configured to:

determine that a value of the residual information is less than a minimum threshold or greater than a maximum threshold; and adjust the value of the residual information based on the value of the reconstructed 3D normal vector being less than the minimum threshold or greater than the maximum threshold to generate the 3D normal vector, wherein to signal the residual information, the processing circuitry is configured to signal the adjusted residual information.

19. The device of claim 13, wherein the processing circuitry is configured to at least one of:

signal or receive information indicating that the 3D normal vector of the current vertex or current face is to be decoded based on the 2D octahedral representation of the prediction vector.

20. A computer-readable storage medium storing instructions thereon that when executed cause one or more processors to:

determine a two-dimensional (2D) octahedral representation of a prediction vector for predicting a 2D octahedral representation of a three-dimensional (3D) normal vector of a current vertex or current face of a base mesh, the normal vector extending outward from the current vertex or current face and perpendicular to the current vertex or current face; and encode or decode the 3D normal vector of the current vertex or current face based on the 2D octahedral representation of the prediction vector.

* * * * *